(12) United States Patent
Qiao et al.

(10) Patent No.: US 11,743,767 B2
(45) Date of Patent: Aug. 29, 2023

(54) COMPRESSION OF ETHERNET PACKET HEADER

(71) Applicant: Ofinno, LLC, Reston, VA (US)

(72) Inventors: Weihua Qiao, Herndon, VA (US); Esmael Hejazi Dinan, McLean, VA (US); Kyungmin Park, Vienna, VA (US); Peyman Talebi Fard, Vienna, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 18/047,043

(22) Filed: Oct. 17, 2022

(65) Prior Publication Data

US 2023/0078783 A1    Mar. 16, 2023

Related U.S. Application Data

(63) Continuation of application No. 17/313,706, filed on May 6, 2021, now Pat. No. 11,576,079, which is a (Continued)

(51) Int. Cl.
*H04W 28/06* (2009.01)
*H04W 92/10* (2009.01)
(Continued)

(52) U.S. Cl.
CPC ....... *H04W 28/06* (2013.01); *H04L 2101/618* (2022.05); *H04L 2101/622* (2022.05); *H04W 80/02* (2013.01); *H04W 92/10* (2013.01)

(58) Field of Classification Search
CPC ..... H04W 28/06; H04W 80/02; H04W 92/10; H04L 61/6018; H04L 61/6022
See application file for complete search history.

(56) References Cited

U.S. PATENT DOCUMENTS 7,633,970 B2   12/2009   Van Kampen et al.
9,769,701 B2    9/2017   Denio et al.
(Continued)

FOREIGN PATENT DOCUMENTS

EP    2854359 B1    4/2020
RU    2659477 C2    7/2018
(Continued)

OTHER PUBLICATIONS

3GPP TS 36.323 V14.3.0 (Jun. 2017); Technical Specification; 3rd Generation Partnership Project; Technical Specification Group Radio Access Network; Evolved Universal Terrestrial Radio Access (E-UTRA); Packet Data Convergence Protocol (PDCP) specification; (Release 14).
(Continued)

*Primary Examiner* — Natasha W Cosme
(74) *Attorney, Agent, or Firm* — Peter Flanagan; Kavon Nasabzadeh; Philip R. Smith

(57) ABSTRACT

Described are embodiments for Ethernet header compression. A base station sends, to a wireless device, a radio resource control message including a packet data convergence protocol (PDCP) configuration parameter indicating Ethernet header compression for a data radio bearer. Based on the PDCP configuration parameter, the base station sends, to the wireless device, a message including: a source medium access control (MAC) address and a destination MAC address, and a header compression index corresponding to the source MAC address and the destination MAC address. The base station sends, to the wireless device, a compressed Ethernet packet: including a packet header being compressed based on the message; and including the corresponding header compression index.

20 Claims, 24 Drawing Sheets

Related U.S. Application Data continuation of application No. 16/160,323, filed on Oct. 15, 2018, now Pat. No. 11,006,316.

(60) Provisional application No. 62/572,924, filed on Oct. 16, 2017.

(51) Int. Cl.
*H04W 80/02* (2009.01)
*H04L 101/618* (2022.01)
*H04L 101/622* (2022.01)

(56) References Cited

U.S. PATENT DOCUMENTS

| | | |
|---|---|---|
| 10,205,660 B2 | 2/2019 | Cox et al. |
| 2006/0104278 A1 | 5/2006 | Chang et al. |
| 2016/0261558 A1 | 9/2016 | Herrero et al. |
| 2019/0124181 A1 | 4/2019 | Park et al. |

FOREIGN PATENT DOCUMENTS

| | | |
|---|---|---|
| WO | 2009004631 A1 | 1/2009 |
| WO | 2015158389 A1 | 10/2015 |

OTHER PUBLICATIONS

3GPP TS 36.331 V14.3.0 (Jun. 2017);Technical Specification; 3rd Generation Partnership Project; Technical Specification Group Radio Access Network; Evolved Universal Terrestrial Radio Access (E-UTRA); Radio Resource Control (RRC); Protocol specification (Release 14).

Effnet EthHC; 2017 EFFNET AB—a subsidiary of Effnetplattformen AB; Accessed Aug. 2017.

Ethernet Frame; Text is available under the Creative Commons Attribution-ShareAlike License; Published Sep. 24, 2017.

Ethernet Type; Text is available under the Creative Commons Attribution-ShareAlike License; Published Aug. 10, 2017.

IEEE 802.1Q; Text is available under the Creative Commons Attribution-ShareAlike License; Published Aug. 7, 2017.

3GPP TS 36.300 V14.3.0 (Jun. 2017); 3rd Generation Partnership Project; Technical Specification Group Radio Access Network; Evolved Universal Terrestrial Radio Access (E-TRAN); Overall description; Stage 2 (Release 14).

Next Generation Enterprise WAN: Cisco ISRs with 4G LTE deployment guide; May 2014.

3GPP TS 38.323 V0.3.0 (Aug. 2017); Technical Specification; 3rd Generation Partnership Project; Technical Specification Group Radio Access Network; NR; Packet Data Convergence Protocol (PDCP) Specification (Release 15).

3GPP TS 38.300 V1.0.1 (Oct. 2017); 3rd Generation Partnership Project; Technical Specification Group Radio Access Network; NR; NR and NG-RAN Overall Description; Stage 2 (Release 15).

Network Working Group; Request for Comments: 3095; Category: Standard Track; RObust Header Compression (ROHC): Framework and four profiles: RTP, UDP, ESP, and uncompressed; Published Jul. 2001.

Network Working Group; Request for Comments: 4815; Updates: 3095, 3241, 3843, 4019, 4362; Category: Standards Track; RObust Header Compression (ROHC): Corrections and Clarifications to RFC 3095; Published Feb. 2007.

Network Working Group;l Request for Comments: 4995; Category: Standards Track; The RObust Header Compression (ROHC) Framework; Published Jul. 2007.

Network Working Group; Request for Comments: 5225; Category; Standards Track; RObust Header Compression Version 2 (ROHCv2): Profiles for RTP, UDP, IP, ESP and UDP-Lite; Published Apr. 2008.

Internet Engineering Task Force (IETF); Request for Comments: 5795; Obsoletes: 4995; Category: Standards Track; ISSN: 2070-1721; The RObust Header Compression (ROHC) Framework; Published Mar. 2010.

Internet Engineering Task Force (IETF); Request for Comments: 6846; Obsoletes: 4996; Category: Standards Track; ISSN: 2070-1721; RObust Header Compression (ROHC): A Profile for TCP/IP (ROHC-TCP); Published Jan. 2013.

SA WG2 Meeting #121 S2-173117; May 15-19, 2017, Hangzhou, P.R. China (was S2-17xxxx); Options on packet filters extension for PDU sessions of type Ethernet and unstructured in 5G S.

SA WG2 Meeting #122bis S2-17bbbb; Aug. 21-25, 2017, Sophia Antipolis, France (revision of S2-17xxxx); TS 23.501: Update to PDU session types.

SA WG2 Meeting #123 S2-177974; Oct. 23-27, 2017, Ijubljana,slovenia (revision of S2-177143); Clarification on Ethernet PDU session.

802.3 Ethernet packet and frame structure

| Layer | Preamble | Start of frame delimiter | MAC destination | MAC source | 802.1Q tag (optional) | Ethertype (Ethernet II) or length (IEEE 802.3) | Payload | Frame check sequence (32-bit CRC) | Interpacket gap |
|---|---|---|---|---|---|---|---|---|---|
| | 7 octets | 1 octet | 6 octets | 6 octets | (4 octets) | 2 octets | 46-1500 octets | 4 octets | 12 octets |
| Layer 2 Ethernet frame | | | ←――――――――――― 64-1522 octets →  | | | | | | |
| Layer 1 Ethernet packet & IPG | | ←――――――――――― 64-1522 octets → | | | | | | | ←12 octets→ |

FIG. 9

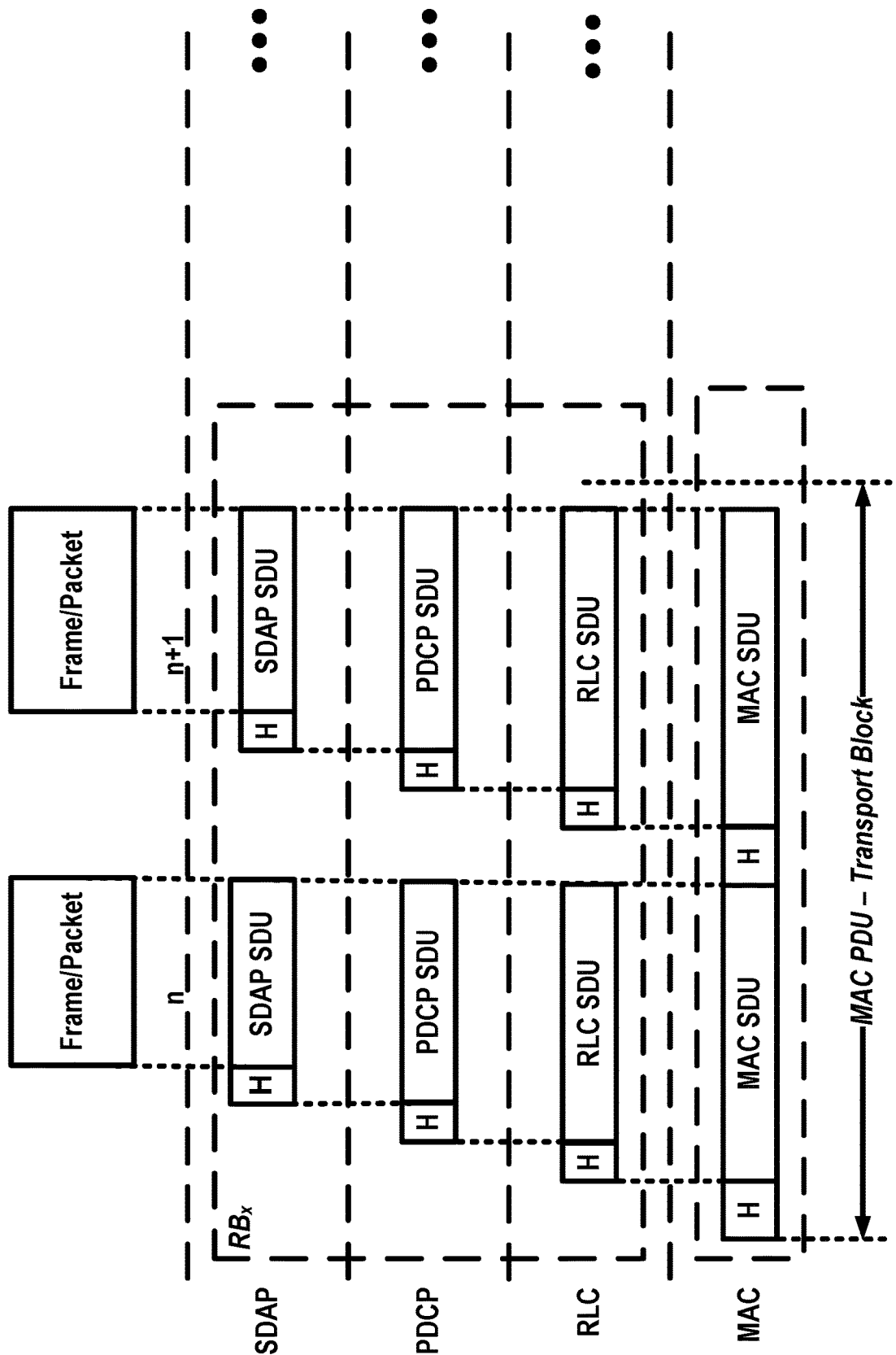

```
┌─────────────────────────────────────────────────────────┐
│ Receive, by a radio access network from an access and mobility │
│ management function, a 1st message comprising an Ethernet │
│ packet filter set for a wireless device, wherein the Ethernet │
│ packet filter set comprises: a source medium access control │
│ address; and a destination medium access control address │
│                          2110                            │
└─────────────────────────────────────────────────────────┘
                              │
                              ▼
┌─────────────────────────────────────────────────────────┐
│ Determine, by the radio access network and based on the Ethernet │
│ packet filter set, Ethernet header configuration parameters for the │
│ wireless device, wherein the Ethernet header configuration │
│ parameters comprise: a header compression index indicating the │
│ source medium access control address and the destination │
│ medium access control address; and at least one Ethernet header │
│ profile configuration information element comprising a profile │
│                        identifier                        │
│                          2120                            │
└─────────────────────────────────────────────────────────┘
                              │
                              ▼
┌─────────────────────────────────────────────────────────┐
│ Send, by the radio access network to the wireless device, at least │
│ one 2nd message comprising the Ethernet header configuration │
│                        parameters                        │
│                          2130                            │
└─────────────────────────────────────────────────────────┘
                              │
                              ▼
┌─────────────────────────────────────────────────────────┐
│ Send, by the radio access network to the wireless device, at least │
│ one Ethernet packet comprising at least one packet header │
│ compressed based on the header compression index and the │
│                    profile identifier.                   │
│                          2140                            │
└─────────────────────────────────────────────────────────┘
```

FIG. 21

Receive, by a wireless device, radio resource control message(s) comprising configuration parameters for a 1st bearer, the configuration parameters comprising at least one of: a profile index indicating an Ethernet profile; a 2d parameter indicating that Ethernet packet headers are compressed; or a 2nd parameter indicating that: Ethernet packet headers are compressed; and IP packet headers are compressed;
2210

Receive, by a packet data convergence protocol layer in the wireless device, a packet data convergence protocol service data unit comprising an Ethernet packet, wherein the Ethernet packet comprises at least one of: an Ethernet header and a payload; or an Ethernet header and an IP packet header and a payload
2220

Create a compressed header, based on the configuration parameters, by compressing at least one of: the Ethernet header; or the Ethernet header and the IP packet header
2230

Construct a packet data convergence protocol packet data unit comprising at least one of: the compressed header; and a payload
2240

Transmit, by the wireless device to a base station, the packet data convergence protocol packet data unit
2250

FIG. 22

COMPRESSION OF ETHERNET PACKET HEADER

CROSS-REFERENCE TO RELATED APPLICATIONS

This application is a continuation of U.S. patent Ser. No. 17/313,706, filed May 6, 2021, which is a continuation of U.S. patent Ser. No. 16/160,323, filed Oct. 15, 2018, which claims the benefit of U.S. Provisional Application No. 62/572,924, filed Oct. 16, 2017, all of which are hereby incorporated by reference in their entireties.

BRIEF DESCRIPTION OF THE SEVERAL VIEWS OF THE DRAWINGS

Examples of several of the various embodiments of the present invention are described herein with reference to the drawings.

FIG. 9 is an example diagram depicting an example Ethernet packet and frame structure as per an aspect of an embodiment of the present disclosure.

FIG. 14 is an example diagram depicting a layer 2 data flow as per an aspect of an embodiment of the present disclosure.

FIG. 21 is an example flow diagram as per an aspect of an embodiment of the present disclosure.

FIG. 22 is an example flow diagram as per an aspect of an embodiment of the present disclosure.

DETAILED DESCRIPTION OF EXAMPLES

Example embodiments of the present invention enable implementation of enhanced features and functionalities in 5G systems. Embodiments of the technology disclosed herein may be employed in the technical field of 5G systems and network slicing for communication systems. More particularly, the embodiments of the technology disclosed herein may relate to 5G core network and 5G systems for Ethernet type of PDU session in communication systems. Throughout the present disclosure, UE, wireless device, and mobile device are used interchangeably.

Figure 1:
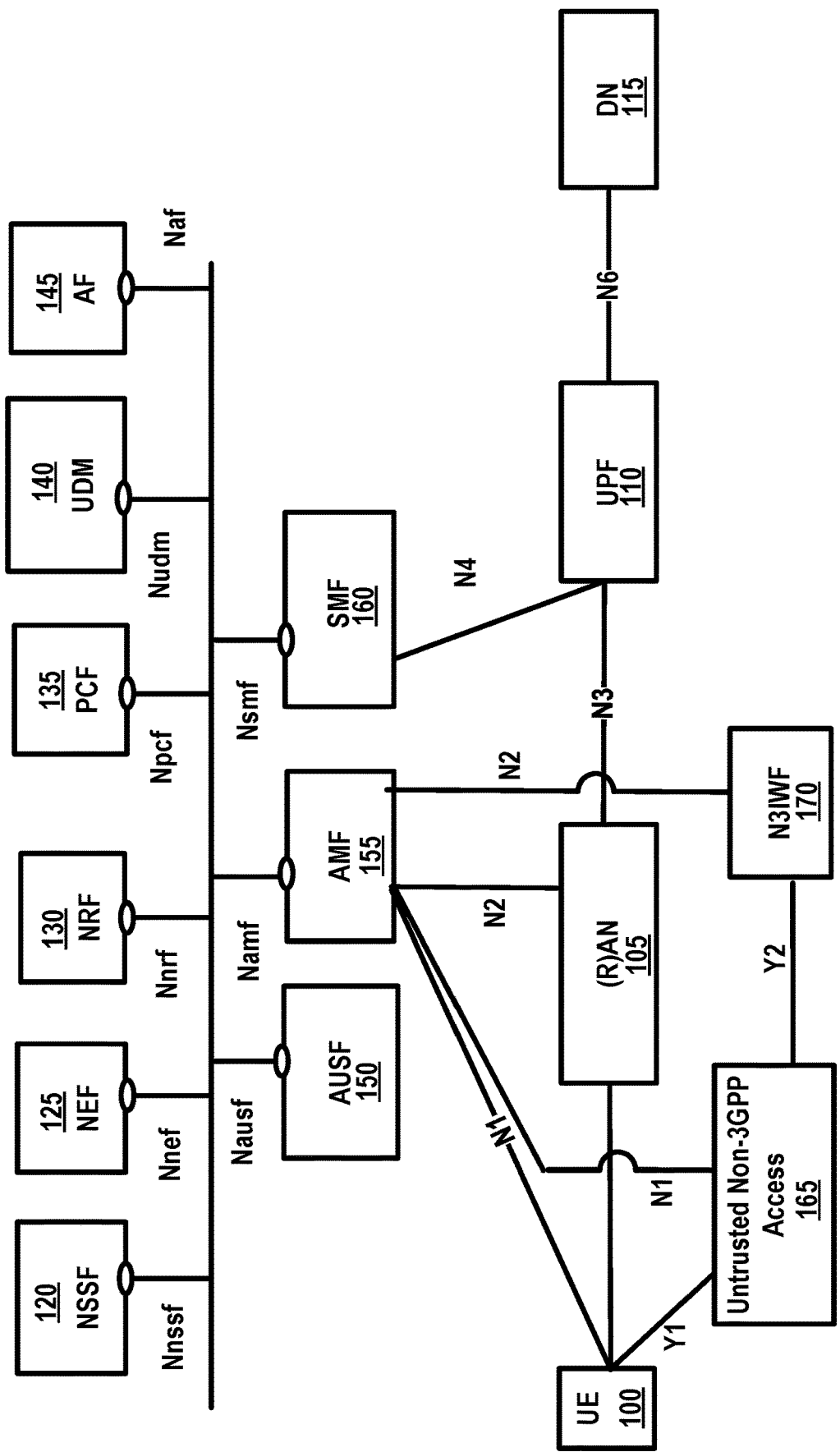
FIG. 1 is a diagram of an example 5G system architecture as per an aspect of an embodiment of the present disclosure.
Figure 2:
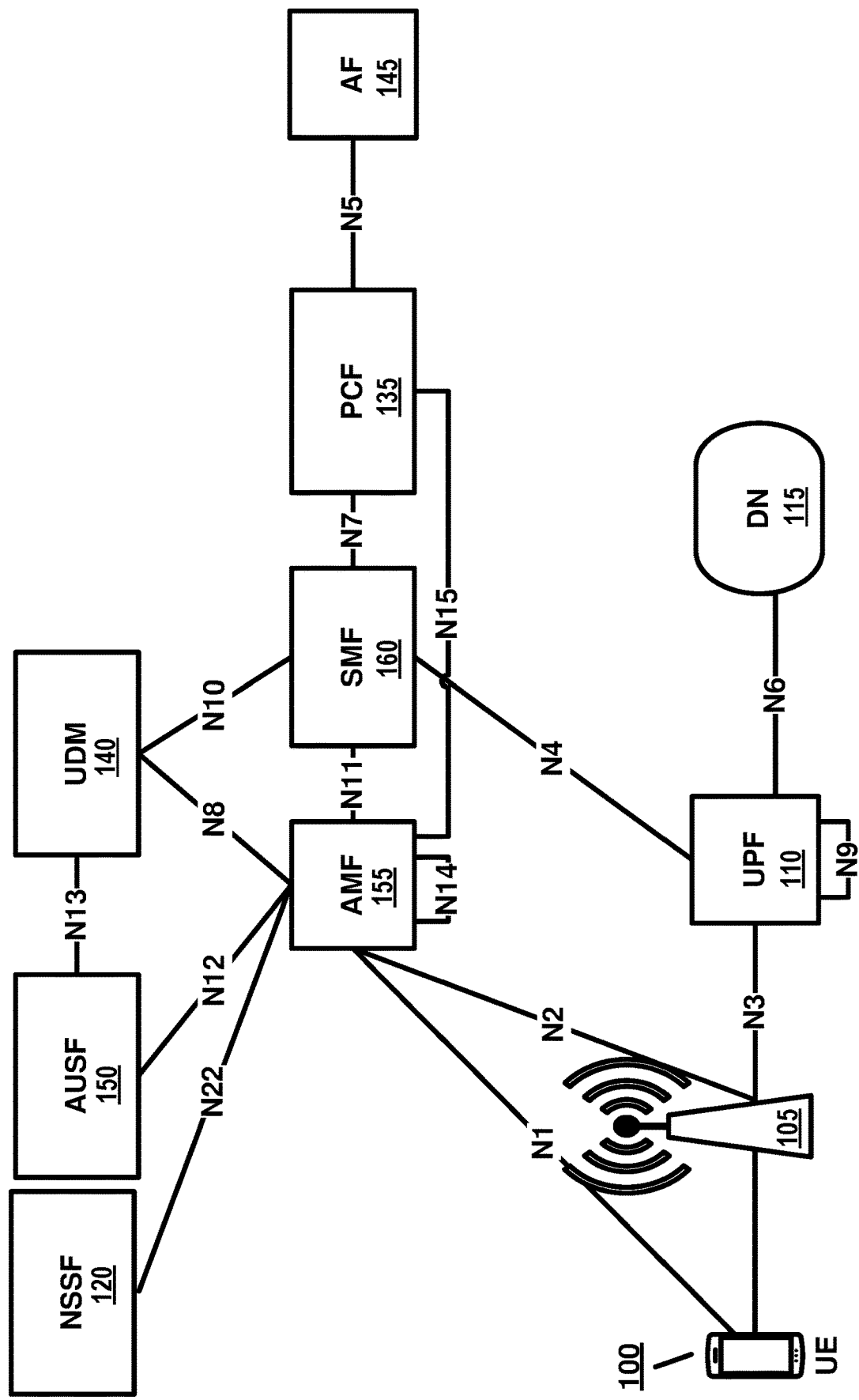
FIG. 2 is a diagram of an example 5G System architecture as per an aspect of an embodiment of the present disclosure.

The following acronyms are used throughout the present disclosure:

5G 5th generation mobile networks
5GC 5G Core Network
5GS 5G System
5G-AN 5G Access Network
5QI 5G QoS Indicator
AF Application Function
AMF Access and Mobility Management Function
AN Access Network
ARP Allocation and Retention Priority
CDR Charging Data Record
CCNF Common Control Network Functions
CN Core Network
CP Control Plane
DL Downlink
DN Data Network
DN-AAA Data Network Authentication Authorization and Accounting
DNN Data Network Name
ESP Encapsulating Security Payload
gNB NR NodeB
IETF Internet Engineering Task Force
IP Internet Protocol
L2 Layer 2 (data link layer)
L3 Layer 3 (network layer)
LADN Local Area Data Network
LI Lawful Intercept
MICO Mobile Initiated Connection Only
MME Mobility Management Entity
N3IWF Non-3GPP InterWorking Function
NAI Network Access Identifier
NAS Non Access Stratum
NEF Network Exposure Function
NF Network Function
NG-RAN NR Radio Access Network
NR New Radio
NRF Network Repository Function
NSI Network Slice Instance
NSSAI Network Slice Selection Assistance Information
NSSF Network Slice Selection Function
OCS Online Charging System
OFCS Offline Charging System
PCC Policy and Charging Control
PCF Policy Control Function
PD Packet Data Unit
PDCP Packet Data Convergence Protocol
RB Radio Bearer RFC Request For Comments
RLC Radio Link Control
ROHC RObust Header Compression
RRC Radio Resource Control
PEI Permanent Equipment Identifier
PLMN Public Land Mobile Network
RAN Radio Access Network
QFI QoS Flow Identity
RM Registration Management
SBA Service Based Architecture
SCM Security Context Management
SDAP Service Data Adaptation Protocol
SDU Service Data Unit
SEA Security Anchor Function
SMF Session Management Function
SMSF SMS Function
SN Sequence Number
S-NSSAI Single Network Slice Selection Assistance information
SRB Signaling Radio Bearer carrying control plane data
SUPI Subscriber Permanent Identifier
TCP Transmission Control Protocol
UDM Unified Data Management
UDP User Datagram Protocol
UE User Equipment
UL Uplink
UL CL Uplink Classifier
UPF User Plane Function Example FIG. 1 and FIG. 2 depict a 5G system comprising of access networks and 5G core network. An example 5G access network may comprise an access network connecting to a 5G core network. An access network may comprise a NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces are employed for communication among the functional elements and/or network elements.

Figure 3:
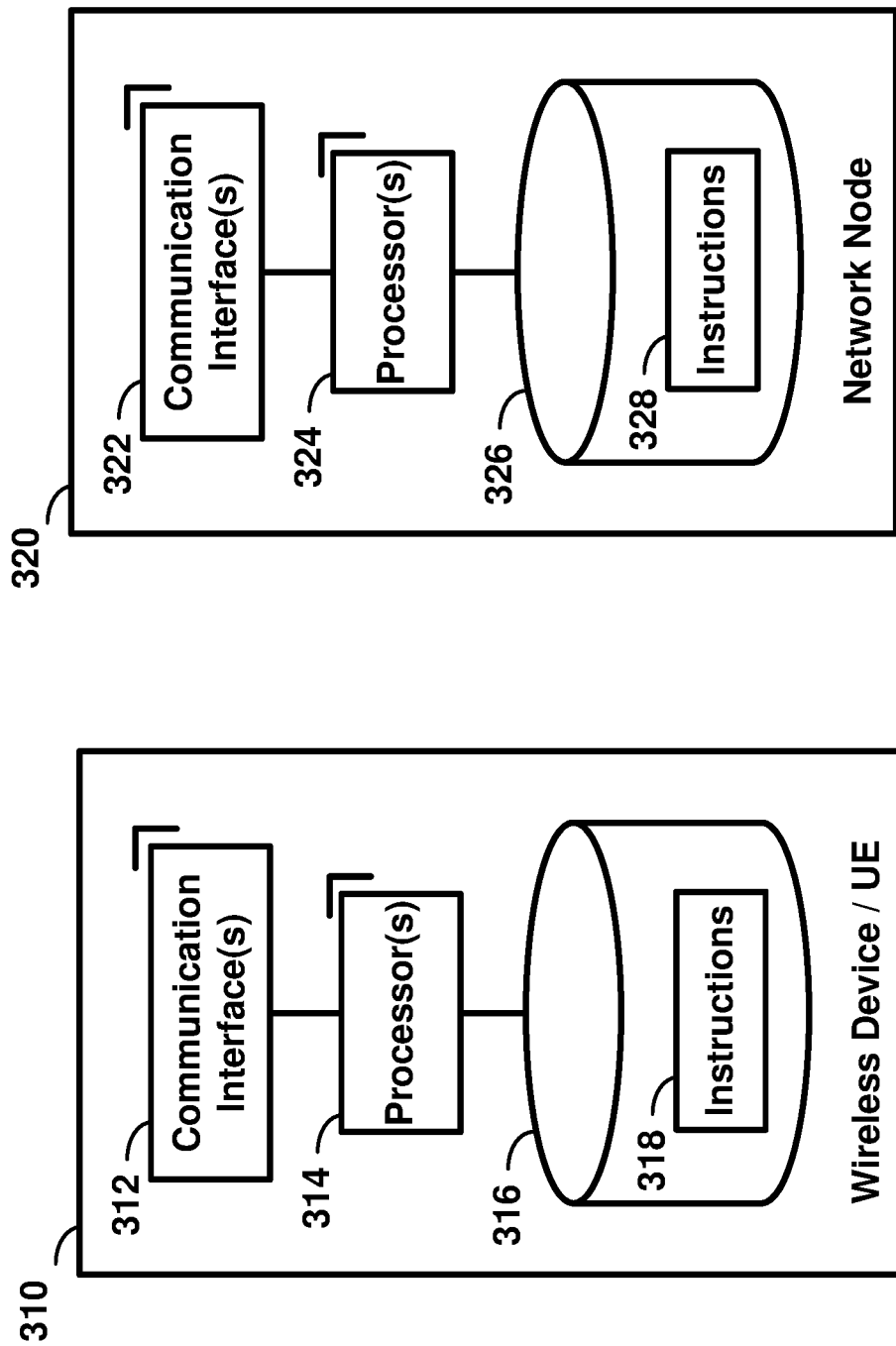
FIG. 3 is a system diagram of an example wireless device and a network node in a 5G system as per an aspect of an embodiment of the present disclosure.
Figure 4:
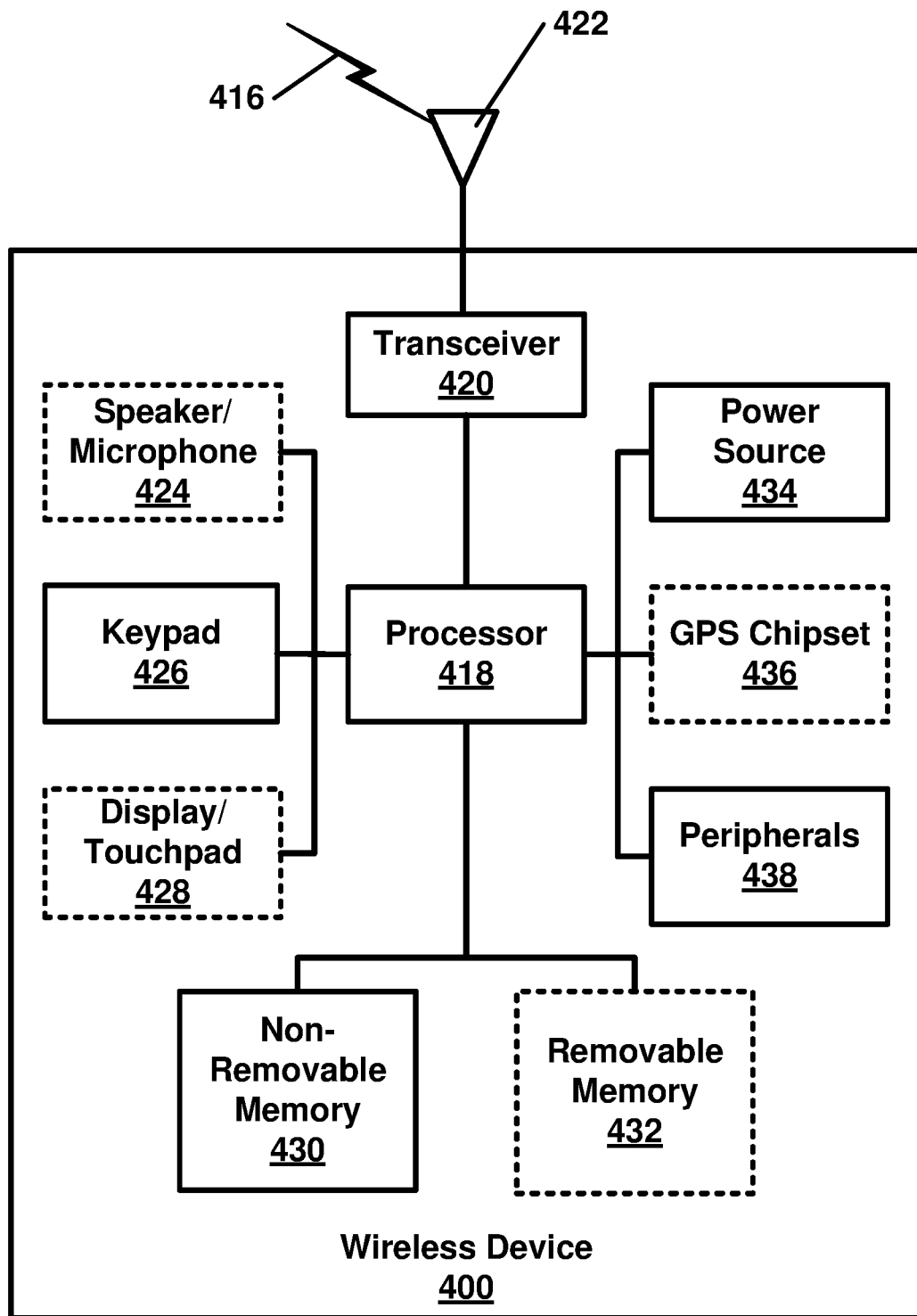
FIG. 4 is a system diagram of an example wireless device as per an aspect of an embodiment of the present disclosure.

A network function may be a processing function in a network, which has a functional behavior and interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

Access and mobility management function, AMF 155, may include the following functionalities (some of the AMF functionalities may be supported in a single instance of an AMF 155): termination of RAN CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys.

The AMF 100 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP and non-3GPP accesses 105, 165 simultaneously, support of a coordinated RM context valid over 3GPP and non 3GPP accesses 105, 165, support of CM management contexts for the UE 100 for connectivity over non-3GPP access. Some of functionalities described above may be supported in an instance of a network slice.

In an example, an AMF 155 region may comprise of one or multiple AMF 100 sets. AMF 155 set comprises of some AMFs 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that has been provisioned in a UE 100. DN 115 access identifier (DNAI), for a DNN, may be an identifier of a user plane access to a DN 115. Initial registration may be related to a UE 100 registration in RM-DEREGISTERED 500, 520 state. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

The session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115. One or more of functionalities described above may be required to be supported in an instance of a network slice.

The user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering and downlink data notification triggering. One or more of functionalities described above may be supported in an instance of a network slice.

The UE 100 IP address management may include allocation and release of the UE 100 IP address as well as renewal of the allocated IP address, where applicable. The UE 100 sets the requested PDU type during the PDU session establishment procedure based on its IP stack capabilities and configuration. In an example, the SMF 160 may select PDU type of a PDU session as follows: If the SMF 160 receives a request with PDU type set to IP, the SMF 160 may select either PDU type IPv4 or IPv6 based on DNN configuration and operator policies. A SMF 160 may provide a cause value to the UE 100 to indicate whether the other IP version is supported on the DNN. If the other IP version is supported, UE 100 may request another PDU Session to the same DNN for the other IP version. If the SMF 160 receives a request for PDU type IPv4 or IPv6 and the requested IP version is supported by the DNN the SMF selects the requested PDU type.

In an example embodiment, the 5GC elements and UE 100 support the following mechanisms: during PDU session establishment procedure, the SMF 160 may send the IP address to the UE 100 via SM NAS signaling. The IPv4 address allocation and/or IPv4 parameter configuration via DHCPv4 may be employed once PDU session is established. IPv6 prefix allocation may be supported via IPv6 stateless autoconfiguration, if IPv6 is supported. IPv6 parameter configuration via stateless DHCPv6 may be supported.

The 5GC may support the allocation of a static IPv4 address and/or a static IPv6 prefix based on subscription information in the UDM 140 or based on the configuration on a per-subscriber, per-DNN basis.

User plane function(s) (UPF(s) 110) may handle the user plane path of PDU sessions. A UPF 110 that provides the interface to a data network supports the functionality of a PDU session anchor.

The policy control function, PCF 135, may support unified policy framework to govern network behavior, provide policy rules to control plane function(s) to enforce them, implement a front end to access subscription information relevant for policy decisions in a user data repository (UDR).

The network exposure function, NEF 125, may provide a means to securely expose the services and capabilities provided by the 3GPP network functions, translate between information exchanged with the AF 145 and information exchanged with the internal network functions, receive information from other network functions.

The NF repository function, NRF 130 may support service discovery function that receives NF discovery request from NF instance, provide the information of the discovered NF instances (be discovered) to the NF instance, and maintain the information of available NF instances and their supported services.

The unified data management, UDM 140, may comprise of the application front end (FE) that includes the UDM-FE that is in charge of processing credentials, location management, subscription management and the PCF 135 in charge of policy control; and the user data repository, UDR, that stores data required for functionalities provided by UDM-FE, plus policy profiles required by the PCF 135.

The NSSF may support selecting the set of network slice instances serving the UE 100, determining the Allowed NSSAI, determining the AMF 155 set to be employed to serve the UE 100, and/or, based on configuration, determining a list of candidate AMF(s) 155, possibly by querying the NRF 130.

The data stored in the UDR include at least user subscription data, including at least subscription identifiers, security credentials, access and mobility related subscription data and/or session related subscription data and/or policy data.

The AUSF 150 may support authentication server function (AUSF). The functionality of N3IWF 170 in case of untrusted non-3GPP access 165 may include at least one or more of the following: support of IPsec tunnel establishment with the UE; The N3IWF 170 may terminate the IKEv2/IPsec protocols with the UE 100 over NWu and may relay over N2 the information needed to authenticate the UE 100 and authorize its access to the 5G core network; Termination of N2 and N3 interfaces to 5G Core Network for Control-Plane and user-plane respectively; Relaying uplink and downlink control-plane NAS (N1) signaling between the UE 100 and AMF 155; Handling of N2 signaling from SMF 160 (relayed by AMF 155) related to PDU sessions and QoS; Establishment of IPsec Security Association (IPsec SA) to support PDU session traffic; Relaying uplink and downlink user-plane packets between the UE 100 and UPF 110; Enforcing QoS corresponding to N3 packet marking, considering QoS requirements associated to such marking received over N2; N3 user-plane packet marking in the uplink; and/or local mobility anchor within untrusted non-3GPP access networks 165 using MOBIKE; Supporting AMF 155 selection.

The application function, AF 145, may interact with the 3GPP core network to provide services. Based on operator deployment, application functions may be trusted by the operator to interact directly with relevant network functions. Application functions not allowed by the operator to access directly the network functions may use the external exposure framework (via the NEF 125) to interact with relevant network functions.

The control plane interface between the (R)AN 105 and the 5G core may support connection of multiple different kinds of AN(s) (e.g. 3GPP RAN 105, N3IWF 170 for Untrusted access 165) to the 5GC via a unique control plane protocol. A single N2 AP protocol may be employed for both the 3GPP access 105 and non-3GPP access 165; and decoupling between AMF 155 and other functions such as SMF 160 that may need to control the services supported by AN(s) (e.g. control of the UP resources in the AN 105 for a PDU session).

The 5GC may be able to provide policy information from the PCF 135 to the UE 100. Such policy information may include but not limited to the following: access network discovery & selection policy, UE 100 route selection policy (URSP) that groups to or more of SSC mode selection policy (SSCMSP), network slice selection policy (NSSP), DNN selection policy, and non-seamless offload policy.

The 5G core network may support the connectivity of a UE 100 via non-3GPP access networks 165. As shown in example FIG. 5, the registration management, RM may be employed to register or de-register a UE/user 100 with the network, and establish the user context in the network. Connection management may be employed to establish and release the signaling connection between the UE 100 and the AMF 155.

A UE 100 may need to register with the network to receive services that require registration. Once registered and if applicable the UE 100 may update its registration with the network periodically in order to remain reachable (periodic registration update); or upon mobility (mobility registration update); or to update its capabilities or re-negotiate protocol parameters.

Figure 8A:
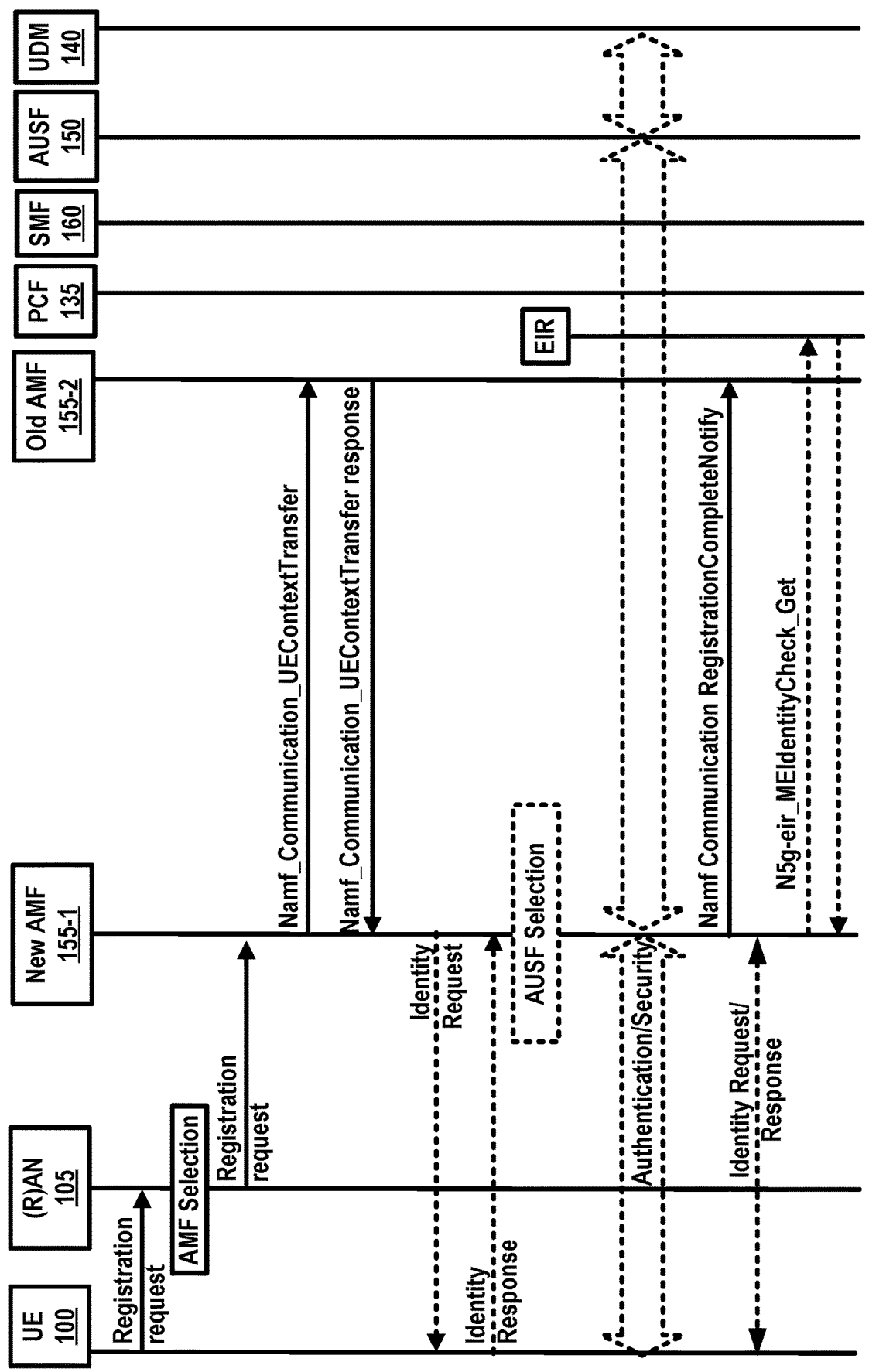
FIG. 8A and FIG. 8B are example call flow diagrams of a registration procedure as per an aspect of an embodiment of the present disclosure.
Figure 8B:
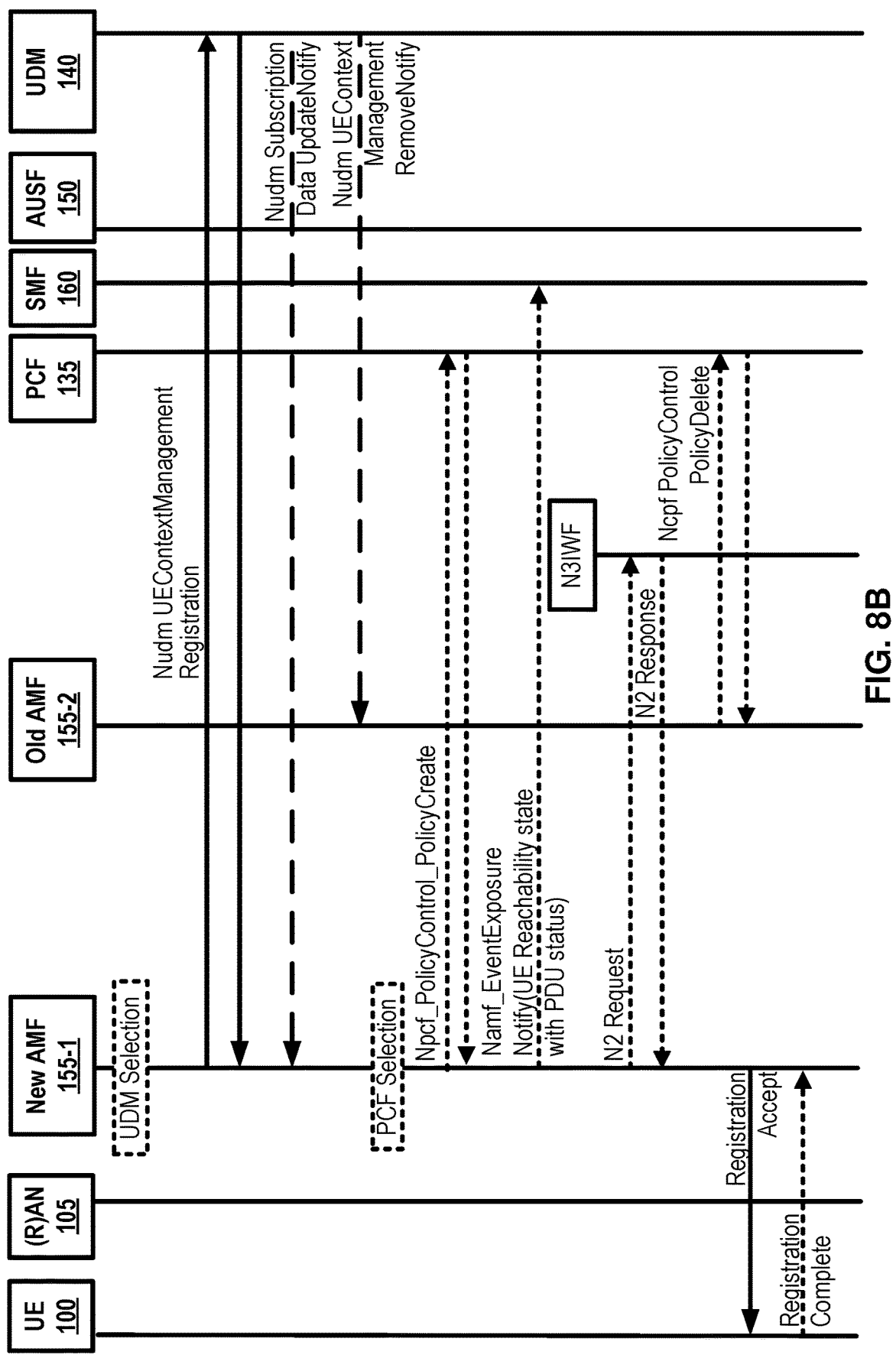

The initial registration procedure as depicted in example FIG. 8A and FIG. 8B may involve execution of network access control functions (e.g. user authentication and access authorization based on subscription profiles in UDM 140). As result of the registration procedure, the identity of the serving AMF 155 may be registered in UDM 140.

The registration management, RM procedures may be applicable over both 3GPP access 105 and non 3GPP access 165.

Figure 5:
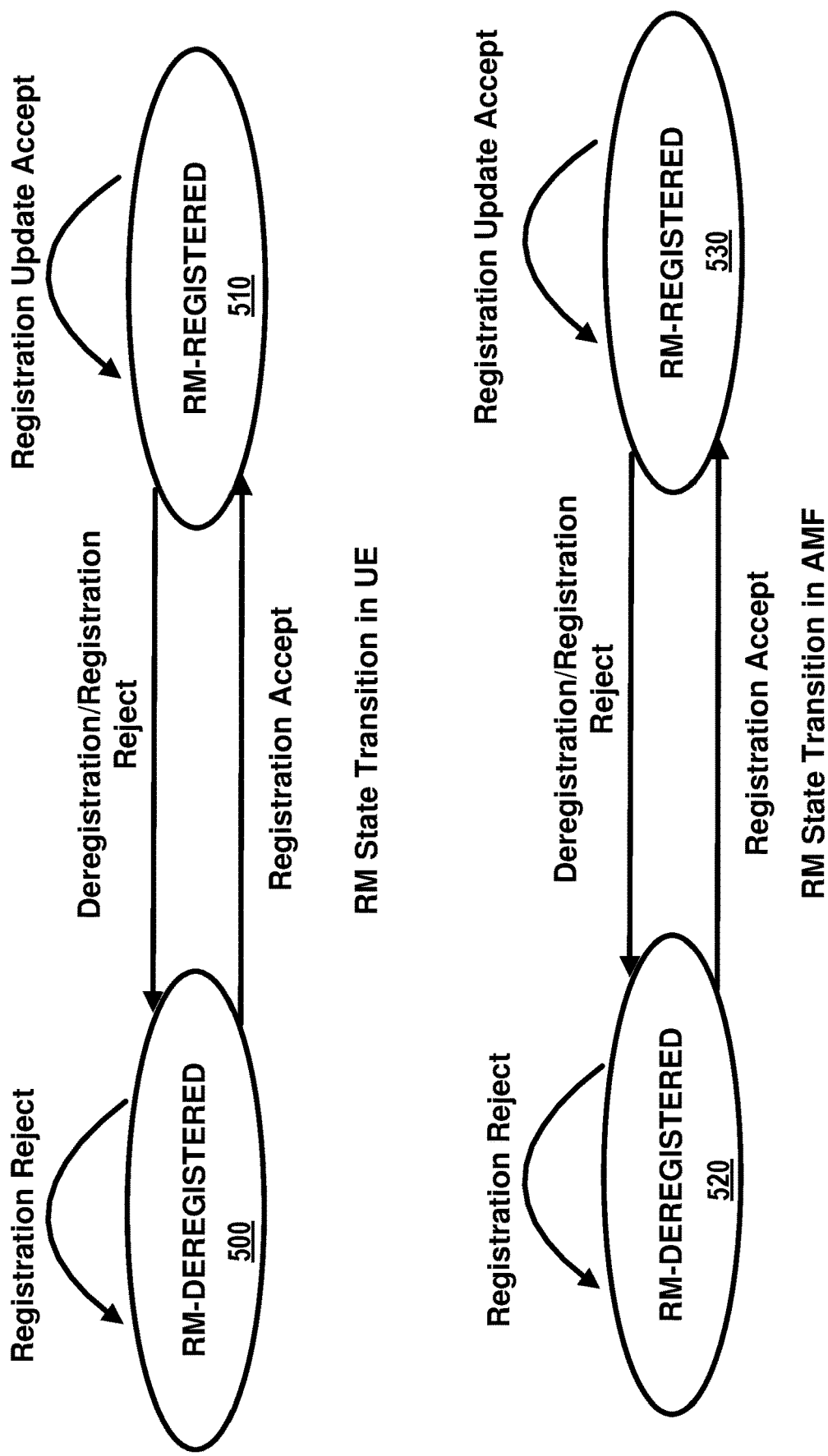
FIG. 5 is a diagram of two registration management state models as per an aspect of an embodiment of the present disclosure.

An example FIG. 5 depicts the RM states of a UE 100 as observed by the UE 100 and AMF 155. In an example embodiment, two RM states may be employed in a UE 100 and the AMF 155 that reflect the registration status of the UE 100 in the selected PLMN: RM-DEREGISTERED 500, and RM-REGISTERED 510. In the RM DEREGISTERED state 500, the UE 100 may not be registered with the network. The UE 100 context in AMF 155 may not hold valid location or routing information for the UE 100 so the UE 100 is not reachable by the AMF 155. Some UE 100 context may still be stored in the UE 100 and the AMF 155. In the RM REGISTERED state 510, the UE 100 may be registered with the network. In the RM-REGISTERED 510 state, the UE 100 may receive services that require registration with the network.

In an example embodiment, two RM states may be employed in AMF 155 for a UE 100 that reflect the registration status of the UE 100 in the selected PLMN: RM-DEREGISTERED 520, and RM-REGISTERED 530.

Figure 6:
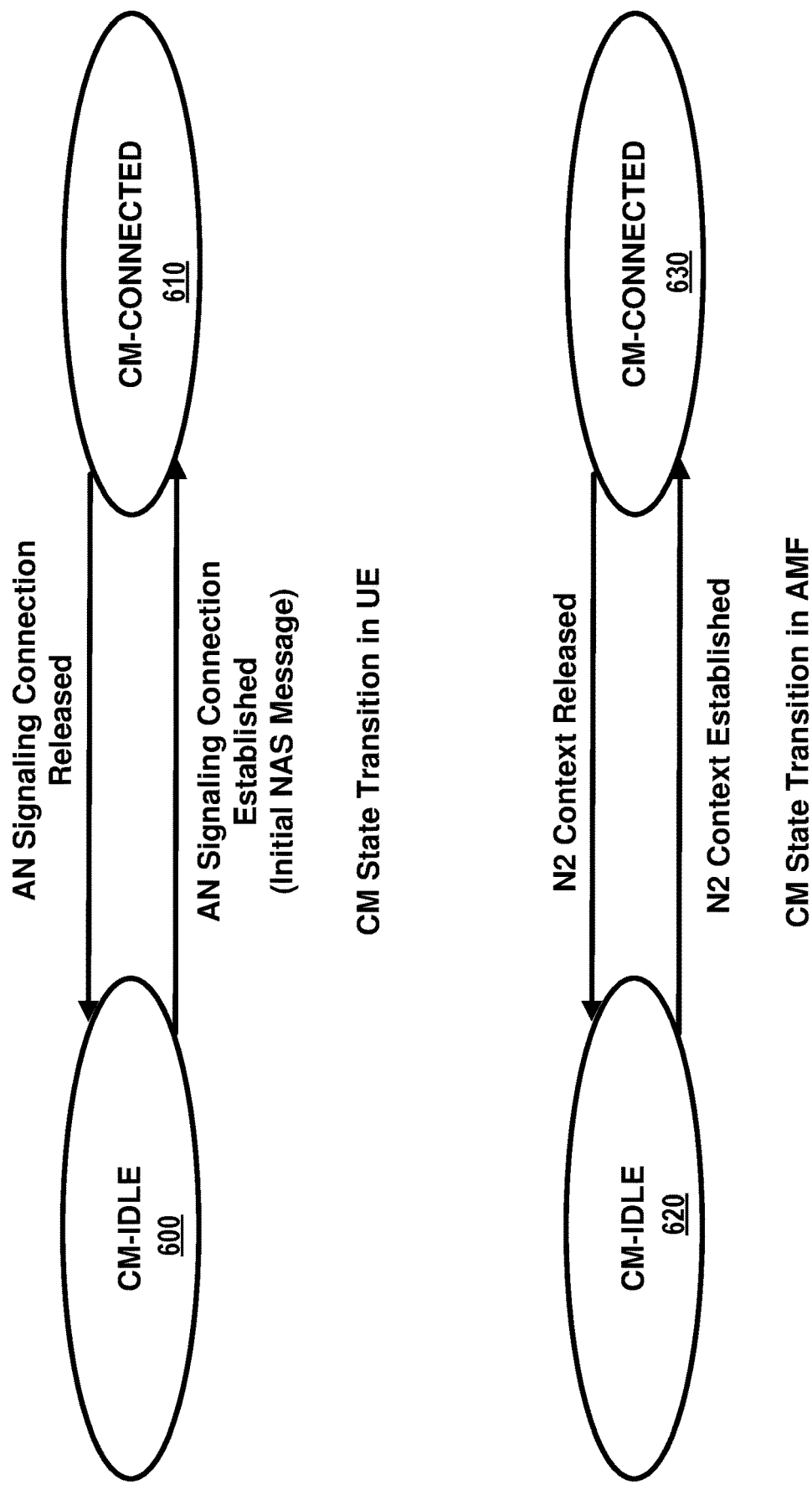
FIG. 6 is a diagram of two connection management state models as per an aspect of an embodiment of the present disclosure.

As shown in example FIG. 6, connection management, CM, may comprise the functions of establishing and releasing a signaling connection between a UE 100 and the AMF 155 over N1. This signaling connection may be employed to enable NAS signaling exchange between the UE 100 and a core network. It comprises both the AN signaling connection between the UE 100 and the (R)AN 105 (e.g. RRC connection over 3GPP access) and the N2 connection for this UE 100 between the AN and the AMF 155.

As depicted in example FIG. 6, two CM states may be employed for the NAS signaling connectivity of the UE 100 with the AMF 155, CM-IDLE 600, 620 and CM-CONNECTED 610, 630. A UE 100 in CM-IDLE 600 state is in RM-REGISTERED 510 state and has no NAS signaling connection established with the AMF 155 over N1. The UE 100 may perform cell selection, cell reselection and PLMN selection. A UE 100 in CM-CONNECTED 610 state has a NAS signaling connection with the AMF 155 over N1.

In an example embodiment two CM states may be employed for a UE 100 at the AMF 155, CM-IDLE 620 and CM-CONNECTED 630.

RRC inactive state may apply to NG-RAN (e.g. it applies to NR and E-UTRA connected to 5G CN). The AMF 155, based on network configuration, may provide assistance information to the NG RAN 105, to assist the NG RAN's 105 decision whether the UE 100 is sent to RRC inactive state. When a UE 100 is CM-CONNECTED 610 with RRC inactive state, the UE 100 may resume the RRC connection due to uplink data pending; Mobile initiated signaling procedure; As a response to RAN 105 paging; Notifying the network that it has left the RAN 105 notification area.

NAS signaling connection management may include the functions of establishing and releasing a NAS signaling connection. NAS signaling connection establishment function may be provided by the UE 100 and the AMF 155 to establish a NAS signaling connection for a UE 100 in CM-IDLE 600 state. The procedure of releasing a NAS signaling connection may be initiated by the 5G (R)AN 105 node or the AMF 155.

Reachability management of UE 100 may detect whether a UE 100 is reachable and providing UE 100 location (e.g. access node) for the network to reach the UE 100. This may be done by paging UE 100 and UE 100 location tracking. The UE 100 location tracking may include both UE 100 registration area tracking and UE 100 reachability tracking. Such functionalities may be either located at 5GC (in case of CM-IDLE 620 state) or NG-RAN 105 (in case of CM-CONNECTED 630 state). The UE 100 and the AMF 155 may negotiate UE 100 reachability characteristics in CM-IDLE 600, 620 state during registration and registration update procedures.

Two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between a UE 100 and a data network identified by a DNN. The PDU connectivity service may be supported via PDU sessions that are established upon request from the UE 100.

A PDU session may support one or more PDU session types. PDU sessions may be established (e.g. upon UE 100 request), modified (e.g. upon UE 100 and 5GC request) and released (e.g. upon UE 100 and 5GC request) using NAS SM signaling exchanged over N1 between the UE 100 and the SMF 160. Upon request from an application server, the 5GC may be able to trigger a specific application in the UE 100. When receiving that trigger message, the UE 100 may pass it to the identified application in the UE 100. The identified application in the UE 100 may establish a PDU session to a specific DNN.

Figure 7:
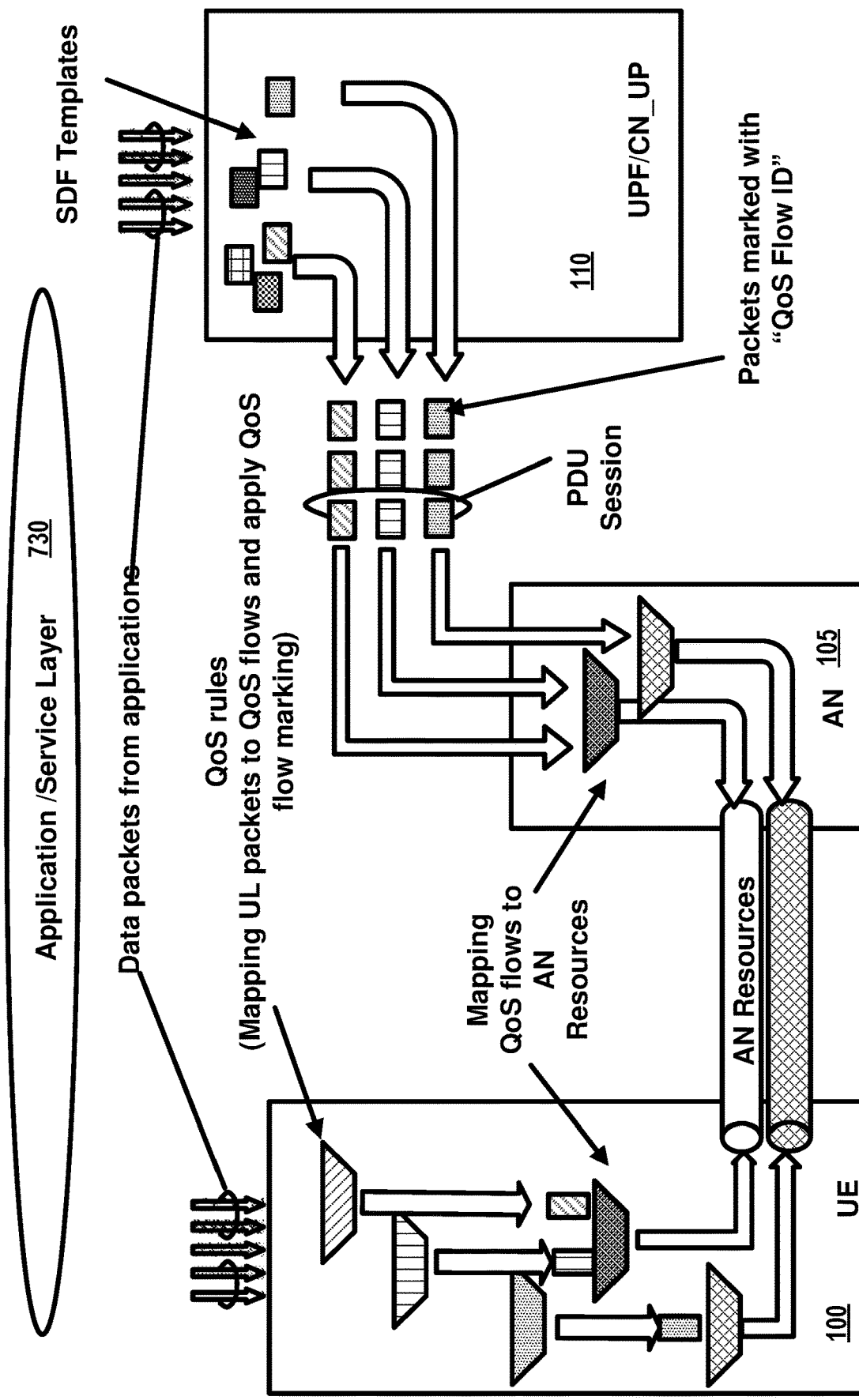
FIG. 7 is diagram of classification and marking traffic as per an aspect of an embodiment of the present disclosure.

The 5G QoS model may support a QoS flow based framework as shown in example FIG. 7. The 5G QoS model may support both QoS flows that require a guaranteed flow bit rate and QoS flows that may not require a guaranteed flow bit rate. The 5G QoS model may support reflective QoS. The QoS model may comprise flow mapping or packet marking at the UPF (CN_UP) 110, AN 105 and/or UE 100. Packets may arrive from and/or destined to the application/service layer 730 of UE 100, UPF (CN_UP) 110, and/or the AF 145.

QoS flow may be a granularity of QoS differentiation in a PDU session. A QoS Flow ID, QFI, may be employed to identify a QoS flow in the 5G system. User plane traffic with the same QFI within a PDU session may receive the same traffic forwarding treatment. The QFI may be carried in an encapsulation header on N3 (and N9) e.g. without any changes to the end-to-end packet header. It may be applied to PDUs with different types of payload. The QFI may be unique within a PDU session.

The QoS parameters of a QoS flow may be provided to the (R)AN as a QoS profile over N2 at PDU session or at QoS flow establishment and when NG-RAN is used at every time the user plane is activated. A default QoS rule may be required for every PDU session. The SMF 160 may allocate the QFI for a QoS flow and may derive its QoS parameters from the information provided by the PCF. When applicable, the SMF 160 may provide the QFI together with the QoS profile containing the QoS parameters of a QoS flow to the (R)AN 105.

5G QoS flow may be a granularity for QoS forwarding treatment in a 5G system. Traffic mapped to the same 5G QoS flow may receive the same forwarding treatment (e.g. scheduling policy, queue management policy, rate shaping policy, RLC configuration, and/or the like). Providing different QoS forwarding treatment may require separate 5G QoS flow.

A 5G QoS indicator may be a scalar that is employed as a reference to a specific QoS forwarding behavior (e.g. packet loss rate, packet delay budget) to be provided to a 5G QoS flow. This may be implemented in the access network by the 5QI referencing node specific parameters that control the QoS forwarding treatment (e.g. scheduling weights, admission thresholds, queue management thresholds, link layer protocol configuration, and/or the like).

5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. This may be based on the UE's 100 subscription data, UE 100 location, the information from application function AF 145, policy or other related traffic rules. The 5G core network may expose network information and capabilities to an edge computing application function. The functionality support for edge computing may include local routing where the 5G core network may select UPF 110 to route the user traffic to the local data network, traffic steering where the 5G core network selects the traffic to be routed to the applications in the local data network, session and service continuity to enable UE 100 and application mobility, user plane selection and reselection, e.g. based on input from application function, network capability exposure where 5G core network and application function may provide information to each other via NEF, QoS and charging where PCF may provide rules for QoS control and charging for the traffic routed to the local data network, support of local area data network where 5G core network may provide support to connect to the LADN in a certain area where the applications are deployed.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

PDU connectivity service may provide exchange of PDUs between a UE 100 and a data network. PDU session may be an association between a UE 100 and a data network, DN, that provides a PDU connectivity service. The type of association may be IP, or Ethernet or unstructured.

Establishment of user plane connectivity to a data network via a network slice instance(s) comprises of at least two steps. Performing a RM procedure to select an AMF 155 that supports the required network slices, and establishing one or more PDU session(s) to the required data network via the network slice instance(s).

The set of network slices for a UE 100 may be changed at any time while the UE 100 is registered with a network, and may be initiated by the network, or the UE 100.

A periodic registration update may be UE 100 re-registration at expiry of a periodic registration timer. A requested NSSAI is a NSSAI that the UE 100 may provide to the network. A service based interface may represent how a set of services is provided/exposed by a given NF.

A service continuity may be an uninterrupted user experience of a service, including the cases where the IP address and/or anchoring point change. A session continuity may refer to continuity of a PDU session. For PDU session of IP type session continuity may imply that the IP address is preserved for the lifetime of the PDU session. An uplink classifier may be a UPF functionality that aims at diverting uplink traffic, based on filter rules provided by SMF, towards data network.

The 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

A 5G system may reduce dependencies between the access network (AN) and the core network (CN). The architecture may comprise a converged access-agnostic core network with a common AN-CN interface which integrates different 3GPP and non-3GPP access types.

A 5G system furthermore may support a unified authentication framework, stateless NFs, where the compute resource is decoupled from the storage resource, capability exposure, and concurrent access to local and centralized services. To support low latency services and access to local data networks, UP functions may be deployed close to the access network.

A 5G system may support roaming with both home routed traffic as well as local breakout traffic in the visited PLMN. An example 5G architecture may be service-based and the interaction between network functions may be represented in two ways. (1) FIG. 1 is an example service-based representation, where network functions within the control plane, may enable other authorized network functions to access their services. This representation may include point-to-point reference points where necessary. (2) FIG. 2 is an example reference point representation, showing the interaction between the NF services in the network functions described by point-to-point reference point (e.g. N11) between any two network functions.

The type of PDU Session supported by 5G may comprise IPv4, IPv6, Ethernet, Unstructured, and/or the like. Ethernet may be a family of computer networking technologies commonly used in local area networks (LAN), metropolitan area networks (MAN) and wide area networks (WAN). A data packet on an Ethernet link may be called an Ethernet packet, which transports an Ethernet frame as its payload. As shown in FIG. 9, an Ethernet frame may be preceded by a preamble and start frame delimiter (SFD), which may be both part of the Ethernet packet at the physical layer. An Ethernet frame may start with an Ethernet header, which contains destination and source MAC addresses as its first two fields. The middle section of the frame may be payload data including any headers for other protocols (for example, Internet Protocol) carried in the frame. The frame ends with a frame check sequence (FCS), which is a 32-bit cyclic redundancy check used to detect any in-transit corruption of data.

For a PDU session set up with the Ethernet PDU session type, the SMF and the UPF acting as PDU session anchor may support specific behaviors related with the fact the PDU session carries Ethernet frames. Neither a MAC nor an IP address may be allocated by the 5GC to the UE for this PDU session. The UPF may store the MAC addresses, received from the UE, and associate those with the appropriate PDU session.

The UE may operate in bridge mode with regard to a LAN it is connecting to the 5GS, thus different MAC addresses may be used as source address of different frames sent UL over a single PDU session (and destination MAC address of different frames sent DL over the same PDU session). Entities on the LAN connected to the 5GS by the UE may be allocated an IP address by the DN which may not be specified by 3GPP 5G specifications. Only the UE may be connected to the 5GS may be authenticated, not the devices behind such UE.

Different Frames exchanged on a PDU session of Ethernet type may be served with different QoS over the 5GS. Thus, the SMF may provide to the UPF traffic filters based on the Ethernet frame structure.

Figure 10:
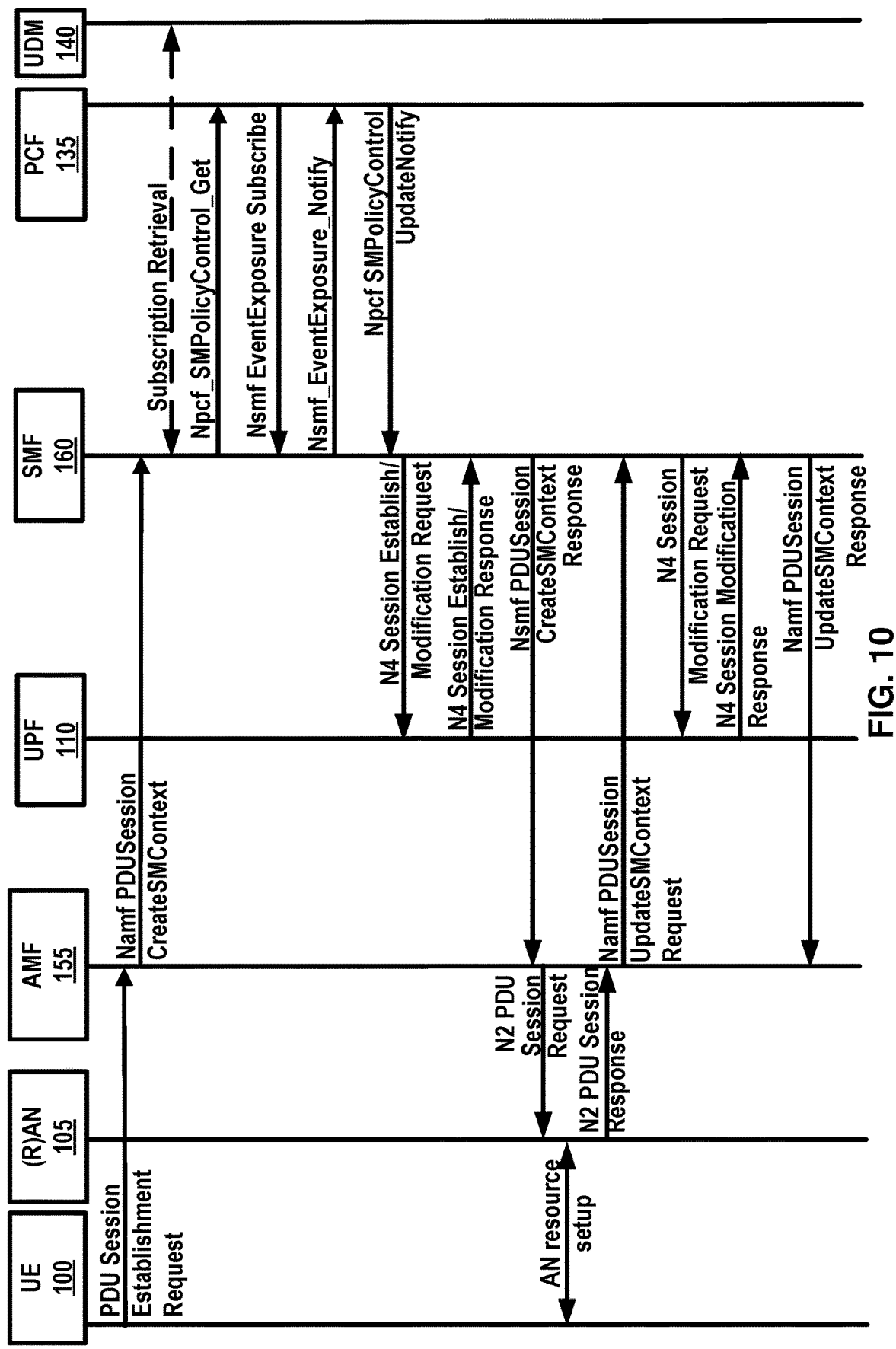
FIG. 10 is an example diagram depicting a requested PDU session Establishment as per an aspect of an embodiment of the present disclosure.

For Ethernet PDU session type, the packet filter set may support packet filtering based on at least any combination of: a source/destination MAC address; Ethertype as defined, for example, in IEEE 802.3; a customer-VLAN tag (C-TAG) and/or Service-VLAN tag (S-TAG) VID fields as defined, for example, in IEEE 802.1Q; a customer-VLAN tag (C-TAG) and/or Service-VLAN tag (S-TAG) PCP/DEI fields as defined, for example, in IEEE 802.1Q, an IP Packet Filter Set, and/or the like. With respect to an IP Packet Filter Set, in the case that the Ethertype indicates a IPv4/IPv6 payload, the IP Packet Filter Set may comprise one or more of the following information element(s): a source/destination IP address or IPv6 prefix; a source/destination port number; a protocol ID of the protocol above IP/Next header type; a Type of Service (TOS) (IPv4)/Traffic class (IPv6) and Mask; a Flow Label (IPv6); a Security parameter index; and/or the like FIG. 10 is an example diagram depicting UE requested PDU session Establishment may comprise one or more actions. According to an example action, UE 100 may send to AMF 155, for example, an NAS Message (S-NSSAI, DNN, PDU Session ID, Request type, N1 SM container (PDU Session Establishment Request)). The UE 100 may initiate the UE requested PDU session establishment procedure by the transmission of a NAS message containing a PDU session establishment request within the N1 SM container. The PDU session establishment request may include a PDU Type (e.g. Ethernet), SSC mode, Protocol Configuration Options, and a PDU session ID generated by the UE. Another action may comprise the AMF 155 selecting an SMF 160, and sending to the SMF 160 a message: Nsmf_PDUSession_CreateSMRequest (SUPI, DNN, S-NSSAI, PDU Session ID, AMF ID, Request Type, N1 SM container (PDU Session Establishment Request), User location information, Access Type, PEI). According to another example action, if the SMF 160 has not yet registered and subscription data is not available, the SMF 160 may register with the UDM 140, retrieve subscription data and subscribes to be notified when subscription data is modified. If the SMF 160 needs perform secondary authorization/authentication during the establishment of the PDU session by a DN-AAA server, the SMF 160 may select an UPF and triggers the PDU session establishment authentication/authorization. According to another example action, if dynamic PCC is deployed, the SMF 160 may perform PCF selection. If dynamic PCC is not deployed, the SMF 160 may apply local policy. The SMF 160 may invoke, for example, the Npcf_SMPolicyControl_Get operation to establish a PDU Session with the PCF 135 and get the default PCC Rules for the PDU Session. According to another example action, the PCF 135 may subscribe the event (s) in the SMF 160 by invoking, for example, the Nsmf_EventExposure_Subscribe operation. According to another example action, the SMF 160 may invoke, for example, the Nsmf_EventExposure_Notify service operation to report some events to the PCF 135 that has previously subscribed. According to another example action, the PCF 135 may provide updated policies to the SMF 160 by invoking, for example, the Npcf_SMPolicyControl_UpdateNotify service operation. The PCF 135 may provide authorized Session-AMBR and the authorized 5QI/ARP to SMF 160.

According to another example action, if the Request Type indicates "initial request" and PDU session establishment authentication/authorization was not performed, the SMF 160 may initiate an N4 session establishment procedure with the selected UPF 110, otherwise it may initiate an N4 session modification procedure with the selected UPF 110: The SMF 160 sends an N4 session establishment/modification Request to the UPF 110 and provides packet detection, enforcement and reporting rules to be installed on the UPF 110 for this PDU Session. If CN Tunnel Info is allocated by the SMF 160, the CN Tunnel Info may be provided to UPF 110 in this step.

According to another example action, the UPF 110 may acknowledge SMF 160 by sending an N4 session establishment/modification response. If CN Tunnel Info is allocated by the UPF 110, the CN Tunnel Info may be provided to SMF 160 in this step.

According to another example action, SMF 160 may send to AMF 155, for example, anNsmf_PDUSession_CreateSM Response (Cause, N2 SM information (PDU Session ID, QoS Profile(s), CN Tunnel Info, S-NSSAI, Session-AMBR), N1 SM container (PDU session establishment accept (QoS Rule, SSC mode, S-NSSAI, allocated IPv4 address, Session-AMBR))). The N2 SM information may carry information that the AMF 155 shall forward to the (R)AN 105. The information may comprise CN Tunnel Info corresponding to the Core Network address of the N3 tunnel corresponding to the PDU Session. The information may comprise the QoS Profile provides the (R)AN 105 with the mapping between QoS parameters and QoS Flow Identifiers. Multiple QoS profiles may be provided to the (R)AN 105. The information may comprise the PDU Session ID that may be used by AN signaling with the UE 100 to indicate to the UE 100 the association between AN resource and a PDU Session for the UE.

According to another example action, AMF 155 may send to (R)AN 105, for example, an N2 PDU session request (N2 SM information, NAS message (PDU Session ID, N1 SM container (PDU session establishment accept))). The AMF 155 may send the NAS message containing PDU Session ID and PDU session establishment accept targeted to the UE 100 and the N2 SM information received from the SMF 160 within the N2 PDU session request to the (R)AN 105.

According to another example action between (R)AN 105 to UE 100, the (R)AN 105 may issue AN specific signaling exchange with the UE 100 that is related with the information received from SMF 160. For example, in case of a 3GPP RAN, an RRC connection reconfiguration may take place with the UE 100 establishing the necessary RAN resources related to the QoS Rules for the PDU Session request received in a previous action. (R)AN 105 may allocate (R)AN N3 tunnel information for the PDU Session. (R)AN 105 may forward the NAS message (PDU Session ID, N1 SM container (PDU Session Establishment Accept)) provided to the UE 100. (R)AN 105 may provide the NAS message to the UE 100 if the necessary RAN resources have been established and the allocation of (R)AN tunnel information have been successful.

According to another example action, (R)AN 105 may send to AMF 155, for example, an N2 PDU session response (PDU Session ID, Cause, N2 SM information (PDU Session ID, (R)AN Tunnel Info, list of accepted/rejected QoS profile(s))). The (R)AN Tunnel Info corresponds to the Access Network address of the N3 tunnel corresponding to the PDU Session. According to another example action, AMF 155 to SMF 160: Nsmf_PDUSession_UpdateSMContext Request (N2 SM information). The AMF 155 may forward the N2 SM information received from (R)AN 105 to the SMF 160. According to another example action, if the N4 session for this PDU Session was not established already, the SMF 160 may initiate an N4 session establishment procedure with the UPF 110. Otherwise, the SMF 160 may initiate an N4 session modification procedure with the UPF 110. The SMF 160 provides AN Tunnel Info and CN Tunnel Info. The CN Tunnel Info may need to be provided if the SMF 160 selected CN Tunnel Info.

According to another example action, the UPF 110 may provide a N4 session establishment/modification response to the SMF 160. According to another example action, SMF 160 may send to AMF 155, for example, a Nsmf_PDUSession_UpdateSMContext Response (Cause). After this action, the AMF 155 may forward relevant events to the SMF 160, e.g., at handover where the (R)AN Tunnel Info changes or the AMF is relocated.

Figure 11:
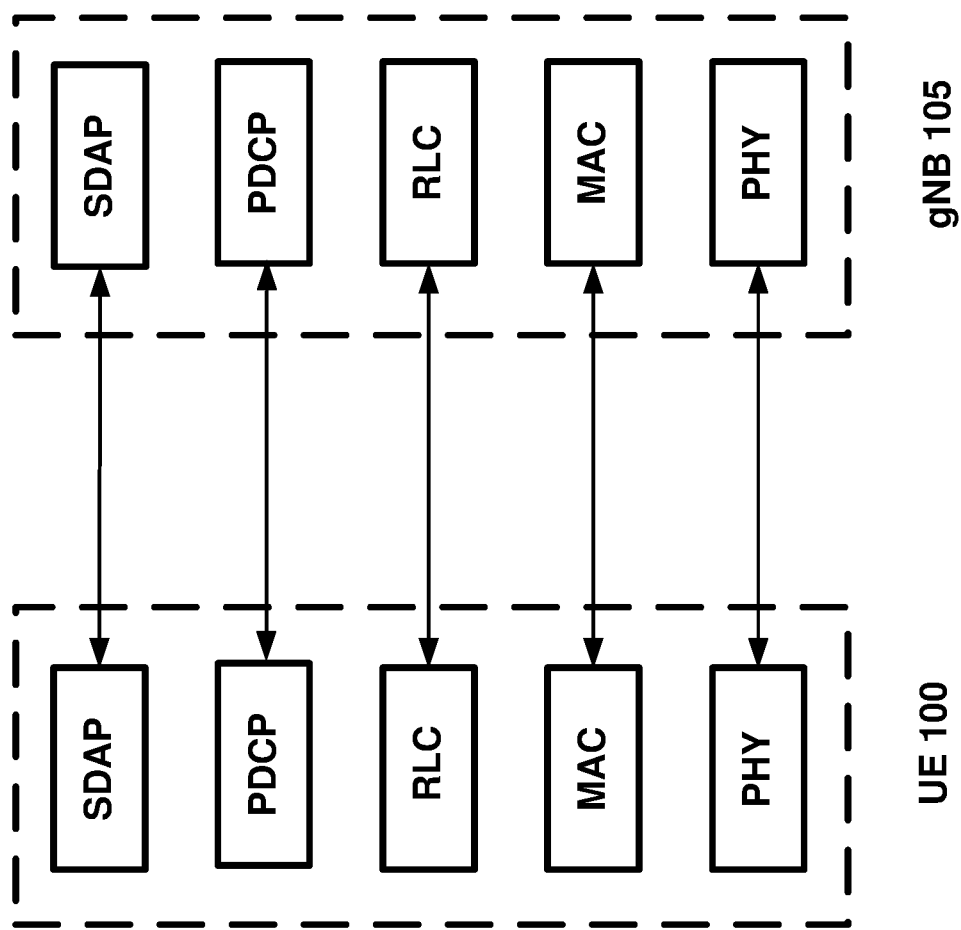
FIG. 11 is an example diagram depicting user plane protocol stack between as per an aspect of an embodiment of the present disclosure.

As shown in FIG. 11, the user plane protocol stack between UE 100 and (R)AN 105 may comprise SDAP, PDCP, RLC, MAC and PHY sublayers. The main services and functions of the PDCP sublayer for the user plane may comprise: sequence numbering; header compression and decompression: e.g. ROHC; transfer of user data; reordering and duplicate detection; PDCP PDU routing (in case of split bearers); retransmission of PDCP SDUs; ciphering, deciphering and integrity protection; PDCP SDU discard; PDCP re-establishment and data recovery for RLC AM; duplication of PDCP PDUs; and/or the like. Services and functions of the PDCP sublayer for the control plane may include: sequence numbering; ciphering, deciphering and integrity protection; transfer of control plane data; duplicate detection; duplication of PDCP PDUs; and/or the like.

For the header compression and decompression function of PDCP sublayer, the header compression protocol may be based on the Robust Header Compression (ROHC) framework (e.g. IETF RFC 5795: "The RObust Header Compression (ROHC) Framework). There may be multiple header compression algorithms, called profiles, defined for the ROHC framework. A profile may be specific to the particular network layer, transport layer or upper layer protocol combination e.g. TCP/IP and RTP/UDP/IP.

The detailed definition of the ROHC channel may be specified as part of the ROHC framework (e.g. IETF RFC 5795). This may include how to multiplex different flows (header compressed or not) over the ROHC channel, as well as how to associate a specific IP flow with a specific context state during initialization of the compression algorithm for that flow.

The implementation of the functionality of the ROHC framework and of the functionality of the supported header compression profiles may not covered in the 3GPP specifications, and the following profiles may be supported by 3GPP 5G specification TS 38.323:

TABLE

| Supported header compression protocols and profiles | | |
| --- | --- | --- |
| Profile Identifier | Usage | Reference |
| 0x0000 | No compression | RFC 5795 |
| 0x0001 | RTP/UDP/IP | RFC 3095, RFC 4815 |
| 0x0002 | UDP/IP | RFC 3095, RFC 4815 |
| 0x0003 | ESP/IP | RFC 3095, RFC 4815 |
| 0x0004 | IP | RFC 3843, RFC 4815 |
| 0x0006 | TCP/IP | RFC 6846 |
| 0x0101 | RTP/UDP/IP | RFC 5225 |
| 0x0102 | UDP/IP | RFC 5225 |
| 0x0103 | ESP/IP | RFC 5225 |
| 0x0104 | IP | RFC 5225 |

The PDCP Data PDU may be used to convey one or more of followings: a PDCP SDU SN; user plane data; control plane data; a MAC-I; and/or the like.

Figure 12:
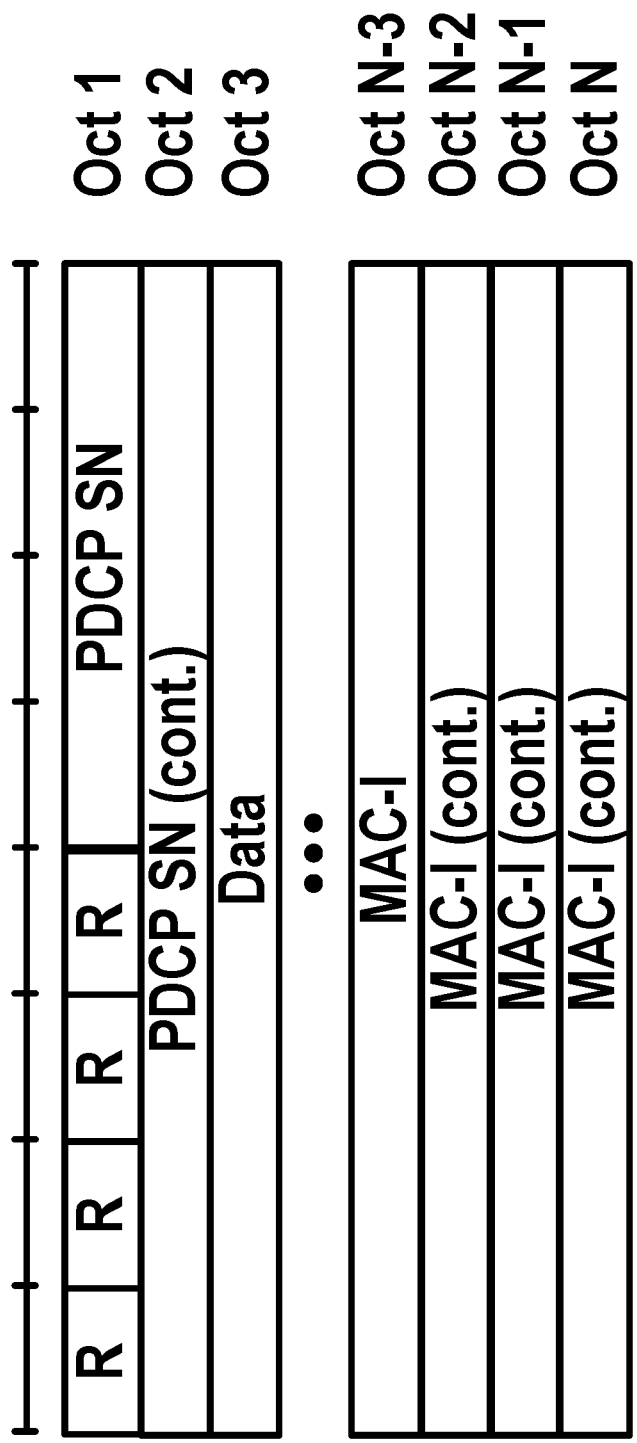
FIG. 12 is an example diagram as per an aspect of an embodiment of the present disclosure.

As shown in FIG. 12, the PDCP Data PDU with 12 bits PDCP SN may be applicable for SRBs. A PDCP PDU is a bit string that is byte aligned (i.e. multiple of 8 bits) in length. In the FIG. 12, bit strings may be represented by tables in which the most significant bit may be the leftmost bit of the first line of the table, the least significant bit may be the rightmost bit on the last line of the table, and more generally the bit string may to be read from left to right and in the reading order of the lines. The bit order of a parameter field within a PDCP PDU may be represented with the first and most significant bit in the leftmost bit and the last and least significant bit in the rightmost bit. PDCP SDUs may comprise bit strings that are byte aligned (i.e. multiple of 8 bits) in length. A compressed or uncompressed SDU may be included into a PDCP Data PDU from the first bit onward. The PDCP Control PDU may be used to convey one of following: a PDCP status report; an interspersed ROHC feedback; and/or the like.

Figure 13:
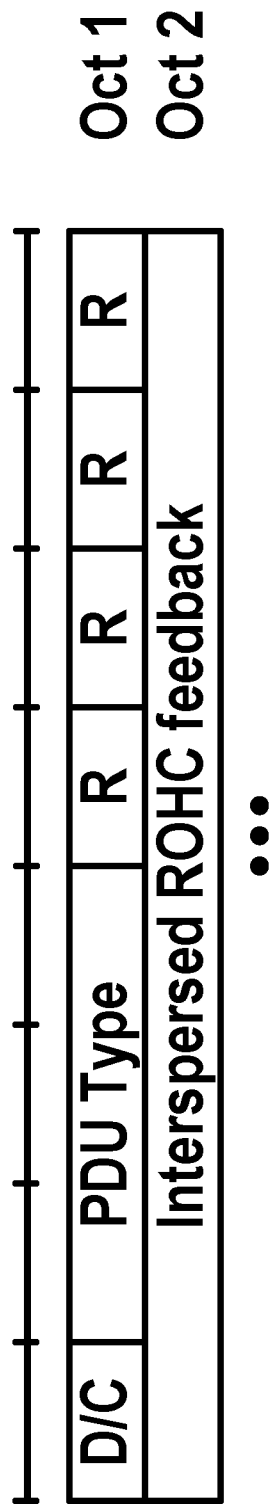
FIG. 13 is an example diagram depicting format of a PDCP Control PDU as per an aspect of an embodiment of the present disclosure.

As shown in FIG. 13, the PDCP Control PDU may carry one interspersed ROHC feedback applicable for a data radio bearer which utilizes RLC UM (UM DRBs) and a data radio bearer which utilizes RLC AM (AM DRBs). In which, the PDU type may indicate the type of control information included in the corresponding PDCP Control PDU:

TABLE

| PDU type | |
| --- | --- |
| Bit | Description |
| 000 | PDCP status report |
| 001 | Interspersed ROHC feedback |
| 010-111 | Reserved |

As shown in FIG. 14, an example layer 2 data flow is depicted, where a transport block may be generated by MAC by concatenating two RLC PDUs from RBx. The two RLC PDUs from RBx each corresponds to one Ethernet frame/IP packet (n and n+1), and H depicts the headers and sub headers in the figure.

The 5G system may support the Ethernet type PDU session, and for Ethernet PDU session type, the Ethernet packet filter set may be used in the QoS rules or SDF template to identify a QoS flow. For Ethernet PDU session type, the packet filter set may support packet filtering based on at least any combination of: a source/destination MAC address; an Ethertype as defined, for example, in IEEE 802.3; a customer-VLAN tag (C-TAG) and/or Service-VLAN tag (S-TAG) VID fields as defined, for example, in IEEE 802.1Q; a customer-VLAN tag (C-TAG) and/or Service-VLAN tag (S-TAG) PCP/DEI fields as defined, for example, in IEEE 802.1Q; and an IP Packet Filter Set, in case Ethertype indicates IPv4/IPv6 payload; and/or the like.

Implementation of the existing technologies for the Ethernet type PDU session may result in issues in supporting and transferring traffic of Ethernet type PDUs. Example embodiments provides enhanced signaling mechanisms to support traffic of Ethernet type PDUs. Example embodiments implement signaling mechanisms and network protocols to transmit and receive UE MAC/IP profile among network nodes, and employ this information to improve network performance e.g. when an Ethernet type PDU session is set up. In an example embodiment, neither a MAC nor an IP address may be allocated by the 5GC to the UE for a Ethernet type PDU session. Example embodiments improve network signaling and performance. Example embodiments describes how the UPF receives the MAC address, and how the UPF associates those MAC addresses with the appropriate PDU session. Example embodiments describe where and how to get the UE MAC addresses, Ethertype, Customer-VLAN tag (C-TAG) and/or Service-VLAN tag (S-TAG) VID, Customer-VLAN tag (C-TAG) and/or Service-VLAN tag (S-TAG) PCP/DEI and IP Packet Filter Set in case Ethertype indicates IPv4/IPv6 payload. Example embodiment enable the SMF and/or PCF to create or derive the corresponding policy (e.g. QoS control, charging control and gating, etc.) which needs the packet filter information to detect the service data flow or QoS flow. Example embodiments enable UPF to get such policy from the SMF to detect and process the service data flow or QoS flow. The UPF may store the MAC addresses, received from the UE, and associate those with the appropriate PDU session.

Implementation of the existing technologies for the Ethernet type PDU session may result in issues for transmitting Ethernet frame. Example embodiments provides enhanced signaling mechanisms to support header compression on Ethernet frame.

Implementation of legacy 5G mechanisms may result in additional signaling overhead for transmission of Ethernet frames. For example, implementation of legacy 5G mechanisms may result in redundant information (e.g. Ethernet MAC address and/or IP header of Ethernet frame payload) being transferred over an air interface between a (R)AN and a wireless device. Implementation of legacy 5G technologies for the Ethernet type PDU session may not provide an efficient dynamic signal mechanism to provide Ethernet MAC addresses for (R)AN. There is a need to implement enhanced signaling procedures to perform header compression on Ethernet frames in a wireless core/access network to improve quality, user experience and performance of ongoing connections and ongoing sessions. There is a need for implementation of enhanced mechanism to provide Ethernet MAC address of a UE to a base station.

Example embodiments implement enhanced signaling mechanisms to provide Ethernet MAC address information to a (R)AN, for example, during registration procedures, ongoing connections and/or an ongoing sessions. Example embodiments implement enhanced signaling mechanisms to support header compression on Ethernet frames by a (R)AN and a wireless device. Example embodiments implement enhanced mechanisms to support transferring user data with compressed header over an air interface between the a (R)AN and a wireless device. Implementation of enhanced signaling mechanisms require implementation of additional messages, message formats and/or procedures. Example embodiments improve users experiences and reduces overhead by using header compression on Ethernet frame over an air interface between the a (R)AN and a wireless device.

Figure 15A:
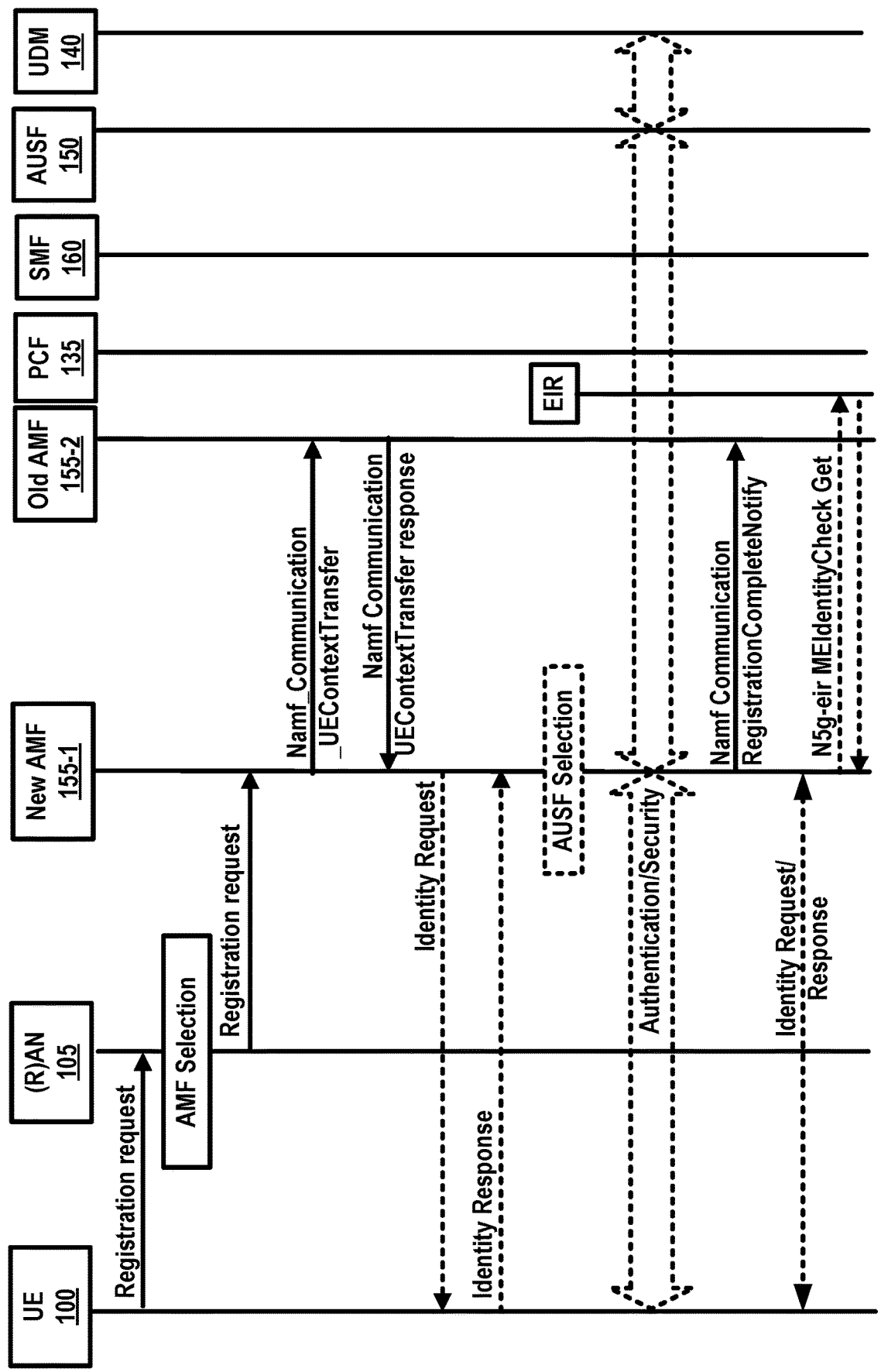
FIG. 15A and FIG. 15B are example call flow diagrams as per an aspect of an embodiment of the present disclosure.
Figure 15B:
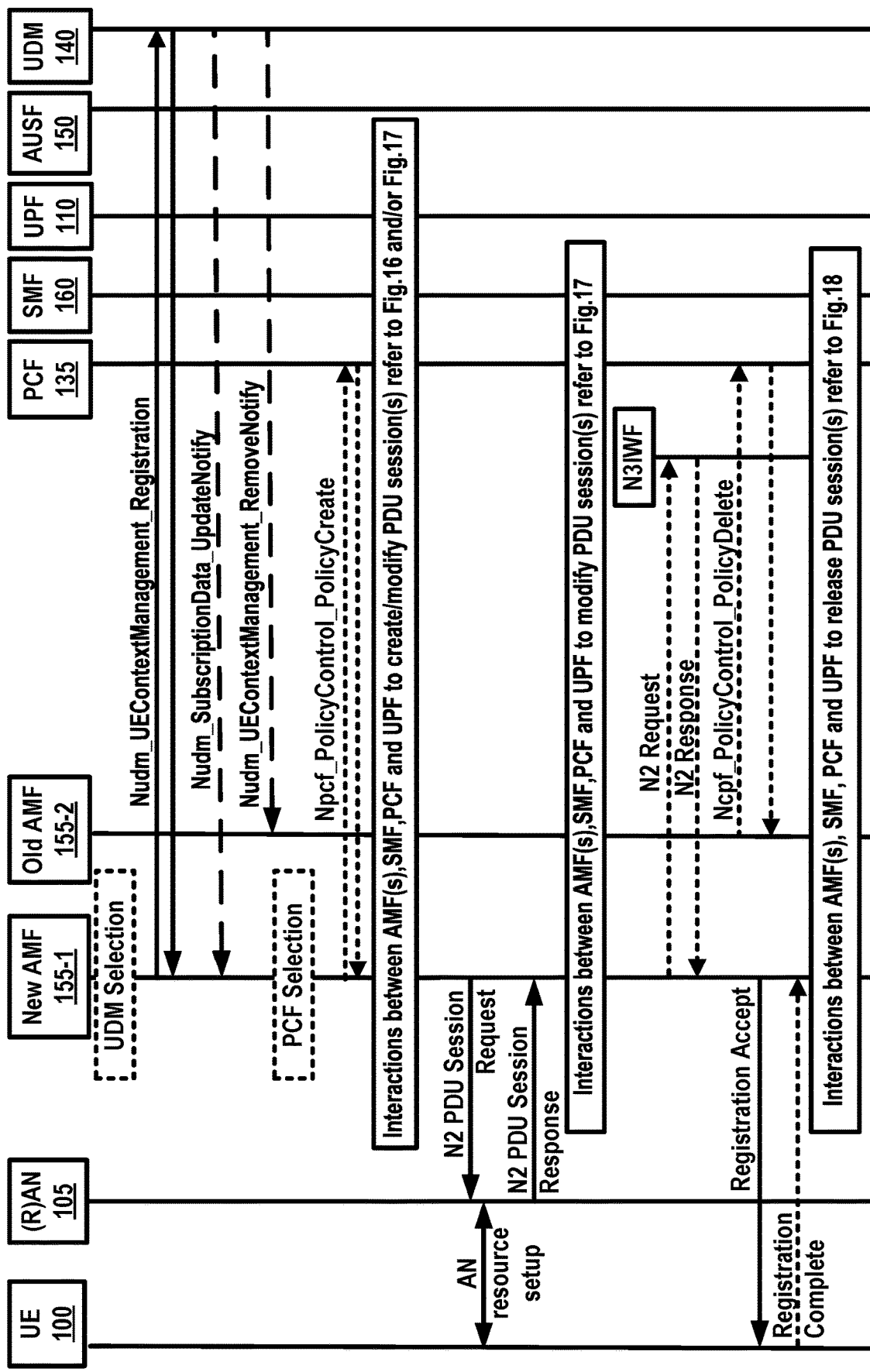

In an example, the UE may be in CM-IDLE state and may perform a registration procedure. FIG. 15A and FIG. 15B shows an example call flow as per an aspect of an embodiment of the disclosure. UE 100 may send a registration request to a (R)AN 105: AN message (AN parameters, RM-NAS Registration Request (Registration type, SUPI or 5G-GUTI, Security parameters, NSSAI, UE 5GCN Capability, PDU session status, PDU session(s) to be re-activated, Follow on request, and MICO mode preference)). The PDU Session status may indicate the previously established PDU Sessions (before this registration) in the UE. In an example, the PDU Session status may comprise a PDU (session) type (e.g. Ethernet) per PDU session. In an example, the registration request message may comprise a PDU (session) type (e.g. Ethernet) per PDU session. In the registration request message, the UE 100 may comprise one or more of the Ethernet packet filter sets per UE identified by the UE identity (s), and/or one or more of the Ethernet packet filter sets per data network/APN identified by a DNN, and/or one or more of the Ethernet packet filter sets per network slice identified by an S-NSSAI; and/or one or more of the Ethernet packet filter sets per PDU session identified by a PDU session ID. An Ethernet packet filter set may comprise one or more of the following information element, such as, for example: Source/destination MAC address; Ethertype as defined in IEEE 802.3; Customer-VLAN tag (C-TAG) and/or Service-VLAN tag (S-TAG) VID fields as defined in IEEE 802.1Q; Customer-VLAN tag (C-TAG) and/or Service-VLAN tag (S-TAG) PCP/DEI fields as defined in IEEE 802.1Q; IP Packet Filter Set in case Ethertype indicates IPv4/IPv6 payload, and/or the like. The IP Packet Filter Set may comprise one or more of the following information elements, such as, for example: Source/destination IP address or IPv6 prefix; Source/destination port number; Protocol ID of the protocol above IP/Next header type; Type of Service (TOS) (IPv4)/Traffic class (IPv6) and Mask; Flow Label (IPv6); Security parameter index, and/or the like. Wherein the UE identity is the user identity of the wireless device, it may be the UE NAI, SUPI, 5G-GUTI and/or other UE identifier (s).

The UE 100 may transmit an AN message and/or an NAS message (e.g. RM-NAS Registration Request) comprising the Ethernet packet filter set(s) information. The registration request message may comprise Ethernet header compression capability parameter. The Ethernet header compression capability parameter may be used to indicate one or more of the following UE capabilities, such as, for example: support Ethernet header compression; support Ethernet header and payload header compression (e.g. IP header, RTP/UDP/IP header of Ethernet payload, etc.), and/or the like. As an example, the AN parameters and/or UE 5GCN Capability in the registration request message may comprise the Ethernet header compression capability parameter. The UE 100 may send to the (R)AN 105 RRC connection establishment message, and/or an RRC message after RRC connection has been established. RRC connection establishment message, and/or an RRC message may comprise the Ethernet header compression capability parameter.

(R)AN 105 may store the Ethernet header compression capability parameter if RAN receives the RRC message from the UE. If a SUPI is included or the 5G-GUTI does not indicate a valid AMF, the (R)AN 105, based on (R)AT and NSSAI, if available, may select an AMF. In this example, a new AMF 155-1 is selected. (R)AN 105 may send the New AMF 155-1 a message (e.g. registration request), the message may comprise one or more of the following information: N2 parameters, RM-NAS Registration Request (Registration type, Subscriber Permanent Identifier or 5G-GUTI, Security parameters, NSSAI and MICO mode preference, PDU session status, PDU session(s) to be re-activated). The message, sent to the new AMF 155-1 from the (R)AN 105, may comprise the Ethernet packet filter set(s) information and/or Ethernet header compression capability parameter received from the UE 100.

If the UE's 5G-GUTI was included in the registration request and the serving AMF 155-2 has changed since last registration, the new AMF 155-1 may invoke the Namf_Communication_UEContextTransfer service operation on the old AMF 155-2 comprising the complete Registration Request IE, which may be integrity protected, to request the UE's SUPI and MM Context. The Old AMF 155-2 may respond to the New AMF 155-1 a Namf_Communication_UEContextTransfer response comprising the UE's SUPI and MM Context. If the Old AMF 155-2 holds information about active PDU Sessions, the Old AMF 155-2 may comprise one or more of the following information for the existing PDU session (s) which has (have) already established before in the response message, such as, for example: SMF information (e.g. SMF identities or SMF address); UPF information (e.g. UPF identities or UPF address); PDU session ID (s); UE IPv4 Address and/or IPv6 prefix if available; DNN if available, and/or the like.

If the SUPI is not provided by the UE 100 nor retrieved from the Old AMF 155-2 the identity request procedure may be initiated by the New AMF 155-1 sending an Identity Request message to the UE 100. The UE 100 may respond with an identity response message to the New AMF 155-1 comprising the SUPI. The AMF 155-1 may decide to invoke an AUSF. The AUSF 150 may initiate authentication of the UE 100, and the New AMF 155-1 may initiate NAS security functions. The New AMF 155-1 may notify the Old AMF 155-2 that the registration of the UE in the New AMF 155-1 is completed by invoking the Namf_Communication_RegistrationCompleteNotify service operation. If the PEI was not provided by the UE 100 nor retrieved from the Old AMF 155-2, the identity request procedure may be initiated by AMF 155-1 sending an identity request message to the UE 100 to retrieve the PEI. The New AMF 155-1 may initiate ME identity check by invoking the N5g-eir_MEIdentity-Check_Get service operation.

The New AMF 155-1, based on the SUPI, may select a UDM 140. If the AMF has changed since the last registration, or if the UE provides a SUPI which doesn't refer to a valid context in the AMF, or if the UE registers to the same AMF it has already registered to a non-3GPP access (i.e. the UE is registered over a non-3GPP access and initiates this registration procedure to add a 3GPP access), the New AMF 155-1 may invoke the Nudm_UEContextManagement_Registration service operation towards the UDM 140. If there is no subscription context for the UE in the New AMF 155-1, the "subscription data retrieval indication" may be included. The New AMF 155-1 may provide the access type it serves for the UE to the UDM and the access type may be set to "3GPP access". The UDM 140 may store the associated access type together with the serving AMF 155-1. If "the subscription data retrieval" indication was included in step 14a, the UDM 140 may invoke the Nudm_Subscription-Data_UpdateNotification service operation to provide the subscription data from the UDM 140. When the UDM 140 stores the associated access type together with the serving AMF 155-1 as indicated in step 14a, it may cause the UDM to initiate a Nudm_UEContextManagement_RemoveNotification to the Old AMF 155-2 corresponding to 3GPP access, if one exists. The Old AMF 155-2 may remove the MM context of the UE 100.

The New AMF 155-1 may select a PCF based on one or more of the following information, such as, for example: The SUPI; Ethernet MAC address (es) and/or UE IPv4 address and/or IPv6 prefix of the Ethernet payload for the existing PDU session(s) in case Ethertype indicates IPv4/IPv6 payload; DNN, and/or the like. If the New AMF 155-1 has not yet obtained Access and Mobility policy for the UE 100 or if the Access and Mobility policy in the New AMF 155-1 may be no longer valid, the New AMF 155-1 may request the PCF 135 to apply operator policies for the UE 100 by creating a policy control session with the PCF 135 through the Npcf_PolicyControl_PolicyCreate service operation, the New AMF 155-1 may comprise the Ethernet packet filter set(s) information per PDU session identified by a PDU session ID, and/or Ethernet packet filter set(s) per UE identified by the UE identity (s), and/or Ethernet packet filter set(s) per data network/APN identified by a DNN, and/or Ethernet packet filter set(s) per network slice identified by an S-NSSAI (s) received from the (R)AN 105.

The PCF 135 may take one or more of actions. An example action may comprise making the access and mobility control policy decision based on the Ethernet packet filter set(s) information received from the New AMF 155-1. An example action may comprise responding to the New AMF 155-1 Npcf_PolicyControl_PolicyCreate service operation with the access and mobility control policy for the UE 100, where the access and mobility control policy may comprise service area restrictions and/or the RAT frequency selection priority (RFSP) Index. If PCC is not supported or there is no PCF in the network, the interaction between the New AMF 155-1 and the PCF 135 may be omitted. In this case, the New AMF 155-1 may make the access and mobility control policy decision based on the Ethernet packet filter set(s) information received from the (R)AN 105. In response to the message received from the PCF 135, the New AMF 155-1 may enforce the access and mobility control policy, and/or re-active/create PDU session (s). The interactions between AMF(s), SMF, PCF and UPF to re-active/create PDU session (s) may be further detailed in FIG. 16 comprising one or more actions.

Figure 16:
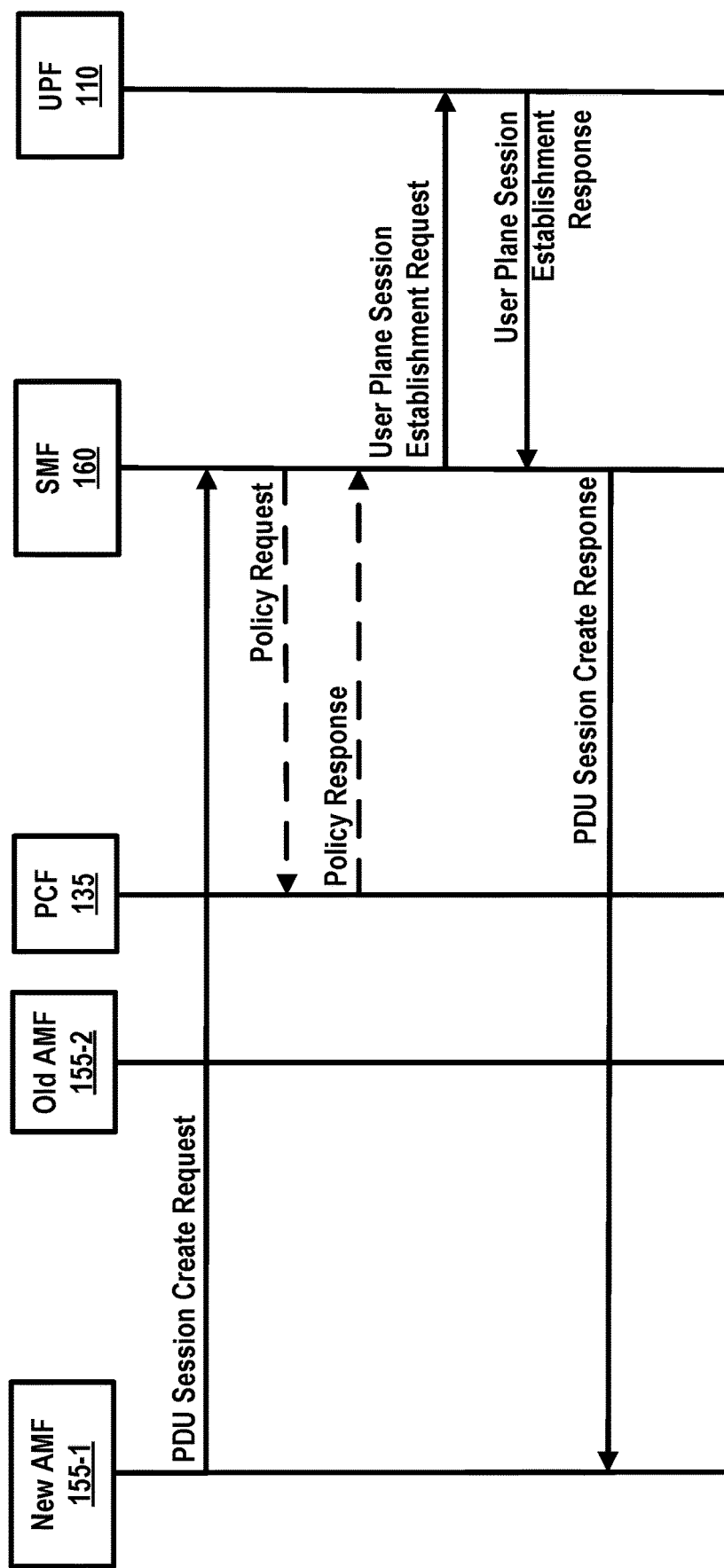
FIG. 16 is an example call flow diagram as per an aspect of an embodiment of the present disclosure.

In response to the message received from action of FIG. 16, the new AMF 155-1 may send to (R)AN 105 a message, e.g. N2 PDU Session Request (N2 SM information, NAS message (PDU Session ID, N1 SM container (PDU Session Establishment Accept))).

The new AMF 155-1 may send the NAS message containing PDU Session ID and PDU Session Establishment Accept targeted to the UE 100 and the N2 SM information received from the SMF 160 within the N2 PDU Session Request to the (R)AN 105. In the message sent to (R)AN 105, the new AMF 155-1 may comprise one or more of the following information, such as, for example: PDU Session ID (s); CN N3 tunnel info (e.g. UPF 110 address or identity, and TEID) for the PDU session (s); PDU (session) type (e.g. Ethernet); Ethernet packet filter set (s) information; Ethernet header compression capability parameter if available (e.g. received from UE 100 in NAS message); and/or the like.

The (R)AN 105 may take one or more of actions. A) An example action of the (R)AN 105 may comprise issuing AN specific signaling exchange with the UE that is related with the information received from SMF. For example, in case of a 3GPP RAN, an RRC Connection Reconfiguration may take place with the UE establishing the necessary RAN resources related to the Authorized QoS Rules for the PDU Session (s). Based on the Ethernet header compression capability parameter received from UE 100 and/or new AMF 155-1, the (R)AN 105 may send to UE 100 an RRC connection reconfiguration message comprising an information element (e.g. PDCP-Config IE) to set the configurable PDCP parameters for data radio bearer. In an example, the PDCP-Config IE may comprise the profile(s) for the header compression, e.g.

| Profile Identifier | Usage: |
| --- | --- |
| 0x0000 | No compression |
| 0x0001 | RTP/UDP/IP |
| 0x0002 | UDP/IP |
| 0x0003 | ESP/IP |
| 0x0004 | IP |
| 0x0006 | TCP/IP |
| 0x0101 | RTP/UDP/IP |
| 0x0102 | UDP/IP |
| 0x0103 | ESP/IP |
| 0x0104 | IP |
| 0x0105 | Ethernet |
| 0x0106 | Ethernet/IP |

In an example, an RRC message may comprise Ethernet header profile configuration IEs. The Ethernet profile configuration IE may comprise information about Ethernet packet header, and/or one or more parameters on Ethernet packet header compression, and/or the profile identifier (s). If the Ethernet header compression capability parameter indicates UE 100 does not support Ethernet header compression, the (R)AN 105 may send to UE 100 a PDCP-Config IE with the profile 0x0000 to indicate no Ethernet header compression. If the Ethernet header compression capability parameter indicates UE 100 supports Ethernet header compression but does not support payload header compression, the (R)AN 105 may send to UE 100 a PDCP-Config IE with the profile 0x0105 to indicate Ethernet header compression. If the Ethernet header compression capability parameter indicates UE 100 supports Ethernet header and payload header compression, the (R)AN 105 may send to UE 100 a PDCP-Config IE with the profile 0x0106.

If the UE 100 indicates supporting Ethernet header compression, and/or Ethernet header and payload header compression, and based on the Ethernet packet filter set (s) information, the (R)AN 105 may take one or more of actions. An example action may comprise: for Ethernet header compression: mapping the destination MAC address and/or the source MAC address to a corresponding header compression index, and transmitting to the UE, the mapping information between destination MAC address and/or the source MAC address and the corresponding header compression index; the following table is an example created by the (R)AN 105:

| MAC address(es) | Header compression index |
| --- | --- |
| destination MAC address 1 and/or source MAC address 1 | Mac_Index 1 |
| destination MAC address 2 and/or source MAC address 2 | Mac_Index 2 |
| ... | |
| destination MAC address N and/or source MAC address N | Mac_Index N |

An example action may comprise: for Ethernet header and payload header compression: mapping the destination MAC address and/or the source MAC address and/or payload header to a corresponding header compression index; and transmitting to the UE, the mapping information between destination MAC address and/or the source MAC address and/or payload header and the corresponding header compression index. the following table is an example created by the (R)AN 105:

| MAC address(es) and payload header | Header compression index |
| --- | --- |
| destination MAC address 1 and/or source MAC address 1 and/or IP header of Ethernet frame payload 1 | Mac_Index 1 |
| destination MAC address 2 and/or source MAC address 2 and/or IP header of Ethernet frame payload 2 | Mac_Index 2 |
| ... | |
| destination MAC address N and/or source MAC address N and/or IP header of Ethernet frame payload N | Mac_Index N |

B) An example action of the (R)AN 105 may comprise: allocating (R)AN N3 tunnel information comprising (R)AN address or identify and/or tunnel end identifier (TEID) of N3 tunnel for downlink for the PDU session (s), and/or correlate the (R)AN N3 tunnel with the CN N3 tunnel for the PDU session (s). C) An example action of the (R)AN 105 may comprise forwarding the NAS message (PDU Session ID (s), N1 SM information (PDU Session Establishment Accept)) to the UE 100. (R)AN 105 may provide the NAS message to the UE 100 if the necessary RAN resources have been established and the allocation of (R)AN tunnel information have been successful.

(R)AN 105 may send a message to the New AMF 155-1: N2 PDU Session Response (PDU Session ID(s), Cause, N2 SM information (PDU Session ID (s), (R)AN N3 tunnel information, list of accepted/rejected QoS profile(s))). In response to the information received from (R)AN 105, the (R)AN N3 Tunnel information may be sent to the UPF 110 by the interactions between AMF(s), SMF, PCF and UPF, such interactions to modify PDU session (s) may be further detailed in FIG. 17 comprising one or more actions. As another alternative, the interactions between AMF(s), SMF, PCF and UPF to delete PDU session (s) may be further detailed in FIG. 18 comprising one or more actions. The New AMF 155-1 may decide to modify the N2AP UE-TNLA-binding toward N3IWF by sending a N2 request message and the N3IWF may response with a N2 response message. If the Old AMF 155-2 previously requested UE context to be established in the PCF 135, the Old AMF 155-2 may terminate the UE context in the PCF 135 by invoking, for example, the Npcf_PolicyControl_PolicyDelete service operation. The New AMF 155-1 may send a registration accept message to the UE 100 indicating that the registration has been accepted, and the 5G-GUTI may be included if the New AMF 155-1 allocates a new 5G-GUTI.

The UE 100 may send a registration complete message to the New AMF 155-1 to acknowledge if a new 5G-GUTI was assigned. If the UE 100 has received the PDCP-Config IE with the profile set to 0x0000 from the (R)AN 105, the UE 100 may not perform the header compression for the Ethernet packet and its payload.

In an example, the UE 100 may receive the PDCP-Config IE with the profile set to 0x0105 and/or 0x0106, and the mapping information between destination MAC address and/or the source MAC address and the corresponding header compression index, and/or mapping information between destination MAC address and/or the source MAC address and/or payload header and the corresponding header compression index. In an example, the UE may receive an RRC message with Ethernet header profile configuration parameter e.g. related to Ethernet header compression. The UE 100 may take one or more actions in response to the RRC message. An example action may comprise: storing the mapping information of Ethernet header compression and/or Ethernet header and payload header compression. An example action may comprise creating a compressed header by performing a header compression of the Ethernet header and/or payload header based on the mapping information of action when receiving from the upper layer PDCP SDU comprising an Ethernet packets comprising an Ethernet header and payload. An example action may comprise constructing a PDCP PDU comprising at least the compressed header, the payload, and a traffic type field, wherein the traffic type field indicates that the payload is of Ethernet type. An example action may comprise transmitting, by the UE 100 to the (R)AN 105, the PDCP PDU.

In response to the PDCP PDU received from the UE 100, the (R)AN 105 may perform the Ethernet frame decompression with the mapping information of Ethernet header compression and/or Ethernet header and payload header compression, and send to the upper layer PDCP SDU comprising an Ethernet packets comprising an Ethernet header and payload. When receiving from the upper layer PDCP SDU comprising an Ethernet packets comprising an Ethernet header and payload, the (R)AN 105 may take one or more actions. An example action may comprise creating a compressed header by performing a header compression of the Ethernet header and/or payload header based on the mapping information of Ethernet header compression and/or Ethernet header and payload header compression. An example action may comprise constructing a PDCP PDU comprising at least the compressed header, the payload, and a traffic type field, wherein the traffic type field indicates that the payload is of Ethernet type. An example action may comprise transmitting, by the (R)AN 105 to the UE 100, the PDCP PDU. When receiving the PDCP PDU from the (R)AN 105, the UE 100 may perform the Ethernet frame decompression with the mapping information of Ethernet header compression and/or Ethernet header and payload header compression and send to the upper layer PDCP SDU comprising an Ethernet packets comprising an Ethernet header and payload.

Figure 17:
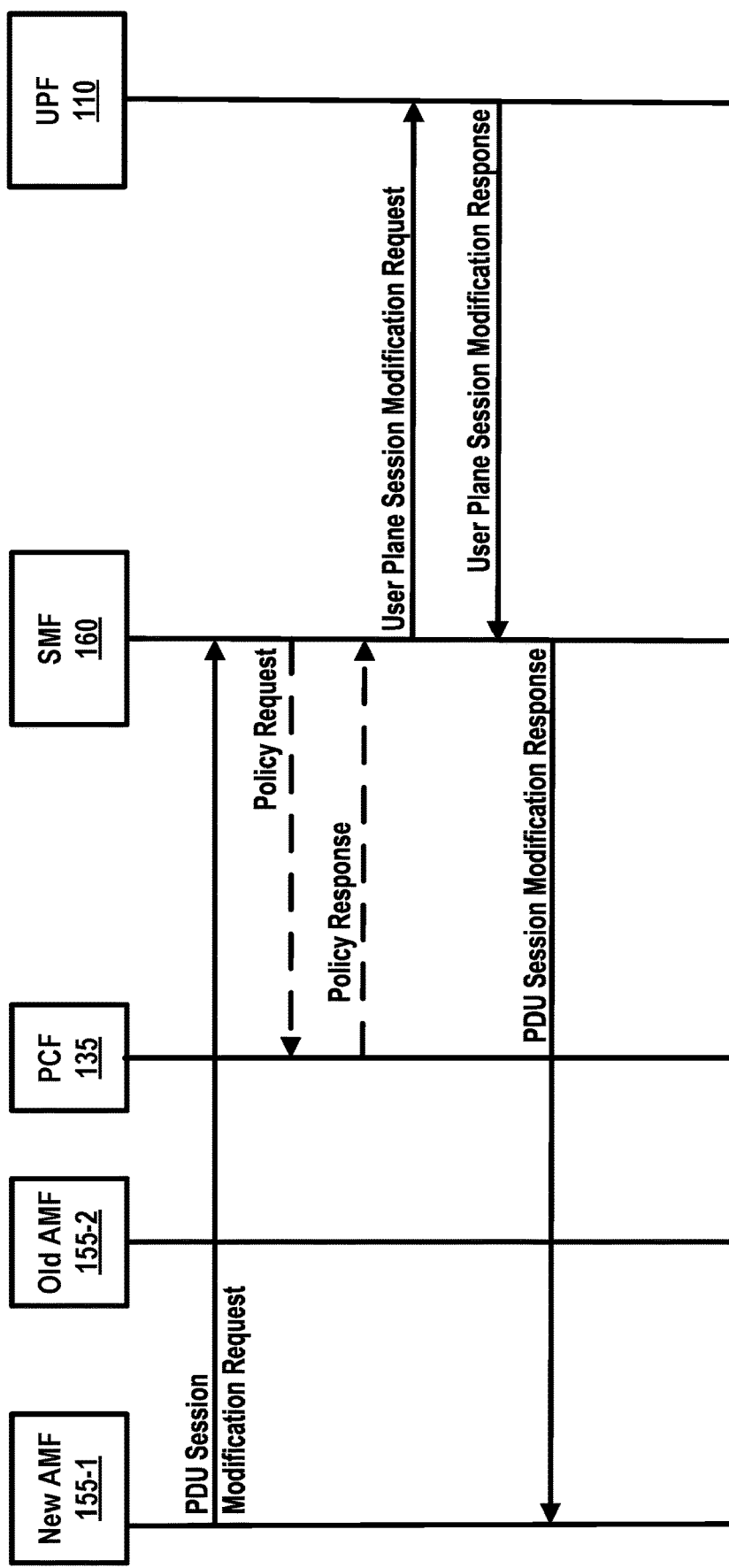
FIG. 17 is an example call flow diagram as per an aspect of an embodiment of the present disclosure.

As an alternative, the interactions between AMF(s), SMF, PCF and UPF, such interactions to modify PDU session (s) may be further detailed in FIG. 17 comprising one or more actions. The interactions between AMF(s), SMF, PCF and UPF to delete PDU session (s) may be further detailed in FIG. 18 comprising one or more actions.

FIG. 16 is an example call flow diagram as per an aspect of an embodiment of the present disclosure. The New AMF 155-1 may send to the SMF 160, a message (e.g. PDU session create request) to request establishing one or more PDU sessions in one or more of the following conditions: A) The UE intends to activate one or more existing PDU sessions which has (have) already established before; B) The UE intends to establish one or more new PDU sessions; C) Based on the local policy, the New AMF 155-1 intends to establish one or more new PDU sessions; and D) Other reasons to activate existing PDU session and/or establish one or more new PDU sessions. For above cases, to establish one or more new PDU sessions, the old PDU session (s) may be released after the new PDU session (s) has (have) established. The message (e.g. PDU session create request) sent by the New AMF 155-1 to the SMF 160 may comprise one or more of the following information elements: an S-NSSAI and/or a network slicing instance ID: The S-NSSAI comprises a Slice/Service type (SST) and A Slice Differentiator (SD) which indicate expected network slice behavior in terms of features and services; and the network slicing instance ID is to identify a network slicing instance; PDU Session ID (s) for one or more PDU sessions: The PDU Session ID is to identify a PDU session; user identity (s) of the wireless device: For Ethernet type UE, the user identity of the wireless device may be the SUPI, 5G-GUTI and/or other UE identifier (s); Data Network Name (DNN); and Ethernet packet filter set (s) information per PDU session identified by a PDU session ID, and/or Ethernet packet filter set(s) per UE identified by the UE identity (s), and/or Ethernet packet filter set(s) per data network/APN identified by a DNN, and/or Ethernet packet filter set(s) per network slice identified by an S-NSSAI (s).

In response to the message from the New AMF 155-1, the SMF 160 may take one or more of actions. An example action may comprise allocating an IPv6 prefix for the PDU session (s) and N6 point-to-point tunneling if the PDU Type is Ethernet PDU, where the N6 tunnel may be used to transmit the user data between the UPF and a Data Network. An example action may comprise allocating the CN N6 tunnel info (e.g. UPF 110 address or identity, and tunnel endpoint identifier (e.g. TEID)) and CN N3 tunnel info (e.g. UPF 110 address or identity, and TEID) for the PDU session (s). An example action may comprise selecting a PCF. The SMF 160 may select the same PCF which has already served the existing PDU session(s) identified by PDU session ID (s), and the SMF 160 may select the same PCF based on one or more of the following information: the SUPI; Ethernet MAC address (es) and/or UE IPv4 address and/or IPv6 prefix of the Ethernet payload for the existing PDU session(s) in case Ethertype indicates IPv4/IPv6 payload; DNN, and/or the like. Alternatively, the SMF 160 may select a new PCF. An example action may comprise sending to the PCF 135, a message (e.g. policy request) to request policy (s) for the PDU session (s); the message may comprise one or more of the following information elements: The information received from the New AMF 155-1, which may comprise the Ethernet packet filter set(s) information per PDU session identified by a PDU session ID, and/or Ethernet packet filter set(s) per UE identified by the UE identity (s), and/or Ethernet packet filter set(s) per data network/APN identified by a DNN, and/or Ethernet packet filter set(s) per network slice identified by an S-NSSAI; and the IPv6 prefix for the PDU session (s) and N6 point-to-point tunneling if the PDU Type is Ethernet PDU. If PCC is not supported or there is no PCF in the network, the SMF 160 may not select the PCF (above Action C) and may not send to PCF a message (above Action D), and the following Action 103 may be omitted. In this case, the SMF 160 may make the policy decision based on the information received from the New AMF 155-1 (e.g. Ethernet packet filter set(s) information) and/or other information (e.g. subscription information); and the SMF 160 may create the service data flow template for the policy rule based on the Ethernet packet filter set(s) information received from the New AMF 155-1.

The PCF 135 may take one or more actions. An example action may comprise making the policy decision based on the information received from the SMF 160 (e.g. Ethernet packet filter set(s) information) and/or other information (e.g. subscription information); and the PCF may create the service data flow template for the policy rule based on the Ethernet packet filter set(s) information received from the SMF 160. An example action may comprise sending to the SMF 160 a message (e.g. policy response) by providing one or more of the following policy (s) comprising or along with the Ethernet packet filter set (s) information: QoS policy for the PDU session (s); Charging policy for the PDU session (s); Traffic Steering Control for steering traffic; Other policies, and/or the like.

The SMF 160 may send to the UPF 110 a message (e.g. user plane session establishment request) to request establishing user plan session (s) for the PDU session (s) comprising one or more of the following information: The S-NSSAI and/or the network slicing instance ID; The PDU session ID (s); The user identity of the wireless device; The Data Network Name (DNN); The CN N6 tunnel info (e.g. UPF 110 address or identity, and TEID) and CN N3 tunnel info (e.g. UPF 110 address or identity, and TEID) for the PDU session (s) if the corresponding tunnel info is allocated by the SMF, and the policies for the PDU sessions comprising or along with the Ethernet packet filter set (s) information.

Based on the message received from the SMF 160, the UPF 110 may take one or more actions. An example action may comprise setting up the user plane session(s). An example action may comprise acknowledging the SMF 160 by sending a response message (e.g. user plane session establishment response), the UPF 110 may include the CN N6 tunnel info (e.g. UPF 110 address or identity, and TEID) and CN N3 tunnel info (e.g. UPF 110 address or identity, and TEID) for the PDU session (s) if the corresponding tunnel info is allocated by the UPF. An example action may comprise performing the service flow detection and policy enforcement when receiving the user plane data packet with the Ethernet packet filter set (s) information.

The SMF 160 may acknowledge the New AMF 155-1 by sending a response message (e.g. PDU session create response), the response message may comprise one or more of the following information: (Cause, N2 SM information, N1 SM container (PDU Session Establishment Accept (QoS Rule, SSC mode, S-NSSAI, allocated IPv4 address, Session-AMBR))); in which the N2 SM information may comprise one or more of the following information: The allowed S-NSSAI and/or the network slicing instance ID; The PDU session ID (s); The user identity of the wireless device; The Data Network Name (DNN); The CN N3 tunnel info (e.g. UPF 110 address or identity, and TEID) for the PDU session (s); and The policies for the PDU sessions comprising or along with the Ethernet packet filter set (s) information.

FIG. 17 is an example call flow diagram as per an aspect of an embodiment of the present disclosure. The New AMF 155-1 may send to the SMF 160, a message (e.g. PDU session modification request) to request update one or more PDU sessions with one or more of the following information elements: The (R)AN N3 tunnel information (e.g. (R)AN address or identify, TEID) for the PDU Session (s); an S-NSSAI and/or a network slicing instance ID; PDU Session ID(s) for one or more PDU sessions; user identity of the wireless device; Data Network Name (DNN); and Ethernet packet filter set (s) information per PDU session identified by a PDU session ID, and/or Ethernet packet filter set(s) per UE identified by the UE identity (s), and/or Ethernet packet filter set(s) per data network/APN identified by a DNN, and/or Ethernet packet filter set(s) per network slice identified by an S-NSSAI (s). In response to the message received from the AMF 155-1, the SMF 160 may send to a PCF 135, a message (e.g. policy request) to request policy (s) for the PDU session (s); the message may comprise one or more of the following information elements: The information received from the New AMF 155-1 comprising the Ethernet packet filter set (s) information; The IPv6 prefix for the PDU session (s) and N6 point-to-point tunneling if the PDU Type is Ethernet PDU.

The PCF 135 may take one or more actions. An example action may comprise making policy decision based on the information received from the SMF 160 (e.g. Ethernet packet filter set(s) information) and/or other information (e.g. subscription information); and the PCF may create the service data flow template for the policy rule based on the Ethernet packet filter set(s) information received from the SMF 160. An example action may comprise sending to the SMF 160 a message (e.g. policy response) by providing one or more of the following policy (s) comprising or along with the Ethernet packet filter set (s) information: QoS policy for the PDU session (s); Charging policy for the PDU session (s); Traffic Steering Control for steering traffic; Other policies; and/or the like. If PCC is not supported or there is no PCF in the network, interactions between the SMF 160 and the PCF 135 may be omitted. In this case, the SMF 160 may make the policy decision based on the information received from the New AMF 155-1 (e.g. Ethernet packet filter set(s) information) and/or other information (e.g. subscription information); and the SMF 160 may create the service data flow template for the policy rule based on the Ethernet packet filter set(s) information received from the New AMF 155-1.

The SMF 160 may send to the UPF 110 a message (e.g. user plane session modification request) to request update the user plan session (s) for the PDU session (s) comprising one or more of the following information: The (R)AN N3 tunnel information (e.g. (R)AN address or identify, TEID) for the PDU Session (s); The S-NSSAI and/or the network slicing instance ID; The PDU session ID (s); The user identity of the wireless device; The Data Network Name (DNN); The CN N6 tunnel info (e.g. UPF 110 address or identity, and TEID) and CN N3 tunnel info (e.g. UPF 110 address or identity, and TEID) for the PDU session (s); and The policies for the PDU session(s) comprising or along with the Ethernet packet filter set (s) information. Based on the message received from the SMF 160, the UPF 110 may take one or more actions. An example action may comprise updating the user plane session(s). An example action may comprise correlating the CN N3 tunnel with (R)AN N3 tunnel for the PDU session (s). An example action may comprise acknowledging the SMF 160 by sending a response message (e.g. user plane session modification response), the UPF 110 may include the CN N6 tunnel info (e.g. UPF 110 address or identity, and TEID) and CN N3 tunnel info (e.g. UPF 110 address or identity, and TEID) for the PDU session (s) if the corresponding tunnel info is allocated by the UPF. An example action may comprise performing the service flow detection and policy enforcement when receiving the user plane data packet with the Ethernet packet filter set (s) information. In response to the message received from the UPF 110, the SMF 160 may acknowledge the New AMF 155-1 by sending a response message (e.g. PDU session modification response), the SMF 160 may include one or more the following information in the response message: The allowed S-NSSAI and/or the network slicing instance ID; The PDU session ID (s); The user identity of the wireless device; The Data Network Name (DNN); The CN N3 tunnel info (e.g. UPF 110 address or identity, and TEID) for the PDU session (s); and The policies for the PDU session(s) comprising or along with the Ethernet packet filter set (s) information.

Figure 18:
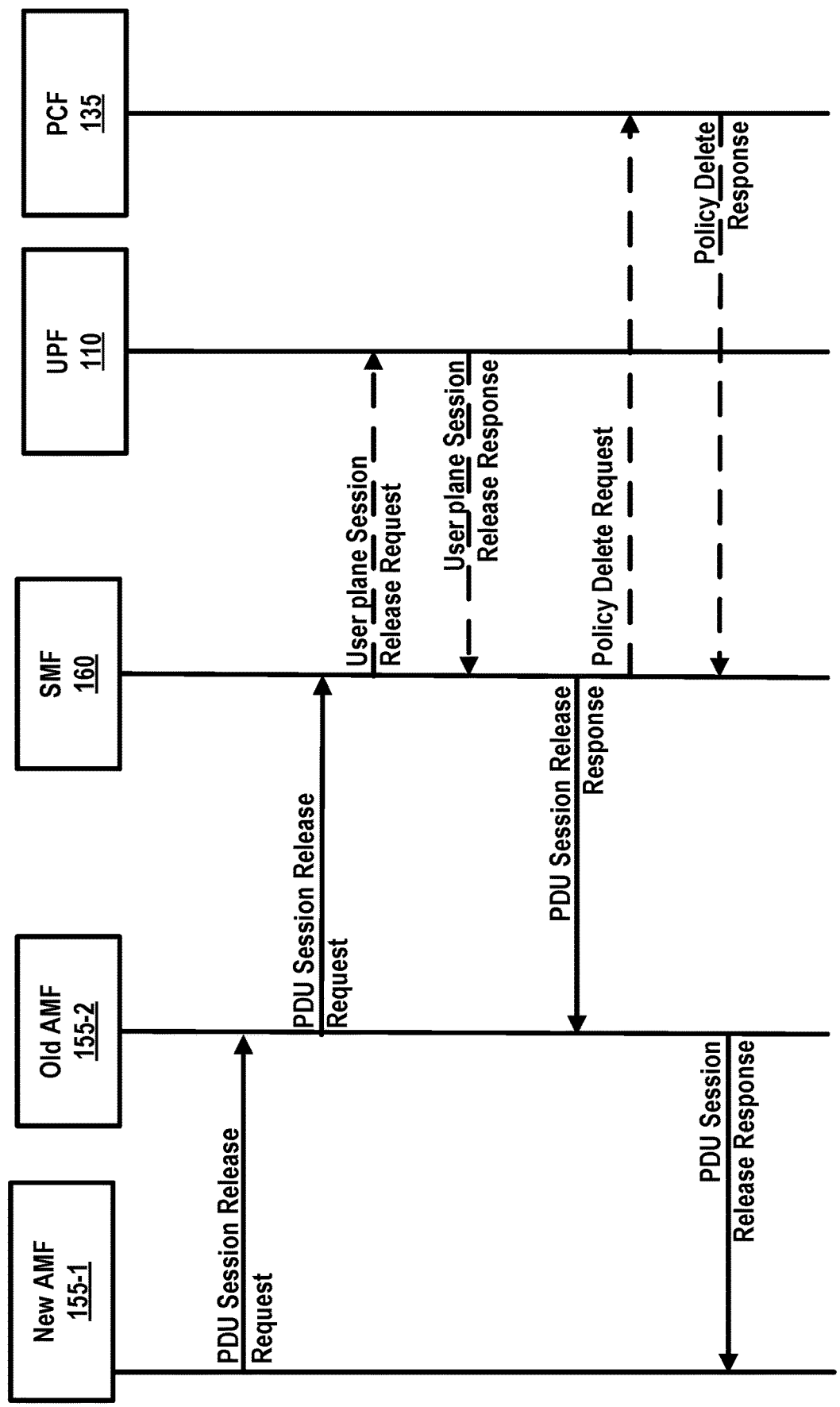
FIG. 18 is an example call flow diagram as per an aspect of an embodiment of the present disclosure.

FIG. 18 is an example call flow diagram as per an aspect of an embodiment of the present disclosure. The New AMF 155-1 may send to the old AMF 155-2 a message (e.g. PDU session release request) to request releasing one or more PDU sessions comprising one or more of the following information: The S-NSSAI and/or the network slicing instance ID, the PDU session ID (s), user identity of the wireless device, and/or the Data Network Name (DNN). In response to receiving the PDU session release request message from the New AMF 155-1, the old AMF 155-2 may send to the SMF 160 a message (e.g. PDU session release request) to request releasing one or more PDU sessions comprising the information received from the New AMF 155-1. In response to receiving the PDU session release request message from the old AMF 155-2, the SMF 160 may send to the UPF 110 a message (e.g. user plane session release request) to request releasing one or more user plane sessions for the PDU session(s) comprising the information received from the old AMF 155-2. In response to receiving the user plane session release request from the SMF 160, the UPF 110 may release the corresponding user plane sessions and acknowledge the SMF 160 by sending a response message (e.g. user plane session release response). If the UPF 110 has already released the corresponding user plane session (s), the UPF 110 may acknowledge the SMF 160 by sending a response message (e.g. user plane session release response). This action is optional, and the UPF 110 may release the user plane session (s) without the request from the SMF 160. The SMF 160 may acknowledge the old AMF 155-2 by sending a response message (e.g. PDU session release response). This action is optional. The old AMF 155-2 may acknowledge the New AMF 155-1 by sending a response message (e.g. PDU session release response), and the New AMF 155-1 may further send message to (R)AN 105 and/or UE 100 to release the related resource. Optional, the SMF 160 may send to the PCF 135 a message (e.g. policy delete request) to request remove the policy for the PDU session(s) comprising the information received from the old AMF 155-2. Optional, the PCF 135 may acknowledge the SMF 160 by sending a response message (e.g. policy delete response).

FIG. 15 is an example call flow diagram as per an aspect of an embodiment of the present disclosure. UE 100 may send a registration request to a (R)AN 105: AN message (AN parameters, RM-NAS Registration Request (Registration type, SUPI or 5G-GUTI, Security parameters, NSSAI, UE 5GCN Capability, PDU session status, PDU session(s) to be re-activated, Follow on request, and MICO mode preference)). The PDU Session status may indicate the previously established PDU Sessions (before this registration) in the UE. In an example, the PDU Session status may comprise a PDU (session) type (e.g. Ethernet) per PDU session. In an example, the registration request message may comprise a PDU (session) type (e.g. Ethernet) per PDU session. In the registration request message, the UE 100 may comprise one or more of the Ethernet packet filter sets per UE identified by the UE identity (s), and/or one or more of the Ethernet packet filter sets per data network/APN identified by a DNN, and/or one or more of the Ethernet packet filter sets per network slice identified by an S-NSSAI; and/or one or more of the Ethernet packet filter sets per PDU session identified by a PDU session ID. An Ethernet packet filter set may comprise one or more of the following information element, such as, for example: Source/destination MAC address; Ethertype as defined in IEEE 802.3; Customer-VLAN tag (C-TAG) and/or Service-VLAN tag (S-TAG) VID fields as defined in IEEE 802.1Q; Customer-VLAN tag (C-TAG) and/or Service-VLAN tag (S-TAG) PCP/DEI fields as defined in IEEE 802.1Q; IP Packet Filter Set in case Ethertype indicates IPv4/IPv6 payload, and/or the like. The IP Packet Filter Set may comprise one or more of the following information elements, such as, for example: Source/destination IP address or IPv6 prefix; Source/destination port number; Protocol ID of the protocol above IP/Next header type; Type of Service (TOS) (IPv4)/Traffic class (IPv6) and Mask; Flow Label (IPv6); Security parameter index, and/or the like. Wherein the UE identity is the user identity of the wireless device, it may be the UE NAI, SUPI, 5G-GUTI and/or other UE identifier (s).

The UE 100 may transmit an AN message and/or an NAS message (e.g. RM-NAS Registration Request) comprising the Ethernet packet filter set(s) information. The registration request message may comprise Ethernet header compression capability parameter. The Ethernet header compression capability parameter may be used to indicate one or more of the following UE capabilities, such as, for example: support Ethernet header compression; support Ethernet header and payload header compression (e.g. IP header, RTP/UDP/IP header of Ethernet payload, etc.), and/or the like. As an example, the AN parameters and/or UE 5GCN Capability in the registration request message may comprise the Ethernet header compression capability parameter. The UE 100 may send to the (R)AN 105 RRC connection establishment message, and/or an RRC message after RRC connection has been established. RRC connection establishment message, and/or an RRC message may comprise the Ethernet header compression capability parameter.

(R)AN 105 may store the Ethernet header compression capability parameter if RAN receives the RRC message from the UE. If a SUPI is included or the 5G-GUTI does not indicate a valid AMF, the (R)AN 105, based on (R)AT and NSSAI, if available, may select an AMF. In this example, a new AMF 155-1 is selected. (R)AN 105 may send the New AMF 155-1 a message (e.g. registration request), the message may comprise one or more of the following information: N2 parameters, RM-NAS Registration Request (Registration type, Subscriber Permanent Identifier or 5G-GUTI, Security parameters, NSSAI and MICO mode preference, PDU session status, PDU session(s) to be re-activated). The message, sent to the new AMF 155-1 from the (R)AN 105, may comprise the Ethernet packet filter set(s) information and/or Ethernet header compression capability parameter received from the UE 100.

If the UE's 5G-GUTI was included in the registration request and the serving AMF 155-2 has changed since last registration, the new AMF 155-1 may invoke the Namf_Communication_UEContextTransfer service operation on the old AMF 155-2 comprising the complete Registration Request IE, which may be integrity protected, to request the UE's SUPI and MM Context. The Old AMF 155-2 may respond to the New AMF 155-1 a Namf_Communication_UEContextTransfer response comprising the UE's SUPI and MM Context. If the Old AMF 155-2 holds information about active PDU Sessions, the Old AMF 155-2 may comprise one or more of the following information for the existing PDU session (s) which has (have) already established before in the response message, such as, for example: SMF information (e.g. SMF identities or SMF address); UPF information (e.g. UPF identities or UPF address); PDU session ID (s); UE IPv4 Address and/or IPv6 prefix if available; DNN if available, and/or the like.

If the SUPI is not provided by the UE 100 nor retrieved from the Old AMF 155-2 the identity request procedure may be initiated by the New AMF 155-1 sending an Identity Request message to the UE 100. The UE 100 may respond with an identity response message to the New AMF 155-1 comprising the SUPI. The AMF 155-1 may decide to invoke an AUSF. The AUSF 150 may initiate authentication of the UE 100, and the New AMF 155-1 may initiate NAS security functions. The New AMF 155-1 may notify the Old AMF 155-2 that the registration of the UE in the New AMF 155-1 is completed by invoking the Namf_Communication_RegistrationCompleteNotify service operation. If the PEI was not provided by the UE 100 nor retrieved from the Old AMF 155-2, the identity request procedure may be initiated by AMF 155-1 sending an identity request message to the UE 100 to retrieve the PEI. The New AMF 155-1 may initiate ME identity check by invoking the N5g-eir_MEIdentity-Check_Get service operation.

The New AMF 155-1, based on the SUPI, may select a UDM 140. If the AMF has changed since the last registration, or if the UE provides a SUPI which doesn't refer to a valid context in the AMF, or if the UE registers to the same AMF it has already registered to a non-3GPP access (i.e. the UE is registered over a non-3GPP access and initiates this registration procedure to add a 3GPP access), the New AMF 155-1 may invoke the Nudm_UEContextManagement_Registration service operation towards the UDM 140. If there is no subscription context for the UE in the New AMF 155-1, the "subscription data retrieval indication" may be included. The New AMF 155-1 may provide the access type it serves for the UE to the UDM and the access type may be set to "3GPP access". The UDM 140 may store the associated access type together with the serving AMF 155-1. If "the subscription data retrieval" indication was included in step 14a, the UDM 140 may invoke the Nudm_Subscription-Data_UpdateNotification service operation to provide the subscription data from the UDM 140. When the UDM 140 stores the associated access type together with the serving AMF 155-1 as indicated in step 14a, it may cause the UDM to initiate a Nudm_UEContextManagement_RemoveNotification to the Old AMF 155-2 corresponding to 3GPP access, if one exists. The Old AMF 155-2 may remove the MM context of the UE 100.

The New AMF 155-1 may select a PCF based on one or more of the following information, such as, for example: The SUPI; Ethernet MAC address (es) and/or UE IPv4 address and/or IPv6 prefix of the Ethernet payload for the existing PDU session(s) in case Ethertype indicates IPv4/IPv6 payload; DNN; and/or the like. If the New AMF 155-1 has not yet obtained Access and Mobility policy for the UE 100 or if the Access and Mobility policy in the New AMF 155-1 may be no longer valid, the New AMF 155-1 may request the PCF 135 to apply operator policies for the UE 100 by creating a policy control session with the PCF 135 through the Npcf_PolicyControl_PolicyCreate service operation, the New AMF 155-1 may comprise the Ethernet packet filter set(s) information per PDU session identified by a PDU session ID, and/or Ethernet packet filter set(s) per UE identified by the UE identity (s), and/or Ethernet packet filter set(s) per data network/APN identified by a DNN, and/or Ethernet packet filter set(s) per network slice identified by an S-NSSAI (s) received from the (R)AN 105.

The PCF 135 may take one or more of actions. An example action may comprise making the access and mobility control policy decision based on the Ethernet packet filter set(s) information received from the New AMF 155-1. An example action may comprise responding to the New AMF 155-1 Npcf_PolicyControl_PolicyCreate service operation with the access and mobility control policy for the UE 100, where the access and mobility control policy may comprise service area restrictions and/or the RAT frequency selection priority (RFSP) Index. If PCC is not supported or there is no PCF in the network, the interaction between the New AMF 155-1 and the PCF 135 may be omitted. In this case, the New AMF 155-1 may make the access and mobility control policy decision based on the Ethernet packet filter set(s) information received from the (R)AN 105. In response to the message received from the PCF 135, the New AMF 155-1 may enforce the access and mobility control policy, and/or re-active/create PDU session (s). The New AMF 155-1 may initiate the PDU session modification. The interactions between AMF(s), SMF, PCF and UPF to modify PDU session (s) may be further detailed in FIG. 17 comprising one or more actions.

In response to the message received from action of FIG. 17, the new AMF 155-1 may send to (R)AN 105 a message, e.g. N2 PDU Session Request (N2 SM information, NAS message (PDU Session ID, N1 SM container (PDU Session Establishment Accept))).

The new AMF 155-1 may send the NAS message containing PDU Session ID and PDU Session Establishment Accept targeted to the UE 100 and the N2 SM information received from the SMF 160 within the N2 PDU Session Request to the (R)AN 105. In the message sent to (R)AN 105, the new AMF 155-1 may comprise one or more of the following information, such as, for example: PDU Session ID (s); CN N3 tunnel info (e.g. UPF 110 address or identity, and TEID) for the PDU session (s); PDU (session) type (e.g. Ethernet); Ethernet packet filter set (s) information; Ethernet header compression capability parameter if available (e.g. received from UE 100 in NAS message); and/or the like.

The (R)AN 105 may take one or more of actions. A) An example action of the (R)AN 105 may comprise issuing AN specific signaling exchange with the UE that is related with the information received from SMF. For example, in case of a 3GPP RAN, an RRC Connection Reconfiguration may take place with the UE establishing the necessary RAN resources related to the Authorized QoS Rules for the PDU Session (s). Based on the Ethernet header compression capability parameter received from UE 100 and/or new AMF 155-1, the (R)AN 105 may send to UE 100 an RRC connection reconfiguration message comprising an information element (e.g. PDCP-Config IE) to set the configurable PDCP parameters for data radio bearer. In an example, the PDCP-Config IE may comprise the profile(s) for the header compression, e.g.

| Profile Identifier | Usage: |
| --- | --- |
| 0x0000 | No compression |
| 0x0001 | RTP/UDP/IP |
| 0x0002 | UDP/IP |
| 0x0003 | ESP/IP |
| 0x0004 | IP |
| 0x0006 | TCP/IP |
| 0x0101 | RTP/UDP/IP |
| 0x0102 | UDP/IP |
| 0x0103 | ESP/IP |
| 0x0104 | IP |
| 0x0105 | Ethernet |
| 0x0106 | Ethernet/IP |

In an example, an RRC message may comprise Ethernet header profile configuration IEs. The Ethernet profile configuration IE may comprise information about Ethernet packet header, and/or one or more parameters on Ethernet packet header compression, and/or the profile identifier (s). If the Ethernet header compression capability parameter indicates UE 100 does not support Ethernet header compression, the (R)AN 105 may send to UE 100 a PDCP-Config IE with the profile 0x0000 to indicate no Ethernet header compression. If the Ethernet header compression capability parameter indicates UE 100 supports Ethernet header compression but does not support payload header compression, the (R)AN 105 may send to UE 100 a PDCP-Config IE with the profile 0x0105 to indicate Ethernet header compression. If the Ethernet header compression capability parameter indicates UE 100 supports Ethernet header and payload header compression, the (R)AN 105 may send to UE 100 a PDCP-Config IE with the profile 0x0106.

If the UE 100 indicates supporting Ethernet header compression, and/or Ethernet header and payload header compression, and based on the Ethernet packet filter set (s) information, the (R)AN 105 may take one or more of actions. An example action may comprise: for Ethernet header compression: mapping the destination MAC address and/or the source MAC address to a corresponding header compression index, and transmitting to the UE, the mapping information between destination MAC address and/or the source MAC address and the corresponding header compression index; the following table is an example created by the (R)AN 105:

| MAC address(es) | Header compression index |
| --- | --- |
| destination MAC address 1 and/or source MAC address 1 | Mac_Index 1 |
| destination MAC address 2 and/or source MAC address 2 | Mac_Index 2 |
| ... | |
| destination MAC address N and/or source MAC address N | Mac_Index N |

An example action may comprise: for Ethernet header and payload header compression: mapping the destination MAC address and/or the source MAC address and/or payload header to a corresponding header compression index; and transmitting to the UE, the mapping information between destination MAC address and/or the source MAC address and/or payload header and the corresponding header compression index. the following table is an example created by the (R)AN 105:

| MAC address(es) and payload header | Header compression index |
| --- | --- |
| destination MAC address 1 and/or source MAC address 1 and/or IP header of Ethernet frame payload 1 | Mac_Index 1 |
| destination MAC address 2 and/or source MAC address 2 and/or IP header of Ethernet frame payload 2 | Mac_Index 2 |
| ... | |
| destination MAC address N and/or source MAC address N and/or IP header of Ethernet frame payload N | Mac_Index N |

B) An example action of the (R)AN 105 may comprise: allocating (R)AN N3 tunnel information comprising (R)AN address or identify and/or tunnel end identifier (TEID) of N3 tunnel for downlink for the PDU session (s), and/or correlate the (R)AN N3 tunnel with the CN N3 tunnel for the PDU session (s). C) An example action of the (R)AN 105 may comprise forwarding the NAS message (PDU Session ID (s), N1 SM information (PDU Session Establishment Accept)) to the UE 100. (R)AN 105 may provide the NAS message to the UE 100 if the necessary RAN resources have been established and the allocation of (R)AN tunnel information have been successful.

(R)AN 105 may send a message to the New AMF 155-1: N2 PDU Session Response (PDU Session ID(s), Cause, N2 SM information (PDU Session ID (s), (R)AN N3 tunnel information, list of accepted/rejected QoS profile(s))). In response to the information received from (R)AN 105, the (R)AN N3 Tunnel information may be sent to the UPF 110 by the interactions between AMF(s), SMF, PCF and UPF, such interactions to modify PDU session (s) may be further detailed in FIG. 17 comprising one or more actions. As another alternative, the interactions between AMF(s), SMF, PCF and UPF to delete PDU session (s) may be further detailed in FIG. 18 comprising one or more actions. The New AMF 155-1 may decide to modify the N2AP UE-TNLA-binding toward N3IWF by sending a N2 request message and the N3IWF may response with a N2 response message. If the Old AMF 155-2 previously requested UE context to be established in the PCF 135, the Old AMF 155-2 may terminate the UE context in the PCF 135 by invoking, for example, the Npcf_PolicyControl_PolicyDelete service operation. The New AMF 155-1 may send a registration accept message to the UE 100 indicating that the registration has been accepted, and the 5G-GUTI may be included if the New AMF 155-1 allocates a new 5G-GUTI.

The UE 100 may send a registration complete message to the New AMF 155-1 to acknowledge if a new 5G-GUTI was assigned. If the UE 100 has received the PDCP-Config 1E with the profile set to 0x0000 from the (R)AN 105, the UE 100 may not perform the header compression for the Ethernet packet and its payload.

In an example, the UE 100 may receive the PDCP-Config IE with the profile set to 0x0105 and/or 0x0106, and the mapping information between destination MAC address and/or the source MAC address and the corresponding header compression index, and/or mapping information between destination MAC address and/or the source MAC address and/or payload header and the corresponding header compression index. In an example, the UE may receive an RRC message with Ethernet header profile configuration parameter e.g. related to Ethernet header compression. The UE 100 may take one or more actions in response to the RRC message. An example action may comprise: storing the mapping information of Ethernet header compression and/or Ethernet header and payload header compression. An example action may comprise creating a compressed header by performing a header compression of the Ethernet header and/or payload header based on the mapping information of action when receiving from the upper layer PDCP SDU comprising an Ethernet packets comprising an Ethernet header and payload. An example action may comprise constructing a PDCP PDU comprising at least the compressed header, the payload, and a traffic type field, wherein the traffic type field indicates that the payload is of Ethernet type. An example action may comprise transmitting, by the UE 100 to the (R)AN 105, the PDCP PDU.

In response to the PDCP PDU received from the UE 100, the (R)AN 105 may perform the Ethernet frame decompression with the mapping information of Ethernet header compression and/or Ethernet header and payload header compression, and send to the upper layer PDCP SDU comprising an Ethernet packets comprising an Ethernet header and payload. When receiving from the upper layer PDCP SDU comprising an Ethernet packets comprising an Ethernet header and payload, the (R)AN 105 may take one or more actions. An example action may comprise creating a compressed header by performing a header compression of the Ethernet header and/or payload header based on the mapping information of Ethernet header compression and/or Ethernet header and payload header compression. An example action may comprise constructing a PDCP PDU comprising at least the compressed header, the payload, and a traffic type field, wherein the traffic type field indicates that the payload is of Ethernet type. An example action may comprise transmitting, by the (R)AN 105 to the UE 100, the PDCP PDU. When receiving the PDCP PDU from the (R)AN 105, the UE 100 may perform the Ethernet frame decompression with the mapping information of Ethernet header compression and/or Ethernet header and payload header compression and send to the upper layer PDCP SDU comprising an Ethernet packets comprising an Ethernet header and payload.

As an alternative, the interactions between AMF(s), SMF, PCF and UPF, such interactions to modify PDU session (s) may be further detailed in FIG. 17 comprising one or more actions. The interactions between AMF(s), SMF, PCF and UPF to delete PDU session (s) may be further detailed in FIG. 18 comprising one or more actions.

FIG. 16 is an example call flow diagram as per an aspect of an embodiment of the present disclosure. The New AMF 155-1 may send to the SMF 160, a message (e.g. PDU session create request) to request establishing one or more PDU sessions in one or more of the following conditions: A) The UE intends to activate one or more existing PDU sessions which has (have) already established before; B) The UE intends to establish one or more new PDU sessions; C) Based on the local policy, the New AMF 155-1 intends to establish one or more new PDU sessions; and D) Other reasons to activate existing PDU session and/or establish one or more new PDU sessions. For above cases, to establish one or more new PDU sessions, the old PDU session (s) may be released after the new PDU session (s) has (have) established. The message (e.g. PDU session create request) sent by the New AMF 155-1 to the SMF 160 may comprise one or more of the following information elements: an S-NSSAI and/or a network slicing instance ID: The S-NSSAI comprises a Slice/Service type (SST) and A Slice Differentiator (SD) which indicate expected network slice behavior in terms of features and services; and the network slicing instance ID is to identify a network slicing instance; PDU Session ID (s) for one or more PDU sessions: The PDU Session ID is to identify a PDU session; user identity (s) of the wireless device: For Ethernet type UE, the user identity of the wireless device may be the SUPI, 5G-GUTI and/or other UE identifier (s); Data Network Name (DNN); and Ethernet packet filter set (s) information per PDU session identified by a PDU session ID, and/or Ethernet packet filter set(s) per UE identified by the UE identity (s), and/or Ethernet packet filter set(s) per data network/APN identified by a DNN, and/or Ethernet packet filter set(s) per network slice identified by an S-NSSAI (s).

In response to the message from the New AMF 155-1, the SMF 160 may take one or more of actions. An example action may comprise allocating an IPv6 prefix for the PDU session (s) and N6 point-to-point tunneling if the PDU Type is Ethernet PDU, where the N6 tunnel may be used to transmit the user data between the UPF and a Data Network. An example action may comprise allocating the CN N6 tunnel info (e.g. UPF 110 address or identity, and tunnel endpoint identifier (e.g. TEID)) and CN N3 tunnel info (e.g. UPF 110 address or identity, and TEID) for the PDU session (s). An example action may comprise selecting a PCF. The SMF 160 may select the same PCF which has already served the existing PDU session(s) identified by PDU session ID (s), and the SMF 160 may select the same PCF based on one or more of the following information: the SUPI; Ethernet MAC address (es) and/or UE IPv4 address and/or IPv6 prefix of the Ethernet payload for the existing PDU session(s) in case Ethertype indicates IPv4/IPv6 payload; DNN, and/or the like. Alternatively, the SMF 160 may select a new PCF. An example action may comprise sending to the PCF 135, a message (e.g. policy request) to request policy (s) for the PDU session (s); the message may comprise one or more of the following information elements: The information received from the New AMF 155-1, which may comprise the Ethernet packet filter set(s) information per PDU session identified by a PDU session ID, and/or Ethernet packet filter set(s) per UE identified by the UE identity (s), and/or Ethernet packet filter set(s) per data network/APN identified by a DNN, and/or Ethernet packet filter set(s) per network slice identified by an S-NSSAI; and the IPv6 prefix for the PDU session (s) and N6 point-to-point tunneling if the PDU Type is Ethernet PDU. If PCC is not supported or there is no PCF in the network, the SMF 160 may not select the PCF (above Action C) and may not send to PCF a message (above Action D), and the following Action 103 may be omitted. In this case, the SMF 160 may make the policy decision based on the information received from the New AMF 155-1 (e.g. Ethernet packet filter set(s) information) and/or other information (e.g. subscription information); and the SMF 160 may create the service data flow template for the policy rule based on the Ethernet packet filter set(s) information received from the New AMF 155-1.

The PCF 135 may take one or more actions. An example action may comprise making the policy decision based on the information received from the SMF 160 (e.g. Ethernet packet filter set(s) information) and/or other information (e.g. subscription information); and the PCF may create the service data flow template for the policy rule based on the Ethernet packet filter set(s) information received from the SMF 160. An example action may comprise sending to the SMF 160 a message (e.g. policy response) by providing one or more of the following policy (s) comprising or along with the Ethernet packet filter set (s) information: QoS policy for the PDU session (s); Charging policy for the PDU session (s); Traffic Steering Control for steering traffic; Other policies, and/or the like.

The SMF 160 may send to the UPF 110 a message (e.g. user plane session establishment request) to request establishing user plan session (s) for the PDU session (s) comprising one or more of the following information: The S-NSSAI and/or the network slicing instance ID; The PDU session ID (s); The user identity of the wireless device; The Data Network Name (DNN); The CN N6 tunnel info (e.g. UPF 110 address or identity, and TEID) and CN N3 tunnel info (e.g. UPF 110 address or identity, and TEID) for the PDU session (s) if the corresponding tunnel info is allocated by the SMF, and the policies for the PDU sessions comprising or along with the Ethernet packet filter set (s) information.

Based on the message received from the SMF 160, the UPF 110 may take one or more actions. An example action may comprise setting up the user plane session(s). An example action may comprise acknowledging the SMF 160 by sending a response message (e.g. user plane session establishment response), the UPF 110 may include the CN N6 tunnel info (e.g. UPF 110 address or identity, and TEID) and CN N3 tunnel info (e.g. UPF 110 address or identity, and TEID) for the PDU session (s) if the corresponding tunnel info is allocated by the UPF. An example action may comprise performing the service flow detection and policy enforcement when receiving the user plane data packet with the Ethernet packet filter set (s) information.

The SMF 160 may acknowledge the New AMF 155-1 by sending a response message (e.g. PDU session create response), the response message may comprise one or more of the following information: (Cause, N2 SM information, N1 SM container (PDU Session Establishment Accept (QoS Rule, SSC mode, S-NSSAI, allocated IPv4 address, Session-AMBR))); in which the N2 SM information may comprise one or more of the following information: The allowed S-NSSAI and/or the network slicing instance ID; The PDU session ID (s); The user identity of the wireless device; The Data Network Name (DNN); The CN N3 tunnel info (e.g. UPF 110 address or identity, and TEID) for the PDU session (s); and The policies for the PDU sessions comprising or along with the Ethernet packet filter set (s) information.

FIG. 17 is an example call flow diagram as per an aspect of an embodiment of the present disclosure. The New AMF 155-1 may send to the SMF 160, a message (e.g. PDU session modification request) to request update one or more PDU sessions with one or more of the following information elements: The (R)AN N3 tunnel information (e.g. (R)AN address or identify, TEID) for the PDU Session (s); an S-NSSAI and/or a network slicing instance ID; PDU Session ID(s) for one or more PDU sessions; user identity of the wireless device; Data Network Name (DNN); and Ethernet packet filter set (s) information per PDU session identified by a PDU session ID, and/or Ethernet packet filter set(s) per UE identified by the UE identity (s), and/or Ethernet packet filter set(s) per data network/APN identified by a DNN, and/or Ethernet packet filter set(s) per network slice identified by an S-NSSAI (s). In response to the message received from the AMF 155-1, the SMF 160 may send to a PCF 135, a message (e.g. policy request) to request policy (s) for the PDU session (s); the message may comprise one or more of the following information elements: The information received from the New AMF 155-1 comprising the Ethernet packet filter set (s) information; The IPv6 prefix for the PDU session (s) and N6 point-to-point tunneling if the PDU Type is Ethernet PDU.

The PCF 135 may take one or more actions. An example action may comprise making policy decision based on the information received from the SMF 160 (e.g. Ethernet packet filter set(s) information) and/or other information (e.g. subscription information); and the PCF may create the service data flow template for the policy rule based on the Ethernet packet filter set(s) information received from the SMF 160. An example action may comprise sending to the SMF 160 a message (e.g. policy response) by providing one or more of the following policy (s) comprising or along with the Ethernet packet filter set (s) information: QoS policy for the PDU session (s); Charging policy for the PDU session (s); Traffic Steering Control for steering traffic; Other policies; and/or the like. If PCC is not supported or there is no PCF in the network, interactions between the SMF 160 and the PCF 135 may be omitted. In this case, the SMF 160 may make the policy decision based on the information received from the New AMF 155-1 (e.g. Ethernet packet filter set(s) information) and/or other information (e.g. subscription information); and the SMF 160 may create the service data flow template for the policy rule based on the Ethernet packet filter set(s) information received from the New AMF 155-1.

The SMF 160 may send to the UPF 110 a message (e.g. user plane session modification request) to request update the user plan session (s) for the PDU session (s) comprising one or more of the following information: The (R)AN N3 tunnel information (e.g. (R)AN address or identify, TEID) for the PDU Session (s); The S-NSSAI and/or the network slicing instance ID; The PDU session ID (s); The user identity of the wireless device; The Data Network Name (DNN); The CN N6 tunnel info (e.g. UPF 110 address or identity, and TEID) and CN N3 tunnel info (e.g. UPF 110 address or identity, and TEID) for the PDU session (s); and The policies for the PDU session(s) comprising or along with the Ethernet packet filter set (s) information. Based on the message received from the SMF 160, the UPF 110 may take one or more actions. An example action may comprise updating the user plane session(s). An example action may comprise correlating the CN N3 tunnel with (R)AN N3 tunnel for the PDU session (s). An example action may comprise acknowledging the SMF 160 by sending a response message (e.g. user plane session modification response), the UPF 110 may include the CN N6 tunnel info (e.g. UPF 110 address or identity, and TEID) and CN N3 tunnel info (e.g. UPF 110 address or identity, and TEID) for the PDU session (s) if the corresponding tunnel info is allocated by the UPF. An example action may comprise performing the service flow detection and policy enforcement when receiving the user plane data packet with the Ethernet packet filter set (s) information. In response to the message received from the UPF 110, the SMF 160 may acknowledge the New AMF 155-1 by sending a response message (e.g. PDU session modification response), the SMF 160 may include one or more the following information in the response message: The allowed S-NSSAI and/or the network slicing instance ID; The PDU session ID (s); The user identity of the wireless device; The Data Network Name (DNN); The CN N3 tunnel info (e.g. UPF 110 address or identity, and TEID) for the PDU session (s); and The policies for the PDU session(s) comprising or along with the Ethernet packet filter set (s) information.

FIG. 18 is an example call flow diagram as per an aspect of an embodiment of the present disclosure. The New AMF 155-1 may send to the old AMF 155-2 a message (e.g. PDU session release request) to request releasing one or more PDU sessions comprising one or more of the following information: The S-NSSAI and/or the network slicing instance ID, the PDU session ID (s), user identity of the wireless device, and/or the Data Network Name (DNN). In response to receiving the PDU session release request message from the New AMF 155-1, the old AMF 155-2 may send to the SMF 160 a message (e.g. PDU session release request) to request releasing one or more PDU sessions comprising the information received from the New AMF 155-1. In response to receiving the PDU session release request message from the old AMF 155-2, the SMF 160 may send to the UPF 110 a message (e.g. user plane session release request) to request releasing one or more user plane sessions for the PDU session(s) comprising the information received from the old AMF 155-2. In response to receiving the user plane session release request from the SMF 160, the UPF 110 may release the corresponding user plane sessions and acknowledge the SMF 160 by sending a response message (e.g. user plane session release response). If the UPF 110 has already released the corresponding user plane session (s), the UPF 110 may acknowledge the SMF 160 by sending a response message (e.g. user plane session release response). This action is optional, and the UPF 110 may release the user plane session (s) without the request from the SMF 160. The SMF 160 may acknowledge the old AMF 155-2 by sending a response message (e.g. PDU session release response). This action is optional. The old AMF 155-2 may acknowledge the New AMF 155-1 by sending a response message (e.g. PDU session release response), and the New AMF 155-1 may further send message to (R)AN 105 and/or UE 100 to release the related resource. Optional, the SMF 160 may send to the PCF 135 a message (e.g. policy delete request) to request remove the policy for the PDU session(s) comprising the information received from the old AMF 155-2. Optional, the PCF 135 may acknowledge the SMF 160 by sending a response message (e.g. policy delete response).

Figure 19:
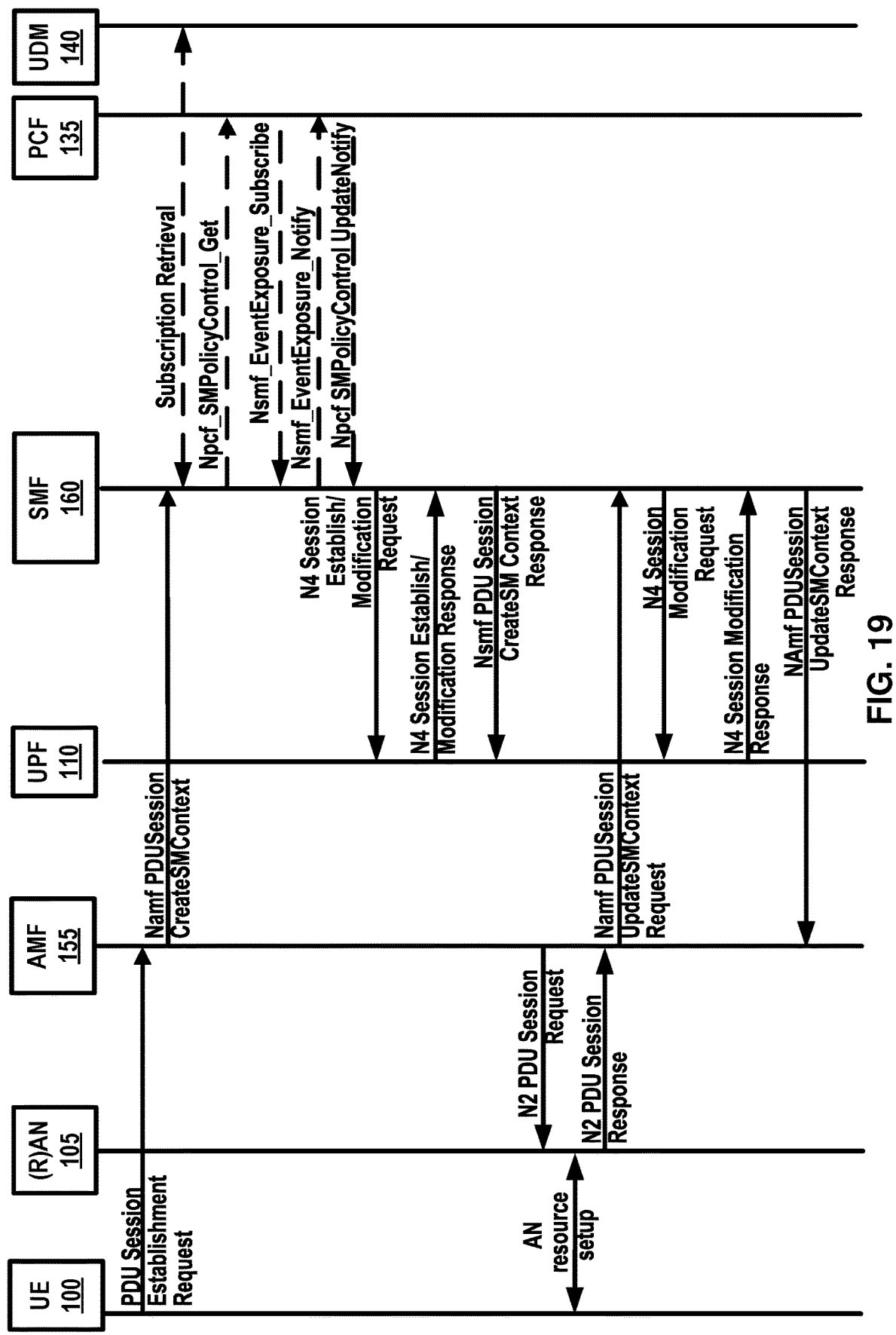
FIG. 19 is an example call flow diagram as per an aspect of an embodiment of the present disclosure.

In an example, the UE may initiate a PDU session establishment for an Ethernet type PDU session. FIG. 19 is an example call flow diagram as per an aspect of an embodiment of the present disclosure. From UE 100 to AMF 155: NAS Message (S-NSSAI, DNN, PDU Session ID, Request type, UE 5GCN Capability, N1 SM container (PDU Session Establishment Request)). The UE 100 may initiate the UE requested PDU session establishment procedure by the transmission of a NAS message containing a PDU session establishment request within the N1 SM container. The PDU session establishment request may include, for example, a PDU Type (e.g. Ethernet), SSC mode, Protocol Configuration Options, and a PDU session ID generated by the UE. In NAS Message and/or N1 SM container, the UE 100 may comprise one or more of the Ethernet packet filter sets per PDU session identified by a PDU session ID, and/or Ethernet packet filter set(s) per UE identified by the UE identity (s), and/or Ethernet packet filter set(s) per data network/APN identified by a DNN, and/or Ethernet packet filter set(s) per network slice identified by an S-NSSAI (s). An Ethernet packet filter set may comprise one or more of the following information elements: a Source/destination MAC address; an Ethertype as defined, for example, in IEEE 802.3; a Customer-VLAN tag (C-TAG) and/or Service-VLAN tag (S-TAG) VID fields as defined, for example, in IEEE 802.1Q; a Customer-VLAN tag (C-TAG) and/or Service-VLAN tag (S-TAG) PCP/DEI fields as defined, for example, in IEEE 802.1Q; and an IP Packet Filter Set; and/or the like. An Ethertype may indicate an IPv4/IPv6 payload, comprising one or more of the following information elements: a source/destination IP address or IPv6 prefix; a source/destination port number; a protocol ID of the protocol above IP/Next header type; a type of Service (TOS) (IPv4)/Traffic class (IPv6) and Mask; a flow Label (IPv6); a security parameter index; and/or the like.

A NAS message sent to the AMF 155 from the UE 100 may comprise an Ethernet header compression capability parameter. This parameter may be used to indicate one or more of the following UE capabilities: Support Ethernet header compression; Support Ethernet header and payload header compression (e.g. IP header, RTP/UDP/IP header of Ethernet payload, etc.); and/or the like. As an example, UE 5GCN Capability may comprise the Ethernet header compression capability parameter in the NAS message. The AMF 155 may select an SMF 160, and send to the SMF 160 a message, e.g. smf_PDUSession_CreateSMRequest (SUPI, DNN, S-NSSAI, PDU Session ID, AMF ID, Request Type, N1 SM container (PDU Session Establishment Request), User location information, Access Type, PEI). In the message sent to the SMF 160, the AMF 155 may comprise Ethernet packet filter set(s) information received from the UE 100. If the SMF 160 has not yet registered and subscription data is not available, the SMF 160 may register with the UDM 140, retrieve subscription data and subscribe to be notified when subscription data is modified. If the SMF 160 needs to perform secondary authorization/authentication during the establishment of the PDU session by a DN-AAA server, the SMF 160 may select an UPF and trigger the PDU session establishment authentication/authorization.

In response to the message received from the AMF 155, the SMF 160 may invoke, for example, an Npcf_SMPolicyControl_Get operation to establish a PDU Session with the PCF 135 and get the default PCC Rules for the PDU Session. In sending the message to PCF 135, the SMF 160 may comprise Ethernet packet filter set(s) information per a PDU session identified by the PDU session ID, and/or Ethernet packet filter set(s) per UE identified by the UE identity (s), and/or Ethernet packet filter set(s) per data network/APN identified by a DNN, and/or Ethernet packet filter set(s) per network slice identified by an S-NSSAI (s) received from the AMF 155. If PCC is not supported or there is no PCF in the network, the SMF 160 may make the policy decision based on the information received from the AMF 155 (e.g. Ethernet packet filter set(s) information) and/or other information (e.g. subscription information); and the SMF 160 may create the service data flow template for the policy rule based on the Ethernet packet filter set(s) information received from the AMF 155.

The PCF 135 may take actions in response to a message received from the SMF 160. For example, the PCF 135 may (A) make the policy decision based on the information received from the SMF 160 (e.g. Ethernet packet filter set(s) information) and/or other information (e.g. subscription information); and the PCF may create the service data flow template for the policy rule based on the Ethernet packet filter set(s) information received from the SMF 160. The PCF 135 may (B) send to the SMF 160 a message (e.g. policy response) by providing one or more of the following policy (s) comprising or along with the Ethernet packet filter set (s) information: a QoS policy for the PDU session; a charging policy for the PDU session; traffic Steering Control for steering traffic; and/or other policies. The PCF 135 may (C) subscribe the event (s) in the SMF 160 by invoking the Nsmf_EventExposure_Subscribe operation.

The SMF 160 may invoke, for example, the Nsmf_EventExposure_Notify service operation to report some events to the PCF 135 that has previously subscribed. The PCF 135 may provide updated policies to the SMF 160 by invoking, for example, the Npcf_SMPolicyControl_UpdateNotify service operation. The PCF 135 may provide authorized Session-AMBR and the authorized 5QI/ARP to SMF 160. The PCF 135 may provide the policy (s) comprising or along with the Ethernet packet filter set (s) information.

If the Request Type indicates "initial request" and PDU session establishment authentication/authorization was not performed, the SMF 160 may initiate an N4 session establishment procedure with the selected UPF 110, otherwise it may initiate an N4 session modification procedure with the selected UPF 110: The SMF 160 sends an N4 session establishment/modification Request to the UPF 110 and provides packet detection comprising or along with the Ethernet packet filter set (s) information, enforcement and reporting rules to be installed on the UPF 110 for this PDU Session. If CN Tunnel Info is allocated by the SMF 160, the CN Tunnel Info may be provided to UPF 110. The UPF 110 may acknowledge SMF 160 by sending an N4 session establishment/modification response. If CN Tunnel Info is allocated by the UPF 110, the CN Tunnel Info may be provided to SMF 160. With the Ethernet packet filter set (s) information, the UPF may perform the service flow detection and policy enforcement when receiving the user plane data packet.

SMF 160 to AMF 155: Nsmf_PDUSession_CreateSM Response (Cause, N2 SM information (PDU Session ID, QoS Profile(s), CN Tunnel Info, S-NSSAI, Session-AMBR), N1 SM container (PDU session establishment accept (QoS Rule, SSC mode, S-NSSAI, allocated IPv4 address, Session-AMBR))). The N2 SM information may carry information that the AMF 155 may forward to the (R)AN 105. CN Tunnel Info corresponding to the Core Network address of the N3 tunnel corresponding to the PDU Session may be forwarded. The QoS Profile providing the (R)AN 105 with the mapping between QoS parameters and QoS Flow Identifiers may be forwarded. Multiple QoS profiles may be provided to the (R)AN 105. The PDU Session ID may be used by AN signaling with the UE 100 to indicate to the UE 100 the association between AN resource and a PDU Session for the UE.

AMF 155 to (R)AN 105: N2 PDU session request (N2 SM information, NAS message (PDU Session ID, N1 SM container (PDU session establishment accept))). The AMF 155 may send the NAS message containing PDU Session ID and PDU session establishment accept targeted to the UE 100 and the N2 SM information (comprising CN N3 tunnel information) received from the SMF 160 within the N2 PDU session request to the (R)AN 105. The message sent to (R)AN 105 from the AMF 155 may comprise one or more of the following information: PDU (session) type (e.g. Ethernet), Ethernet packet filter set (s) information, Ethernet header compression capability parameter, and/or the like.

(R)AN 105 to UE 100: The (R)AN 105 may take one or more actions. For example (R)AN 105 may (A) issue AN specific signaling exchange with the UE 100 that is related with the information received from SMF 160. For example, in case of a 3GPP RAN, an RRC connection reconfiguration may take place with the UE 100 establishing the necessary RAN resources related to the QoS Rules for the PDU Session. Based on the Ethernet header compression capability parameter, the (R)AN 105 may send to UE 100 an RRC connection reconfiguration message comprising an information element (e.g. PDCP-Config IE) to set the configurable PDCP parameters for data radio bearer. In an example, the PDCP-Config IE may comprise the profile(s) for the header compression, e.g.

| Profile Identifier | Usage: |
| --- | --- |
| 0x0000 | No compression |
| 0x0001 | RTP/UDP/IP |
| 0x0002 | UDP/IP |
| 0x0003 | ESP/IP |
| 0x0004 | IP |
| 0x0006 | TCP/IP |
| 0x0101 | RTP/UDP/IP |
| 0x0102 | UDP/IP |
| 0x0103 | ESP/IP |
| 0x0104 | IP |
| 0x0105 | Ethernet |
| 0x0106 | Ethernet/IP |

In an example, an RRC message may comprise Ethernet header profile configuration IEs. The Ethernet profile configuration IE may comprise information about Ethernet packet header, and/or one or more parameters on Ethernet packet header compression, and/or the profile identifier (s). If the Ethernet header compression capability parameter indicates UE 100 does not support Ethernet header compression, the (R)AN 105 may send to UE 100 a PDCP-Config IE with the profile 0x0000 to indicate no Ethernet header compression. If the Ethernet header compression capability parameter indicates UE 100 supports Ethernet header compression but does not support payload header compression, the (R)AN 105 may send to UE 100 a PDCP-Config IE with the profile 0x0105 to indicate Ethernet header compression. If the Ethernet header compression capability parameter indicates UE 100 supports Ethernet header and payload header compression, the (R)AN 105 may send to UE 100 a PDCP-Config IE with the profile 0x0106. If the UE 100 supports Ethernet header compression, and/or Ethernet header and payload header compression, and based on the Ethernet packet filter set (s) information, and based on the profile(s) of the header compression received from the (R)AN 105, the UE 100 may take additional actions. For Ethernet header compression: (i) the UE 100 may map the destination MAC address and/or the source MAC address to a corresponding header compression index. The following table is an example created by the UE 100.

| MAC address(es) | Header compression index |
| --- | --- |
| destination MAC address 1 and/or source MAC address 1 | Mac_Index 1 |
| destination MAC address 2 and/or source MAC address 2 | Mac_Index 2 |
| ... | |
| destination MAC address N and/or source MAC address N | Mac_Index N |

The mapping information between destination MAC address and/or the source MAC address and the corresponding header compression index may be transmitted to the (R)AN 105. For Ethernet header and payload header compression: the destination MAC address and/or the source MAC address and/or payload header may be mapped to a corresponding header compression index. The following table is an example created by the UE 100:

| MAC address(es) and payload header | Header compression index |
| --- | --- |
| destination MAC address 1 and/or source MAC address 1 and/or IP header of Ethernet frame payload 1 | Mac_Index 1 |
| destination MAC address 2 and/or source MAC address 2 and/or IP header of Ethernet frame payload 2 | Mac_Index 2 |
| ... | |
| destination MAC address N and/or source MAC address N and/or IP header of Ethernet frame payload N | Mac_Index N |

The mapping information between destination MAC address and/or the source MAC address and/or payload header and the corresponding header compression index may be transmitted to the (R)AN 105.

For example, (R)AN 105 may (B) allocate (R)AN N3 tunnel information comprising (R)AN address or identify and/or tunnel end identifier (TEID) of N3 tunnel for downlink for the PDU session (s), and/or correlate the (R)AN N3 tunnel with the CN N3 tunnel for the PDU session (s). For example, (R)AN 105 may (C) forward the NAS message (PDU Session ID (s), N1 SM information (PDU Session Establishment Accept)) provided in action 10 to the UE 100. (R)AN 105 may provide the NAS message to the UE 100 if the necessary RAN resources have been established and the allocation of (R)AN tunnel information have been successful.

UE 100 may send to (R)AN 105 a message comprising one or more of the Ethernet packet filter sets per PDU session identified by a PDU session ID, and/or Ethernet packet filter set(s) per UE identified by the UE identity (s), and/or Ethernet packet filter set(s) per data network/APN identified by a DNN, and/or Ethernet packet filter set(s) per network slice identified by an S-NSSAI (s); and an Ethernet packet filter set may comprise one or more information element(s): a source/destination MAC address; an Ethertype as defined, for example, in IEEE 802.3; a customer-VLAN tag (C-TAG) and/or Service-VLAN tag (S-TAG) VID fields as defined, for example, in IEEE 802.1Q; a Customer-VLAN tag (C-TAG) and/or Service-VLAN tag (S-TAG) PCP/DEI fields as defined, for example, in IEEE 802.1Q; and an IP Packet Filter Set. An Ethertype indicating an IPv4/IPv6 payload may comprise one or more of the following information element: a source/destination IP address or IPv6 prefix; a source/destination port number; a protocol ID of the protocol above IP/Next header type; a Type of Service (TOS) (IPv4)/Traffic class (IPv6) and Mask; a flow label (IPv6); a security parameter index; and/or the like. The UE 100 may send the same Ethernet packet filter set(s) information. The UE may send updated Ethernet packet filter set(s) information. The (R)AN 105 may use the updated Ethernet packet filter set(s) information for further actions.

(R)AN 105 to AMF 155: N2 PDU session response (PDU Session ID, Cause, N2 SM information (PDU Session ID, (R)AN Tunnel Info, list of accepted/rejected QoS profile (s))). In the message sent to the AMF 155, the (R)AN 105 may comprise the Ethernet packet filter set(s) information received from the UE 100. (R)AN Tunnel Info may correspond to the Access Network address of the N3 tunnel corresponding to the PDU Session. If the UE 100 has received the PDCP-Config IE with the profile set to 0x0000 from the (R)AN 105, the UE 100 may not perform the header compression for the Ethernet packet and its payload. In an example, the UE 100 may receive the PDCP-Config IE with the profile set to 0x0105 and/or 0x0106, and the mapping information between destination MAC address and/or the source MAC address and the corresponding header compression index, and/or mapping information between destination MAC address and/or the source MAC address and/or payload header and the corresponding header compression index. In an example, the UE may receive an RRC message with Ethernet header profile configuration parameter e.g. related to Ethernet header compression.

The UE 100 may take one or more of the actions in response to the RRC message. For example, UE 100 may store the mapping information of Ethernet header compression and/or Ethernet header and payload header compression. For example, UE 100 may create a compressed header by performing a header compression of the Ethernet header and/or payload header based on the mapping information of Ethernet header compression and/or Ethernet header and payload header compression when receiving from the upper layer PDCP SDU comprising an Ethernet packets comprising an Ethernet header and payload. For example, UE 100 may constructing a PDCP PDU comprising at least the compressed header, the payload, and a traffic type field. The traffic type field may indicate that the payload is of Ethernet type. For example, UE 100 may transmit, the PDCP PDU to the (R)AN 105.

In response to the PDCP PDU received from the UE 100, the (R)AN 105 may perform the Ethernet frame decompression with the mapping information of Ethernet header compression and/or Ethernet header and payload compression, and send to the upper layer PDCP SDU comprising an Ethernet packets comprising an Ethernet header and payload.

AMF 155 to SMF 160: Nsmf_PDUSession_UpdateSM-Context Request (N2 SM information). The AMF 155 may forward the N2 SM information received from (R)AN 105 to the SMF 160. In the message to the SMF 160, the AMF 155 may comprise the Ethernet packet filter set(s) information received from the (R)AN 105.

The SMF 160 may take one or more actions. (A) For example, if PCC is not supported or there is no PCF in the network, the SMF 160 may make the policy decision based on the information received from the AMF 155 (e.g. Ethernet packet filter set(s) information) and/or other information (e.g. subscription information). The SMF 160 may create the service data flow template for the policy rule based on the Ethernet packet filter set(s) information received from the AMF 155. (B) For example, if the N4 session for this PDU Session was not established already, the SMF 160 may initiate an N4 session establishment procedure with the UPF 110. Otherwise, the SMF 160 may initiate an N4 session modification procedure with the UPF 110. The SMF 160 provides AN Tunnel Info and CN Tunnel Info. The CN Tunnel Info may need to be provided if the SMF 160 selected CN Tunnel Info. In the message sending to the UPF 110, the SMF 160 may comprise the policy (s) for the PDU session comprising or along with the Ethernet packet filter set(s) information received from the PCF 135.

The UPF 110 may provide an N4 session establishment/modification response to the SMF 160. With the Ethernet packet filter set (s) information, the UPF may perform the service flow detection and policy enforcement when receiving the user plane data packet.

SMF 160 to AMF 155: Nsmf_PDUSession_UpdateSM-Context Response (Cause). After this step, the AMF 155 may forward relevant events to the SMF 160, e.g. at handover where the (R)AN Tunnel Info changes or the AMF is relocated. When receiving from the upper layer PDCP SDU comprising an Ethernet packets comprising an Ethernet header and payload, the (R)AN 105 may take one or more actions. For example, (R)AN 105 may For example, (R)AN 105 may create a compressed header by performing a header compression of the Ethernet header and/or payload header based on the mapping information of Ethernet header compression and/or Ethernet header and payload header compression. For example, (R)AN 105 may construct a PDCP PDU comprising at least the compressed header, the payload, and a traffic type field. The traffic type field may indicate that the payload is of an Ethernet type. For example, (R)AN 105 may transmit the PDCP PDU to the UE 100. When receiving the PDCP PDU from the (R)AN 105, the UE 100 may perform the Ethernet frame decompression with the mapping information of Ethernet header compression and/or Ethernet header and payload header compression, and send to the upper layer PDCP SDU comprising an Ethernet packets comprising an Ethernet header and payload.

Figure 20:
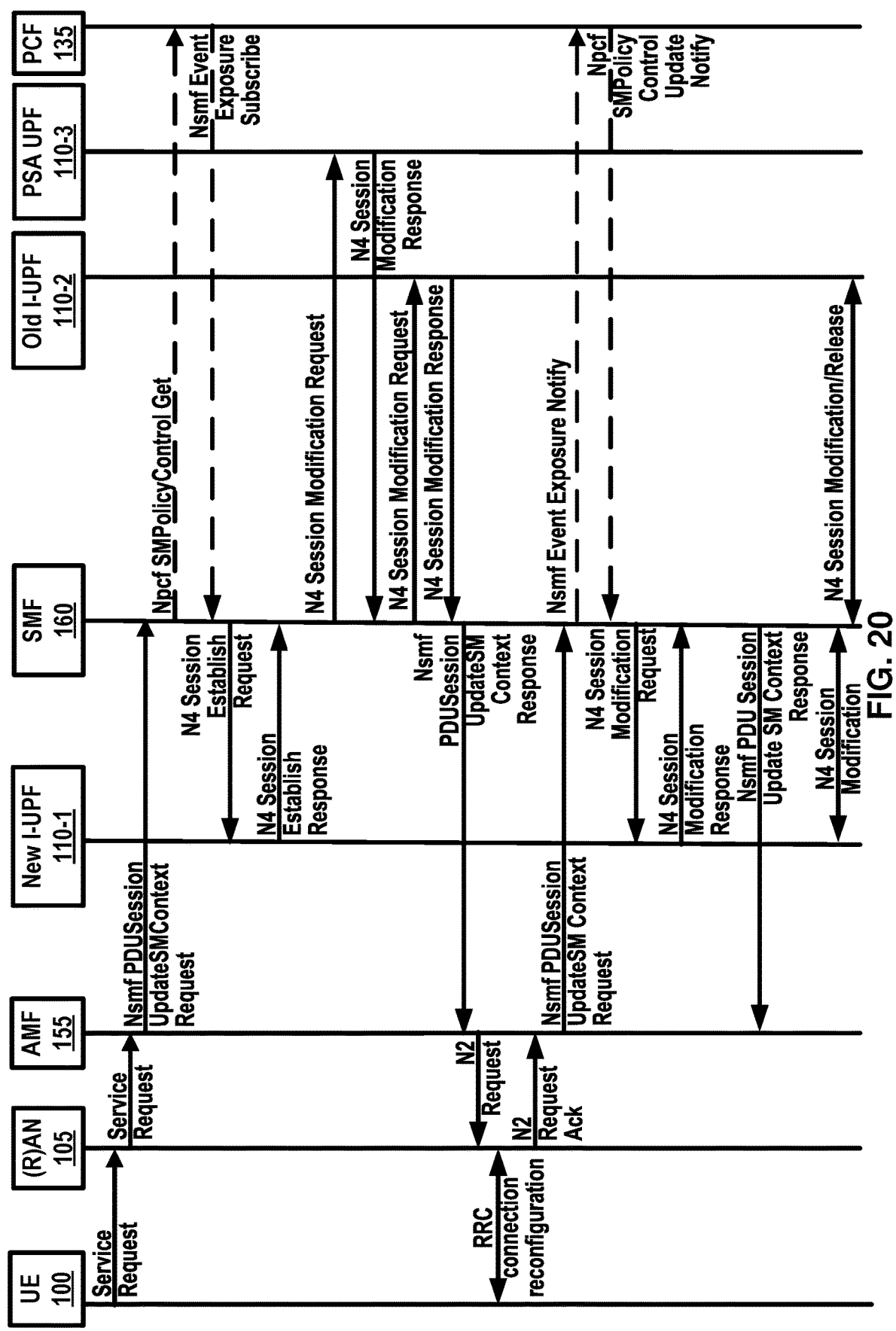
FIG. 20 is an example call flow diagram as per an aspect of an embodiment of the present disclosure.

In an example, the UE may initiate a service request procedure for an Ethernet type PDU session. FIG. 20 is an example call flow diagram as per an aspect of an embodiment of the present disclosure. UE 100 to (R)AN 105: AN message (AN parameters, MM NAS Service Request (PDU Session(s) to be activated, security parameters, PDU Session status, UE 5GCN Capability)). In case of NG-RAN: the AN parameters may include Establishment cause. The Establishment cause provides the reason for requesting the establishment of an RRC connection. The UE 100 may send NAS Service Request message towards the AMF 155 encapsulated in an RRC message to the RAN 105, and the RRC message(s) that may be used to carry the 5G-GUTI and this NAS message. In the message to (R)AN 105, the UE 100 may comprise one or more of the Ethernet packet filter sets per PDU session identified by a PDU session ID, and/or Ethernet packet filter set(s) per UE identified by the UE identity (s), and/or Ethernet packet filter set(s) per data network/APN identified by a DNN, and/or Ethernet packet filter set(s) per network slice identified by an S-NSSAI (s). An Ethernet packet filter set may comprise one or more of the following information element, such as, for example: Source/destination MAC address; Ethertype as defined in IEEE 802.3; Customer-VLAN tag (C-TAG) and/or Service-VLAN tag (S-TAG) VID fields as defined in IEEE 802.1Q; Customer-VLAN tag (C-TAG) and/or Service-VLAN tag (S-TAG) PCP/DEI fields as defined in IEEE 802.1Q; IP Packet Filter Set in case Ethertype indicates IPv4/IPv6 payload, and/or the like. The IP Packet Filter Set may comprise one or more of the following information elements, such as, for example: Source/destination IP address or IPv6 prefix; Source/destination port number; Protocol ID of the protocol above IP/Next header type; Type of Service (TOS) (IPv4)/Traffic class (IPv6) and Mask; Flow Label (IPv6); Security parameter index, and/or the like. The PDU Session status may indicate the previously established PDU Sessions (before this registration) in the UE. In an example, the PDU Session status may comprise a PDU (session) type (e.g. Ethernet) per PDU session. In an example, the registration request message may comprise a PDU (session) type (e.g. Ethernet) per PDU session. The UE 100 may transmit an AN message and/or an NAS message (e.g. MM NAS Registration Request) comprising the Ethernet packet filter set(s) information. The service request message sent by the UE 100 may comprise Ethernet header compression capability parameter. This parameter may be used to indicate one or more of the following UE capabilities: Support Ethernet header compression; and/or Support Ethernet header and payload header compression (e.g. IP header, RTP header of Ethernet payload, etc.). As an example, the AN parameters and/or the UE 5GCN Capability may comprise the Ethernet header compression capability parameter in the service request message.

(R)AN 105 may store the Ethernet header compression capability parameter if received in the RRC message. (R)AN 105 to AMF 155: N2 Message (N2 parameters, MM NAS Service Request). In the message sending to AMF 155, the (R)AN 105 may comprise the Ethernet packet filter set(s) information received from the UE 100. When NG-RAN is used, the N2 parameters include the 5G-GUTI, Location information, RAT type and Establishment cause. Based on the PDU Session status, the AMF may initiate PDU Session release procedure for the PDU Sessions whose PDU Session ID(s) were indicated by the UE as not available. AMF 155 to SMF 160: Nsmf_PDUSession_UpdateSMContext Request (PDU Session ID(s), Cause(s), UE location information, Access Type). In the message sending to SMF 160, the AMF 155 may comprise the Ethernet packet filter set(s) information received from the (R)AN 105. The Nsmf_PDUSession_UpdateSMContext Request may be invoked if the UE 100 identifies PDU Session(s) to be activated in the MM NAS Service Request message.

In response to the message received from the AMF 155, the SMF 160 may invoke the Npcf_SMPolicyControl_Get operation to get the policy (s) for the PDU Session (s). In the message sending to PCF 135, the SMF 160 may comprise the Ethernet packet filter set(s) information received from the AMF 155. If PCC is not supported or there is no PCF in the network, the SMF 160 may not perform the Action 4 and 5. In this case, the SMF 160 may make the policy decision based on the information received from the AMF 155 (e.g. Ethernet packet filter set(s) information) and/or other information (e.g. subscription information); and the SMF 160 may create the service data flow template for the policy rule based on the Ethernet packet filter set(s) information received from the AMF 155. In response to the message received from the SMF 160, the PCF 135 may take one or more actions. For example, the PCF 135 may make the policy decision based on the information received from the SMF 160 (e.g. Ethernet packet filter set(s) information) and/or other information (e.g. subscription information); and the PCF may create the service data flow template for the policy rule based on the Ethernet packet filter set(s) information received from the SMF 160. For example, the PCF 135 may send to the SMF 160 a message (e.g. policy response) by providing one or more of the following policy (s) comprising or along with the Ethernet packet filter set (s) information: QoS policy for the PDU session (s); Charging policy for the PDU session (s); Traffic Steering Control for steering traffic; Other policies, and/or the like. For example, the PCF 135 may subscribe the event (s) in the SMF 160 by invoking the Nsmf_EventExposure_Subscribe operation.

The SMF 160 may select a new UPF 110-1 to act as intermediate UPF for the PDU session, and may send an N4 session establishment request message new UPF 110-1, providing packet detection comprising or along with the Ethernet packet filter set (s) information, data forwarding, enforcement and reporting rules to be installed on the intermediate UPF 110-1. The PDU Session anchor addressing information (on N9) for this PDU Session may be provided to the intermediate UPF 110-1. If the service request is triggered by the network, and a new UPF is selected by the SMF to replace the old (intermediate) UPF 110-2, SMF includes the Data forwarding indication. The new intermediate UPF 110-1 may send an N4 session establishment response message to the SMF 160. In case the UPF 110-1 allocates CN tunnel info, it may provide CN DL tunnel info for the UPF 110-3 acting as PDU session anchor and UL tunnel info (i.e. CN N3 tunnel info) to the SMF 160. If the Data forwarding indication is received, the new (intermediate) UPF 110-1 acting as N3 terminating point sends CN DL tunnel info for the old (intermediate) UPF 110-2 to the SMF 160. With the Ethernet packet filter set (s) information, the new intermediate UPF 110-1 may perform the service flow detection and policy enforcement when receiving the user plane data packet. If the SMF 160 selects a new UPF to act as intermediate UPF 110-1 for the PDU session, the SMF 160 may send N4 session modification request message to PDU session anchor (PSA) UPF 110-3, providing the DL tunnel information from new intermediate UPF 110-1. The SMF 160 may send to the PSA UPF 110-3 packet detection comprising or along with the Ethernet packet filter set (s) information, data forwarding, enforcement and reporting rules. With the Ethernet packet filter set (s) information, the PSA UPF 110-3 may perform the service flow detection and policy enforcement when receiving the user plane data packet. In response to the message received from the SMF 160, the PSA UPF 110-3 may send an N4 session modification response message to the SMF 160.

SMF 160 to old I-UPF 110-2: N4 session modification request (New UPF 110-1 address, New UPF 110-1 DL Tunnel ID) If the service request is triggered by the network, and a new I-UPF 110-1 is selected by SMF 160 to replace the old I-UPF 110-2, the SMF 160 may send the N4 session modification request message to the old I-UPF 110-2, providing the DL tunnel information from the new I-UPF 110-1 acting as N3 terminating point. In response to the message received from the SMF 160, the Old I-UPF 110-2 may send an N4 session modification response message to the SMF 160. The old I-UPF may forward its buffered data to the new I-UPF acting as N3 terminating point.

SMF 160 to AMF 155: Nsmf_PDUSession_UpdateSM-Context Response (N1 SM information (PDU Session ID (s), PDU Session re-establishment indication), N2 SM information (PDU Session ID (s), QoS profile, CN N3 Tunnel Info, S-NSSAI), Cause) to the AMF. Upon reception of the Nsmf_PDUSession_UpdateSMContext Request with cause including "establishment of user plane resources", the SMF may determine whether UPF reallocation is performed, based on the UE location information, UPF service area and operator policies: for example, for a PDU Session that the SMF has determined still to be served by the current UPF, i.e. PSU UPF 110-3 or Old I-UPF 110-2, the SMF 160 may generate N2 SM information and sends Nsmf_PDUSession_UpdateSMContext Response to the AMF 155 to establish the user plane(s). The N2 SM information may contain information that the AMF 155 may provide to the RAN; for example, for a PDU Session that SMF 160 has determined as needing a UPF relocation for PSA-UPF 110-3 is needed, SMF may send Nsmf_PDUSession_UpdateSMContext Response containing N1 SM information to UE 100 via AMF 155. The N1 SM information may include the corresponding PDU Session ID and PDU Session re-establishment indication.

AMF 155 to (R)AN 105: N2 Request (N2 SM information received from SMF, security context, AMF Signalling Connection ID, Handover Restriction List, MM NAS Service Accept, list of recommended cells/TAs/NG-RAN node identifiers). AMF may include at least one N2 SM information from SMF if the procedure is triggered for PDU session user plane activation. The message sent to (R)AN 105 from the AMF 155 may comprise one or more of the following information: PDU Session ID (s); PDU (session) type (e.g. Ethernet); CN N3 tunnel info (e.g. UPF 110 address or identity, and TEID) for the PDU session (s); Ethernet packet filter set (s) information; Ethernet header compression capability parameter if available (e.g. received from UE 100 in NAS message); and/or the like.

The (R)AN 105 may take one or more actions. A) For example, the (R)AN 105 may perform RRC connection reconfiguration with the UE 100 depending on the QoS Information for the QoS Flows of the PDU sessions whose UP connections are activated and Data Radio Bearers. Based on the Ethernet header compression capability parameter received from UE 100 and/or AMF 155, the (R)AN 105 may send to UE 100 an RRC connection reconfiguration message comprising an information element (e.g. PDCP-Config IE) to set the configurable PDCP parameters for data radio bearer. In an example, the PDCP-Config IE may comprise the profile(s) for the header compression, e.g.

| Profile Identifier | Usage: |
| --- | --- |
| 0x0000 | No compression |
| 0x0001 | RTP/UDP/IP |
| 0x0002 | UDP/IP |
| 0x0003 | ESP/IP |
| 0x0004 | IP |
| 0x0006 | TCP/IP |
| 0x0101 | RTP/UDP/IP |
| 0x0102 | UDP/IP |

-continued

| Profile Identifier | Usage: |
| --- | --- |
| 0x0103 | ESP/IP |
| 0x0104 | IP |
| 0x0105 | Ethernet |
| 0x0106 | Ethernet/IP |

In an example, an RRC message may comprise Ethernet header profile configuration IEs. The Ethernet profile configuration IE may comprise information about Ethernet packet header, and/or one or more parameters on Ethernet packet header compression, and/or the profile identifier (s). If the Ethernet header compression capability parameter indicates UE 100 does not support Ethernet header compression, the (R)AN 105 may send to UE 100 a PDCP-Config IE with the profile 0x0000 to indicate no Ethernet header compression. If the Ethernet header compression capability parameter indicates UE 100 supports Ethernet header compression but does not support payload header compression, the (R)AN 105 may send to UE 100 a PDCP-Config IE with the profile 0x0105 to indicate Ethernet header compression. If the Ethernet header compression capability parameter indicates UE 100 supports Ethernet header compression and payload header compression, the (R)AN 105 may send to UE 100 a PDCP-Config IE with the profile 0x0106.

B) For example, the (R)AN 105 may forward the MM NAS Service Accept to the UE 100. The UE 100 may locally delete context of PDU Sessions that are not available in 5GC. If the N1 SM information is present in the Service Accept and indicates that some PDU Session(s) need(s) to be re-established, the UE may initiate PDU Session re-establishment for this/these PDU Session(s) after the Service Request procedure is complete. UE 100 may send to (R)AN 105 a message comprising one or more of the Ethernet packet filter sets per PDU session identified by a PDU session ID, and/or Ethernet packet filter set(s) per UE identified by the UE identity (s), and/or Ethernet packet filter set(s) per data network/APN identified by a DNN, and/or Ethernet packet filter set(s) per network slice identified by an S-NSSAI (s). An Ethernet packet filter set may comprise one or more of the following information element, such as, for example: Source/destination MAC address; Ethertype as defined in IEEE 802.3; Customer-VLAN tag (C-TAG) and/or Service-VLAN tag (S-TAG) VID fields as defined in IEEE 802.1Q; Customer-VLAN tag (C-TAG) and/or Service-VLAN tag (S-TAG) PCP/DEI fields as defined in IEEE 802.1Q; IP Packet Filter Set in case Ethertype indicates IPv4/IPv6 payload, and/or the like. The IP Packet Filter Set may comprise one or more of the following information elements, such as, for example: Source/destination IP address or IPv6 prefix; Source/destination port number; Protocol ID of the protocol above IP/Next header type; Type of Service (TOS) (IPv4)/Traffic class (IPv6) and Mask; Flow Label (IPv6); Security parameter index, and/or the like. The UE 100 may send the same Ethernet packet filter set(s) information as Action 1, the UE may send updated Ethernet packet filter set(s) information compare with Action 1. The (R)AN 105 may use the updated Ethernet packet filter set(s) information for further actions. If the UE 100 has received the PDCP-Config IE with the profile set to 0x0000 from the (R)AN 105, the UE 100 may not perform the header compression for the Ethernet packet and its payload. In an example, the UE 100 may receive the PDCP-Config IE with the profile set to 0x0105 and/or 0x0106. In an example, the UE may receive an RRC message with Ethernet header profile configuration parameter e.g. related to Ethernet header compression.

The UE 100 may take one or more actions. A) For example, the UE may create the mapping information of Ethernet header compression based on the Ethernet packet filter set (s) information: For Ethernet header compression: the UE may map the destination MAC address and/or the source MAC address to a corresponding header compression index; the following table is an example created by the UE 100:

| MAC address(es) | Header compression index |
|---|---|
| destination MAC address 1 and/or source MAC address 1 | Mac_Index 1 |
| destination MAC address 2 and/or source MAC address 2 | Mac_Index 2 |
| ... | |
| destination MAC address N and/or source MAC address N | Mac_Index N |

For Ethernet header compression and payload header compression: the UE may map the destination MAC address and/or the source MAC address and/or payload header to a corresponding header compression index; the following table is an example created by the UE

| MAC address(es) and payload header | Header compression index |
|---|---|
| destination MAC address 1 and/or source MAC address 1 and/or IP header of Ethernet frame payload 1 | Mac_Index 1 |
| destination MAC address 2 and/or source MAC address 2 and/or IP header of Ethernet frame payload 2 | Mac_Index 2 |
| ... | |
| destination MAC address N and/or source MAC address N and/or IP header of Ethernet frame payload N | Mac_Index N |

B) For example, the UE may create a compressed header by performing a header compression of the Ethernet header and/or payload header based on the mapping information of Ethernet header compression and/or Ethernet header and payload header compression when receiving from the upper layer PDCP SDU comprising an Ethernet packets comprising an Ethernet header and payload. C) For example, the UE may construct a PDCP PDU comprising at least of: the compressed header; the payload; a traffic type field, to indicates that the payload is of Ethernet type; and the mapping information between destination MAC address and/or the source MAC address and the corresponding header compression index; and/or the mapping information between destination MAC address and/or the source MAC and/or payload header and the corresponding header compression index. D) For example, the UE may transmit the PDCP PDU to the (R)AN 105. The UE 100 may send to the (R)AN 105 the mapping information between destination MAC address and/or the source MAC address and the corresponding header compression index; and/or the mapping information between destination MAC address and/or the source MAC and/or payload header and the corresponding header compression index in the following conditions: a) The UE 100 may send mapping information for the first time that the (R)AN 105 has no received such mapping information from UE 100 before; b) The UE 100 may send the updated mapping information; c) The UE may resend the mapping information when receiving the feedback from the (R)AN 105 that the decompression is not correct; d) Other reasons that UE 100 may send the mapping information;

In response to the PDCP PDU received from the UE 100, the (R)AN 105 may perform the Ethernet frame decompression with the mapping information of Ethernet header compression and/or Ethernet header and payload header compression and send to the upper layer PDCP SDU comprising an Ethernet packets comprising an Ethernet header and payload. (R)AN 105 to AMF 155: N2 Request Ack (N2 SM information (RAN Tunnel info, list of accepted QoS Flows for the PDU Sessions whose UP connections are activated, list of rejected QoS Flows for the PDU Sessions whose UP connections are activated)). In the message sending to AMF 155, the (R)AN 105 may comprise the Ethernet packet filter set(s) information received from the UE 100. The message may include N2 SM information(s), e.g. RAN tunnel information. AMF 155 to SMF 160: Nsmf_PDUSession_UpdateSMContext Request (N2 SM information (RAN Tunnel info), RAT Type) per accepted PDU Session to the SMF 160. In the message sending to SMF 160, the AMF 155 may comprise the Ethernet packet filter set(s) information received from the (R)AN 105. The SMF 160 may invoke the Nsmf_EventExposure_Notify service operation to report some events to the PCF 135 that has previously subscribed.

The PCF 135 may provide updated policies to the SMF 160 by invoking the Npcf_SMPolicyControl_UpdateNotify service operation. The PCF 135 may provide the policy (s) comprising or along with the Ethernet packet filter set (s) information.

If PCC is not supported or there is no PCF in the network, the SMF 160 may not perform the Action 17 and 18. In this case, the SMF 160 may make the policy decision based on the information received from the AMF 155 (e.g. Ethernet packet filter set(s) information) and/or other information (e.g. subscription information); and the SMF 160 may create the service data flow template for the policy rule based on the Ethernet packet filter set(s) information received from the AMF 155. If the SMF 160 selected a new UPF to act as intermediate UPF for the PDU Session, the SMF 160 may initiate a N4 session modification procedure and provides RAN Tunnel Info. The SMF 160 may provide packet detection comprising or along with the Ethernet packet filter set (s) information, data forwarding, enforcement and reporting rules to be installed on the New I-UPF 110-1. In response to the message received from the SMF 160, the New I-UPF 110-1 may send an N4 session modification response message to the SMF 160. In response to the message received from the AMF 155, the SMF 160 may send to the AMF 155 a Nsmf_PDUSession_UpdateSMContext Response message. If forwarding tunnel has been established and if the timer SMF 160 set for forwarding tunnel has expired, the SMF 160 may send N4 session modification request to new I-UPF 110-1 acting as N3 terminating point to release the forwarding tunnel; and the new I-UPF 110-1 may response to the SMF by sending an N4 session modification response. If the SMF 160 has decided to continue using the old UPF before Action 6, the SMF 160 may send to the old I-UPF 110-2 an N4 session modification request, providing (R)AN tunnel information. If the SMF 160 has decided to select a new UPF to act as intermediate UPF before Action 6, and the old UPF is not PSA UPF, the SMF 160 may initiate resource release by sending an N4 session release request (release cause) to the old I-UPF 110-2. When receiving from the upper layer PDCP SDU comprising an Ethernet packets comprising an Ethernet header and payload, the (R)AN 105 may take one or more actions. For example, the (R)AN 105 may create a compressed header by performing a header compression of the Ethernet header and/or payload header based on the mapping information of Ethernet header compression and/or Ethernet header and payload header compression received from the UE 100; for example, the (R)AN 105 may construct a PDCP PDU comprising at least the compressed header, the payload, and a traffic type field, wherein the traffic type field indicates that the payload is of Ethernet type; and for example, the (R)AN 105 may transmit the PDCP PDU to the UE 100.

When receiving the PDCP PDU from the (R)AN 105, the UE 100 may perform the Ethernet frame decompression with the mapping information of Ethernet header compression and/or Ethernet header and payload header compression and send to the upper layer PDCP SDU comprising an Ethernet packets comprising an Ethernet header and payload.

In an example, a wireless device may receive one or more RRC messages comprising a plurality of configuration parameters for a first bearer. The plurality of configuration parameters may comprise: a profile index indicating an Ethernet profile; and/or a second parameter indicating that Ethernet packet headers and/or IP packet headers are compressed. The PDCP layer in the wireless device may receive a PDCP SDU comprising an Ethernet packet. The Ethernet packet may comprise an Ethernet header and a payload and/or an IP packet header. The wireless device (e.g. the PDCP layer) may create a compressed header by performing a header compression of the Ethernet header and/or the IP packet header based on the plurality of configuration parameters. The wireless device (e.g. the PDCP layer) may construct a PDCU PDU comprising at least one of the compressed header, and the payload. The wireless device may transmit to the base station the PDCP PDU.

In an example, the PDCU PDU may further comprise a traffic type field. The traffic type field may indicate that the payload is of Ethernet type (that the PDCP PDU comprises one or more Ethernet frames). In an example, the wireless device may perform the header compression based on Robust Header Compression (ROHC).

The Ethernet packet may comprise a destination MAC address and a source MAC address. The performing the header compression may use one or more of the following actions: mapping the destination MAC and/or the source MAC to a corresponding index if the destination MAC and/or the source MAC is received for a first time; and/or transmitting, to the base station, the destination MAC and/or the source MAC, and the corresponding index.

According to various embodiments, one or more devices such as, for example, a wireless device, off-network wireless device, a base station, a core network device, and/or the like, may be employed in a system. One or more of the devices may be configured to perform particular operations or actions by virtue of having software, firmware, hardware, or a combination of them installed on the one or more of the devices, that in operation causes or cause the one or more devices to perform the actions. One or more computer programs can be configured to perform particular operations or actions by virtue of including instructions that, when executed by data processing apparatus, cause the apparatus to perform the actions. Embodiments of example actions are illustrated in the accompanying figures and specification. Features from various embodiments may be combined to create yet further embodiments.

FIG. 21 is a flow diagram of an aspect of an embodiment of the present disclosure. At 2110, a radio access network may receive a first message from an access and mobility management function. The first message may comprise an Ethernet packet filter set for a wireless device. The Ethernet packet filter set may comprise: a source medium access control address; and a destination medium access control address. At 2120, the radio access network may determine Ethernet header configuration parameters for the wireless device based on the Ethernet packet filter set. The Ethernet header configuration parameters may comprise: a header compression index indicating the source medium access control address and the destination medium access control address; and at least one Ethernet header profile configuration information element may comprise a profile identifier. At 2130, the radio access network may send at least one second message to the wireless device. The at least one second message may comprise the Ethernet header configuration parameters. At 2140, the radio access network may send at least one Ethernet packet to the wireless device. The at least one Ethernet packet may comprise at least one packet header compressed based on the header compression index and the profile identifier.

According to an example embodiment, the radio access network may receive a third message from a wireless device. The third message may request registration to the radio access network. The third message may comprise an Ethernet header compression capability parameter indicating UE capability of supporting Ethernet header compression. According to an example embodiment, the radio access network may send a fourth message to an access and mobility management function. The fourth message may comprise the Ethernet header compression capability parameter. According to an example embodiment, the Ethernet header compression capability parameter may comprise support Ethernet header compression. According to an example embodiment, the Ethernet header compression capability parameter may comprise support Ethernet header and payload header compression. According to an example embodiment, the third message may comprise a radio resource control message. According to an example embodiment, the third message may comprise a radio resource control connection establishment message. According to an example embodiment, a header compression index may indicate a mapping between the source medium access control address and the destination medium access control address. According to an example embodiment, the at least one packet header of the at least one Ethernet packet may be determined based on the Ethernet header configuration parameters. According to an example embodiment, the at least one packet header may comprise the header compression index. According to an example embodiment, the first message may comprise an Ethernet header compression capability parameter for the wireless device. According to an example embodiment, a destination MAC address may be mapped by the radio access network to a corresponding header compression index. According to an example embodiment, a source MAC address may be mapped by the radio access network to a corresponding header compression index. According to an example embodiment, a payload header may be mapped by the radio access network to a corresponding header compression index.

According to an example embodiment, the radio access network may send the header compression index to the wireless device. According to an example embodiment, the radio access network may receive a packet data convergence protocol packet data unit from the wireless device. According to an example embodiment, the radio access network perform Ethernet frame decompression with the header compression index in response to receiving the packet data convergence protocol packet data unit. According to an example embodiment, a packet data convergence protocol layer of the radio access network may send a packet data convergence protocol service data unit to an upper layer. The packet data convergence protocol service data unit may comprise Ethernet packets. The Ethernet packets may comprise an Ethernet header and payload.

According to an example embodiment, the radio access network may receive a packet data convergence protocol service data unit from an upper layer. The packet data convergence protocol service data unit may comprise Ethernet packets. The Ethernet packets may comprise an Ethernet header and payload. According to an example embodiment, the radio access network may perform, in response to receiving the packet data convergence protocol service data unit, at least one of: creating a compressed header by performing a header compression of the Ethernet header and payload header based on the header compression index; constructing a packet data convergence protocol packet data unit comprising at least the compressed header, the payload, and a traffic type field (where the traffic type field indicates that the payload is of Ethernet type); or transmitting, by the radio access network to the wireless device, the packet data convergence protocol packet data unit.

According to an example embodiment, the Ethernet packet filter set may comprise an Ethertype. According to an example embodiment, the Ethernet packet filter set may comprise a source MAC address. According to an example embodiment, the Ethernet packet filter set may comprise a destination MAC address. According to an example embodiment, the Ethernet packet filter set may comprise a customer virtual local area network tag. According to an example embodiment, the Ethernet packet filter set may comprise a service virtual local area network tag VID field. According to an example embodiment, the Ethernet packet filter set may comprise a service virtual local area network tag PCP field. According to an example embodiment, the Ethernet packet filter set may comprise a service virtual local area network tag DEI field. According to an example embodiment, the Ethernet packet filter set may comprise an IP packet filter set.

According to an example embodiment, the IP packet filter set may comprise a source IP address. According to an example embodiment, the IP packet filter set may comprise an IPv6 source prefix. According to an example embodiment, the IP packet filter set may comprise a destination IP address. a destination IPv6 prefix. According to an example embodiment, the IP packet filter set may comprise a source port number. According to an example embodiment, the IP packet filter set may comprise a destination port number.

According to an example embodiment, the IP packet filter set may comprise a protocol identifier of a protocol above an IP header type. According to an example embodiment, the IP packet filter set may comprise an IPv4 type of service. According to an example embodiment, the IP packet filter set may comprise an IPv4 mask. According to an example embodiment, the IP packet filter set may comprise an IPv6 traffic class. According to an example embodiment, the IP packet filter set may comprise an IPv6 mask. According to an example embodiment, the IP packet filter set may comprise an IPv6 flow label. According to an example embodiment, the IP packet filter set may comprise a security parameter index.

According to an example embodiment, the Ethernet packet filter set may be associated with a packet data unit session. The packet data unit session may be identified by a packet data unit session ID. According to an example embodiment, the Ethernet packet filter set may be associated with a wireless device. The wireless device may be identified by at least one UE identity. According to an example embodiment, the Ethernet packet filter set may be associated with a data network. The data network may be identified by a data network name. According to an example embodiment, the Ethernet packet filter set may be associated with a network slice. The network slice may be identified by at least one single network slice selection assistance information.

FIG. 22 is a flow diagram of an aspect of an embodiment of the present disclosure. At 2210, a wireless device may receive one or more radio resource control messages. The one or more radio resource control messages may comprise a plurality of configuration parameters for a first bearer. The plurality of configuration parameters may comprise a profile index indicating an Ethernet profile. The plurality of configuration parameters may comprise a second parameter indicating that Ethernet packet headers are compressed. The plurality of configuration parameters may comprise a second parameter. The second parameter may indicate that: Ethernet packet headers are compressed; and IP packet headers are compressed. At 2220, a packet data convergence protocol layer in the wireless device may receive a packet data convergence protocol service data unit. The packet data convergence protocol service data unit may comprise an Ethernet packet. The Ethernet packet may comprise an Ethernet header and a payload. The Ethernet packet may comprise an IP packet header and a payload. At 2230, a compressed header may be created, based on the plurality of configuration parameters, by compressing at least one of: the Ethernet header; or the Ethernet header and the IP packet header. At 2240, a packet data convergence protocol packet data unit may be constructed. The packet data convergence protocol packet data unit may comprise the compressed header. The packet data convergence protocol packet data unit may comprise a payload. At 2250, the wireless device may transmit the packet data convergence protocol packet data unit to a base station.

According to an example embodiment, the packet data convergence protocol packet data unit may comprise a traffic type field. The traffic type field may indicate that the payload is of Ethernet type. The packet data convergence protocol packet data unit may comprise one or more Ethernet frames. According to an example embodiment, the creation of a compressed header may be based on robust header compression. According to an example embodiment, the Ethernet packet may comprise a destination MAC address and a source MAC address. According to an example embodiment, the creation of a compressed header may comprise mapping to a corresponding header compression index, by a radio access network, at least one of: a destination MAC address; a source MAC address; or a payload header. According to an example embodiment, the destination MAC address and a first corresponding index may be transmitted to the base station. According to an example embodiment, the source MAC address and a second corresponding index may be transmitted to the base station. According to an example embodiment, the source MAC address and the destination MAC address and a third corresponding index may be transmitted to the base station. According to an example embodiment, the mapping may be in response to the destination MAC address being received for a first time. According to an example embodiment, the mapping may be in response to the source MAC address being received for a first time.

In this disclosure, "a" and "an" and similar phrases are to be interpreted as "at least one" or "one or more." Similarly, any term that ends with the suffix "(s)" is to be interpreted as "at least one" or "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" is indicative that the phrase following the term "based on" is an example of one of a multitude of suitable possibilities that may, or may not, be employed to one or more of the various embodiments. The phrase "in response to" is indicative that the phrase following the phrase "in response to" is an example of one of a multitude of suitable possibilities that may, or may not, be employed to one or more of the various embodiments. The terms "including" and "comprising" should be interpreted as meaning "including, but not limited to."

In this disclosure and the claims, differentiating terms like "first," "second," "third," identify separate elements without implying an ordering of the elements or functionality of the elements. Differentiating terms may be replaced with other differentiating terms when describing an embodiment.

In this disclosure, various embodiments are disclosed. Limitations, features, and/or elements from the disclosed example embodiments may be combined to create further embodiments within the scope of the disclosure.

In this disclosure, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, MATLAB or the like) or a modeling/ simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:
1. A base station comprising:
one or more processors; and
memory storing instructions that, when executed by the one or more processors, cause the base station to:
send, to a wireless device, a radio resource control (RRC) message comprising at least one packet data convergence protocol (PDCP) configuration parameter indicating Ethernet header compression for a data radio bearer;

send, to the wireless device and based on the at least one PDCP configuration parameter, a message comprising:
    a source medium access control (MAC) address and a destination MAC address; and
    a header compression index corresponding to the source MAC address and the destination MAC address; and
send, to the wireless device, a compressed Ethernet packet:
    comprising a packet header being compressed based on the message; and
    comprising the corresponding header compression index.

2. The base station of claim 1, wherein the instructions, when executed by the one or more processors, further cause the base station to:
    receive, from an access and mobility management function (AMF), a packet data unit (PDU) session request message comprising a capability parameter indicating that the wireless device supports Ethernet header compression capability,
    wherein the RRC message is sent based on the capability parameter.

3. The base station of claim 1, wherein the instructions, when executed by the one or more processors, further cause the base station to:
    receive, from the wireless device, a capability parameter indicating the wireless device supports Ethernet header compression capability, wherein the RRC message is sent based on the capability parameter.

4. The base station of claim 1, wherein the corresponding header compression index indicates the source MAC address and the destination MAC address.

5. The base station of claim 1, wherein the instructions, when executed by the one or more processors, further cause the base station to:
    receive, from the wireless device, a registration request message requesting registration and comprising an Ethernet header compression capability parameter indicating wireless device capability of supporting the Ethernet header compression.

6. The base station of claim 5, wherein the instructions, when executed by the one or more processors, further cause the base station to:
    send, to an access and mobility management function (AMF), the Ethernet header compression capability parameter.

7. The base station of claim 1, wherein the message comprises mapping information between:
    the source MAC address and the destination MAC address; and
    the corresponding header compression index.

8. A base station comprising:
    one or more processors; and
    memory storing instructions that, when executed by the one or more processors, cause the base station to:
        send, to a wireless device, a radio resource control (RRC) message comprising at least one packet data convergence protocol (PDCP) configuration parameter for a data radio bearer;
        receive, from the wireless device and based on the at least one PDCP configuration parameter, a message comprising:
            a source medium access control (MAC) address and a destination MAC address; and
            a header compression index corresponding to the source MAC address and the destination MAC address; and
        receive, from the wireless device, a compressed Ethernet packet:
            comprising a packet header being compressed based on the message; and
            comprising the corresponding header compression index.

9. The base station of claim 8, wherein the instructions, when executed by the one or more processors, further cause the base station to:
    decompress the packet header based on the message, wherein the decompression comprises determining, based on the header compression index comprised in the compressed Ethernet packet, the source MAC address and the destination MAC address.

10. The base station of claim 8, wherein the instructions, when executed by the one or more processors, further cause the base station to:
    receive, from the wireless device, a capability parameter indicating the wireless device supports Ethernet header compression capability, wherein the RRC message is sent based on the capability parameter.

11. The base station of claim 8, wherein the corresponding header compression index indicates the source MAC address and the destination MAC address.

12. The base station of claim 8, wherein the instructions, when executed by the one or more processors, further cause the base station to receive, from the wireless device, a registration request message requesting registration and comprising an Ethernet header compression capability parameter indicating wireless device capability of supporting the Ethernet header compression.

13. The base station of claim 8, wherein the message comprises mapping information between:
    the source MAC address and the destination MAC address; and
    the corresponding header compression index.

14. The base station of claim 8, wherein:
    the at least one PDCP configuration parameter further indicates a robust header compression (ROHC) profile; and
    the compressed packet header comprises a compressed internet protocol (IP) header.

15. A method comprising:
    receiving, by a wireless device from a base station, a radio resource control (RRC) message comprising at least one packet data convergence protocol (PDCP) configuration parameter indicating Ethernet header compression for a data radio bearer;
    receiving, from the base station and based on the at least one PDCP configuration parameter, a message comprising:
        a source medium access control (MAC) address and a destination MAC address; and
        a header compression index corresponding to the source MAC address and the destination MAC address; and
    receiving a compressed Ethernet packet:
        comprising a packet header being compressed based on the message; and
        comprising the corresponding header compression index.

16. The method of claim 15, further comprising:
    decompressing the packet header based on the message, wherein the decompressing comprises determining, based on the header compression index comprised in the compressed Ethernet packet, the source MAC address and the destination MAC address.

17. The method of claim 15, further comprising:
sending, to the base station, a capability parameter indicating the wireless device supports Ethernet header compression capability, wherein the receiving the RRC message is based on the capability parameter.

18. The method of claim 15, wherein the corresponding header compression index indicates the source MAC address and the destination MAC address.

19. The method of claim 15, further comprising:
sending, to the base station, a registration request message requesting registration and comprising an Ethernet header compression capability parameter indicating wireless device capability of supporting the Ethernet header compression.

20. The method of claim 15, wherein the message comprises mapping information between:
the source MAC address and the destination MAC address; and
the corresponding header compression index.

\* \* \* \* \*